US008832222B2

(12) United States Patent
Breslin et al.

(10) Patent No.: US 8,832,222 B2
(45) Date of Patent: Sep. 9, 2014

(54) METHOD, APPARATUS AND SYSTEM FOR INSERTING A VLAN TAG INTO A CAPTURED DATA PACKET

(75) Inventors: Terence M. Breslin, San Mateo, CA (US); David Kucharczyk, Santa Fe, NM (US); Jan Allen Hinshaw, Prescott Valley, AZ (US)

(73) Assignee: VSS Monitoring, Inc., Sunnyvale, CA (US)

( * ) Notice: Subject to any disclaimer, the term of this patent is extended or adjusted under 35 U.S.C. 154(b) by 572 days.

(21) Appl. No.: 12/898,536

(22) Filed: Oct. 5, 2010

(65) Prior Publication Data

US 2011/0082910 A1    Apr. 7, 2011

Related U.S. Application Data

(60) Provisional application No. 61/248,837, filed on Oct. 5, 2009.

(51) Int. Cl.
*G06F 15/167*     (2006.01)
*H04L 12/24*     (2006.01)
*H04L 12/26*     (2006.01)

(52) U.S. Cl.
CPC ............ *H04L 43/12* (2013.01); *H04L 41/0816* (2013.01); *H04L 12/26* (2013.01)
USPC ........... 709/217; 709/246; 709/225; 709/233; 709/220; 370/392; 370/389; 370/351; 370/230; 370/256

(58) Field of Classification Search
USPC .......... 709/217, 246, 225, 233, 220; 370/392, 370/389, 351, 230, 256
See application file for complete search history.

(56) References Cited

U.S. PATENT DOCUMENTS

| 5,781,318 | A | 7/1998 | Tremblay |
| 6,041,037 | A | 3/2000 | Nishio |
| 6,424,627 | B1 | 7/2002 | Sørhauh |
| 7,079,537 | B1 * | 7/2006 | Kanuri et al. ............. 370/392 |
| 7,113,512 | B1 * | 9/2006 | Holmgren et al. ....... 370/395.53 |
| 7,206,831 | B1 * | 4/2007 | Dube et al. .................. 709/223 |

(Continued)

OTHER PUBLICATIONS

VSS Monitoring Inc., Easy Install Guide, P/N: V1.1 CC-F, Desc. 10/100/1000 1×1 Copper Tap, 8 pages, (C)2003-2005, VSS Monitoring Inc.

(Continued)

*Primary Examiner* — Thuong Nguyen
(74) *Attorney, Agent, or Firm* — Edwards Wildman Palmer LLP; Scott D. Wofsy; Christopher J. Capelli

(57) ABSTRACT

Methods, systems, computer-readable media, and devices for determining a target destination of captured network traffic received by a network captured traffic distribution device communicatively coupled to a plurality of network captured network traffic distribution devices arranged in a stacked topology responsively to an inserted virtual local area network (VLAN) tag are described. A target destination for a captured data packet may be determined and a VLAN tag may be inserted into the captured data packet responsively to the determined target destination. The data packet may then be transmitted to an intervening network captured traffic distribution device positioned between the network captured traffic distribution device and the target destination. Once received by the intervening network captured traffic distribution device, the target destination of the received data packet may be determined based on the inserted VLAN tag. The received data packet may then be transmitted toward the target destination.

16 Claims, 39 Drawing Sheets

(56) References Cited

U.S. PATENT DOCUMENTS

| | | | |
|---|---|---|---|
| 7,257,640 B1* | 8/2007 | Callocchia et al. | 709/233 |
| 7,277,957 B2 | 10/2007 | Rowley | |
| 2003/0112760 A1 | 6/2003 | Puppa | |
| 2004/0001513 A1* | 1/2004 | Major et al. | 370/469 |
| 2004/0100954 A1* | 5/2004 | Dai et al. | 370/389 |
| 2004/0120259 A1 | 6/2004 | Jones | |
| 2005/0005031 A1 | 1/2005 | Gordy et al. | |
| 2005/0044261 A1* | 2/2005 | Saxena | 709/236 |
| 2005/0129033 A1 | 6/2005 | Gordy | |
| 2005/0138171 A1* | 6/2005 | Slaight | 709/225 |
| 2005/0257262 A1 | 11/2005 | Matityahu | |
| 2006/0002370 A1* | 1/2006 | Rabie et al. | 370/351 |
| 2006/0083511 A1 | 4/2006 | Edmunds | |
| 2006/0268686 A1* | 11/2006 | Shei et al. | 370/217 |
| 2007/0180152 A1 | 8/2007 | Montanez | |
| 2007/0233825 A1* | 10/2007 | Brownell et al. | 709/220 |
| 2008/0049627 A1 | 2/2008 | Nordin | |
| 2010/0135323 A1 | 6/2010 | Leong | |

OTHER PUBLICATIONS

VSS Monitoring, Inc., Data Sheet for P/N V1.1 C.C-F, 10/100/1000 1×1 Copper Tap, 2 pages, (C)2003-2004, VSS Monitoring, Inc.

VSS Monitoring, Inc., Promotional Materials for Link Safe Feature of 10/100/1000 Copper Taps, 1 page, (C)2003-2005, VSS Monitoring, Inc.

Peribit Networks, Inc., PeriScope Central Management System (CMS) 5.0 Administrator's Guide, Part No. 100316, Rev. 003, pp. 100-102 (c)2003-2004, Peribit Networks, Inc.

Peribit Networks, Inc., Sequence Reducer/Sequence Mirror Operator's Guide, Part No. 1000068, Rev. 013A, pp. 24, 60-61 (c)2001-2005, Peribit Networks, Inc.

Canary Communications, Inc. product literature for Fast Ethernet Fiber-to-Fiber Converters, 7 pages, (C)2004, Canary Communications, Inc.

Transitions Networks, Inc. 100Base-TX/100BBase-FX Media Converters E-100BTX-FX-04 User's Guide, 4 pages, (C)1998-2000, Transitions Networks, Inc.

VSS Monitoring; PCT/IB2009/53393 filed Aug. 5, 2009; ISA/US; Feb. 1, 2010; 3 pages.

* cited by examiner

FIG. 3C

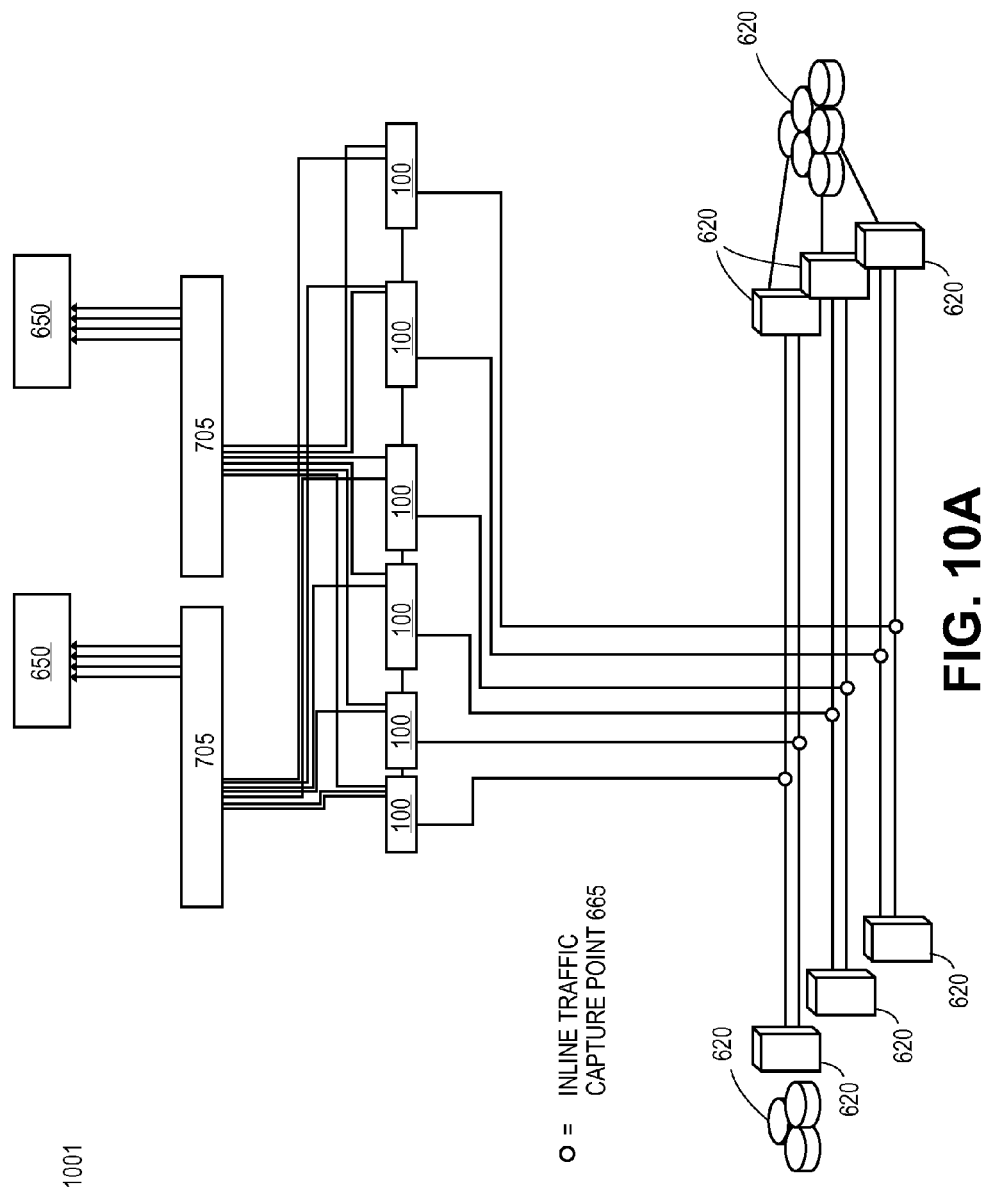

1301

| HEADER 1305 | PAYLOAD 1315 | OLD FCS/CRC 1320 |

| HEADER 1305 | VLAN TAG 1310 | PAYLOAD 1315 | NEW FCS/CRC 1330 |

FIG. 13B

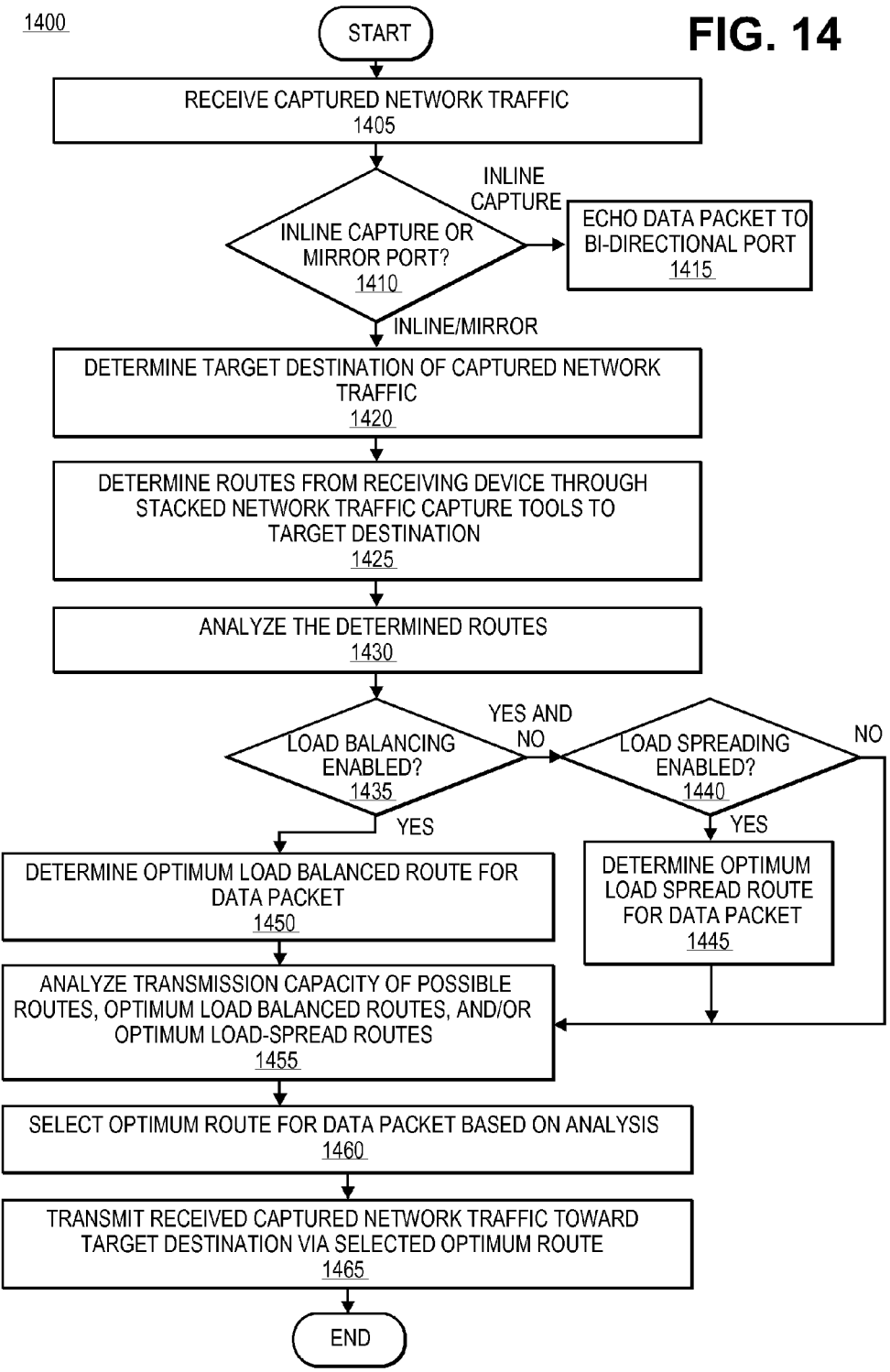

METHOD, APPARATUS AND SYSTEM FOR INSERTING A VLAN TAG INTO A CAPTURED DATA PACKET

RELATED APPLICATIONS

This application is a NONPROVISIONAL of, claims priority to and incorporates by reference U.S. Provisional Patent Application 61/248,837, filed 5 Oct. 2009.

FIELD OF THE INVENTION

The present invention relates to methods and systems for determining target destinations of captured network traffic received by network captured traffic distribution devices arranged in a stacked topology responsively to a virtual local area network (VLAN) tag.

BACKGROUND

Traditionally, network traffic is captured locally using a mirror port present on a network switch or a network tap in conjunction with an inline traffic capture point positioned along a communication link coupling two or more communicating devices. Network traffic captured in this way is typically monitored locally, thus requiring a port on a monitor for every individual capture point and mirror port in the network. This localization leads to great infrastructure and bandwidth costs and, consequently, many networks are inadequately monitored.

Another drawback to traditional network monitoring systems is that all captured traffic is sent to each monitoring device. With increased specialization, many conventional monitoring devices monitor a specific category or range of categories of network traffic. Thus, when a monitoring device receives all captured traffic, it is inundated with an excess of information, only a portion of which is useful. This results in an inefficient use of both bandwidth and monitoring capacity because, as a first step to monitoring the captured traffic, the monitor must first filter, or otherwise manipulate, the traffic to remove unnecessary information.

A further drawback to traditional network monitoring systems is that conventional taps do not communicate with one another. Thus, each tap must be individually configured. In the event of a desired change in the configuration information, each tap must then be individually reconfigured.

SUMMARY OF THE INVENTION

Methods, systems, computer-readable media, and devices for determining a target destination of captured network traffic received by a network captured traffic distribution device communicatively coupled to a plurality of network captured network traffic distribution devices arranged in a stacked topology responsively to an inserted virtual local area network (VLAN) tag are herein described. The stacked topology may be arranged as, for example, a ring topology, a mesh topology, a star topology, a topology of single links, a topology of multiple links, a topology including one or more redundant links, and some combination thereof.

Captured network traffic may be received at a network captured traffic distribution device communicatively coupled to a plurality of network captured network traffic distribution devices arranged in a stacked topology. A target destination of a data packet included in the captured network traffic may then be determined. There may be at least one intervening network captured traffic distribution device in the stacked topology in-line between the network captured traffic distribution device and the target destination. Exemplary target destinations include a monitoring device, a protocol analyzer, a flight recorder, an intrusion detection system, a media analyzer, a signaling analyzer, a web analyzer, a database analyzer, a voice signaling analyzer, an Internet protocol television (IPTV) analyzer, an application analyzer, a voice analyzer, and a forensic analyzer.

A VLAN tag may be inserted into the captured data packet responsively to the determined target destination. The data packet may then be transmitted to the at least one intervening network captured traffic distribution device positioned between the network captured traffic distribution device and the target destination. Once received by the intervening network captured traffic distribution device, the target destination of the received data packet may be determined based on the inserted VLAN tag. The received data packet may then be transmitted toward the target destination.

On some occasions, the target destination of the received data packet may be a target network captured traffic distribution device included in the stacked topology. On these occasions, the target network captured traffic distribution device receiving the data packet from the intervening network captured traffic distribution device may determine whether it is the target destination for the data packet. The target network captured traffic distribution device may then remove the VLAN tag from the data packet responsively to a determination that the target network captured traffic distribution device is the target destination for the data packet and may transmit the data packet, without the VLAN tag, to an external device.

In one embodiment, the received captured traffic may be groomed. The grooming may include, for example, load balancing a distribution of received captured traffic through the stacked topology, removing information from one or more data packets included in the received captured traffic, truncating one or more data packets included in the received captured traffic, load spreading a distribution of received captured traffic through the stacked topology, filtering the received network traffic transmitted through the stacked topology according to a criterion, and aggregating the received network traffic transmitted through the stacked topology.

A network captured traffic distribution device comprising a plurality of bi-directional ports, an egress port, a stacking port, a processor, and an application specific integrated circuit (ASIC) is also herein disclosed. The bi-directional ports, egress port, and/or the stacking port may be compatible with, for example, of a 10/100 Ethernet cable, a 1 gigabit Ethernet cable, a 10 gigabit Ethernet cable, a copper cable, and/or a fiber cable.

The plurality of bi-directional ports may be, for example, configured to receive captured network traffic and/or echo received captured network traffic to one or more of the plurality of bi-directional ports. The egress port may be configured to, for example, transmit received captured network traffic to an external device.

The stacking port may be configured to enable, via a communication link, the stacking of the network captured traffic distribution device with a plurality of network captured traffic distribution devices in a stacked topology. The stacking includes an exchange of configuration information between the network captured traffic distribution device and the plurality of network captured traffic distribution devices. The stacking port may further be configured to enable the network captured traffic distribution device to be stacked in at least one of a ring topology, a mesh topology, a star topology, a topology of single links, a topology of multiple links, a topology including one or more redundant links, and some combination thereof. On some occasions, the stacking port may be a monitor port.

The processor may be configured to, for example, manage distribution of received captured network traffic through the network captured traffic distribution device and/or the stacked topology of network captured traffic distribution devices, determine a target destination of a data packet included in the captured network traffic, and insert a VLAN tag into the data packet responsively to the determined target destination. Exemplary target destinations include a monitoring device, a protocol analyzer, a flight recorder, an intrusion detection system, a media analyzer, a signaling analyzer, a web analyzer, a database analyzer, a voice signaling analyzer, an Internet protocol television (IPTV) analyzer, an application analyzer, a voice analyzer, and a forensic analyzer.

In one embodiment, a received data packet included in the received captured network traffic may include a VLAN tag and the processor may be further configured to determine the target destination of the received data packet based on the VLAN tag. In another embodiment, the processor may be further configured to enable peer-to-peer management between the network captured traffic distribution device and an additional stacked network captured traffic distribution device.

The ASIC may be configured to, for example, distribute the captured traffic through the network captured traffic distribution and/or transmit the data packet to the at least one of the additional network captured traffic distribution devices.

In one embodiment, the network captured traffic distribution device may include a data storage configured to store, for example, an Internet protocol (IP) address associated with the network captured traffic distribution device, configuration information for the network captured traffic distribution device, data regarding at least one additional network captured traffic distribution device included in the stacked topology, and/or data regarding at least one of received captured network traffic and management of received captured network traffic.

A system including a stacked topology of network captured traffic distribution devices is also herein disclosed. The stacked topology may include a first and a second network captured traffic distribution device communicatively coupled via a communication link. The communication link may be, for example, a 10/100 Ethernet cable, a 1 gigabit Ethernet cable, a 10 gigabit Ethernet cable, a copper cable, and/or a fiber cable.

The first network captured traffic distribution device may be configured to, for example, receive captured network traffic from a source, determine a target destination of a data packet included in received captured network traffic, determine a route for transmission of the data packet through the stacked topology to the target destination, wherein a second network captured traffic distribution device is positioned in the stacked topology between the first network captured traffic distribution device and the target destination, insert a VLAN tag into the data packet responsively to the determined target destination and/or transmit the data packet to the second network captured traffic distribution device. Exemplary target destinations include a monitoring device, a protocol analyzer, a flight recorder, an intrusion detection system, a media analyzer, a signaling analyzer, a web analyzer, a database analyzer, a voice signaling analyzer, an Internet protocol television (IPTV) analyzer, an application analyzer, a voice analyzer, and a forensic analyzer.

The second network captured traffic distribution device may be configured to, for example, automatically exchange configuration information with the first network captured traffic distribution device, receive the data packet transmitted from the first network captured traffic distribution device, determine the target destination of the data packet based on the VLAN tag inserted into the received data packet, and transmit the data packet toward the determined target destination.

In some embodiments, the system may further include a third network captured traffic distribution device communicatively coupled to the second network captured traffic distribution device in the stacked topology via a communication link. The third network captured traffic distribution device may be the target destination of the data packet and the third network captured traffic distribution device may be configured to, for example, determine whether the third network captured traffic distribution device is the target destination for the data packet, remove the VLAN tag from the data packet responsively to a determination that the third network captured traffic distribution device is the target destination for the data packet, and transmit the data packet, without the VLAN tag, to an external device.

BRIEF DESCRIPTION OF THE DRAWINGS

The present invention is illustrated by way of example, and not limitation, in the figures of the accompanying drawings in which:

FIGS. 3A-3C are screenshots illustrating exemplary graphical user interfaces (GUIs), in accordance with an embodiment of the present invention;

FIGS. 10A-10C are diagrams illustrating exemplary IPTV systems utilizing a stacked topology of network captured traffic distribution devices, in accordance with an embodiment of the present invention;

FIGS. 13A and 13B are diagrams illustrating exemplary data packets, in accordance with an embodiment of the present invention;

FIG. 14 is a flowchart illustrating an exemplary process for determining an optimum route through a stacked topology of network captured traffic distribution devices, in accordance with an embodiment of the present invention;

DETAILED DESCRIPTION

I. Device

Figure 1A:
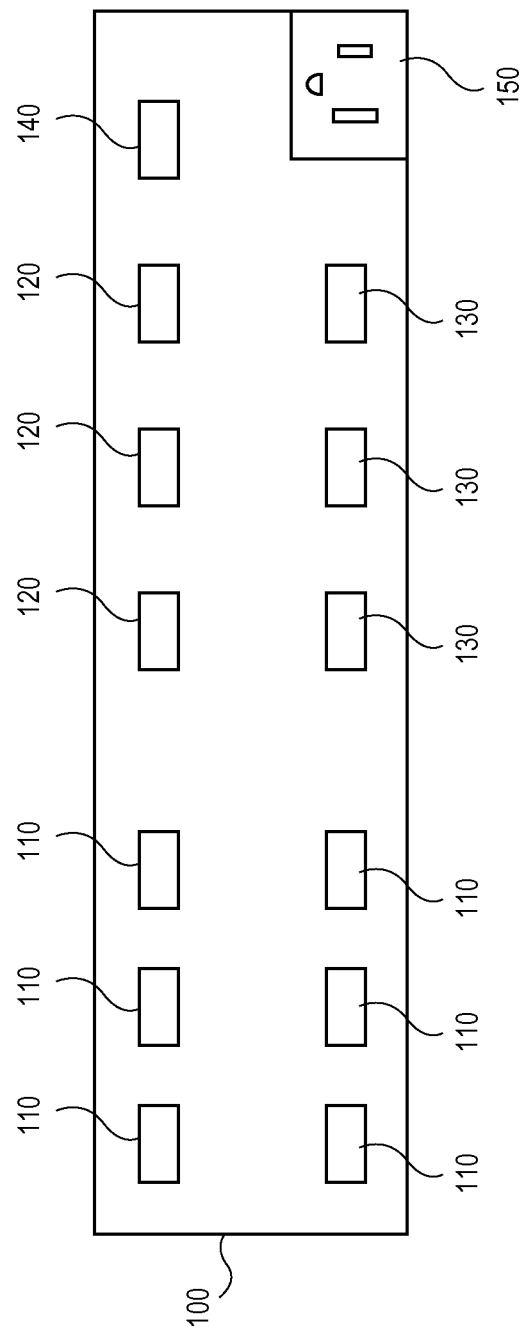
FIG. 1A is a block diagram illustrating an exemplary network captured traffic distribution device, in accordance with an embodiment of the present invention.

FIG. 1A is a block diagram illustrating an exemplary network captured traffic distribution device 100. Network capture traffic distribution device 100 may include a plurality of bidirectional ports 110, a plurality of egress ports 120, a plurality of stacking 130 ports, a management port 140, and a power input 150.

Bidirectional ports 110 may be connected, via a communication link, to one or more sources of captured network traffic and may be compatible with, for example, a 10/100 Ethernet cable, a 1 gigabit (Gb) Ethernet cable, a 10 Gb Ethernet cable, a copper cable, a fiber optic cable and/or any combination thereof. Egress port 120 may be coupled to one or more external devices such as a monitoring device, a network analyzing device, a communication device, a protocol analyzer, a flight recorder, an intrusion detection system, a media analyzer, a signaling analyzer, a web analyzer, a database analyzer, a voice signaling analyzer, an Internet protocol television (IPTV) analyzer, an application analyzer, a voice analyzer, a telecommunications analyzer, and a forensic analyzer via a communication link such as a 10/100 Ethernet cable, a 1 Gb Ethernet cable, a 10 Gb Ethernet cable, a copper cable, a fiber optic cable and/or any combination thereof. On some occasions, one or more egress ports 120 may be configured as a monitor port or network analyzer port such that it is compatible with, for example, one or more external network monitor or analysis devices. In some cases, information associated with bidirectional ports 110 and/or egress ports 120 may be provided to a user and/or administrator via a user interface such as a graphic user interface (GUI) as discussed below with regard to FIGS. 3A-3C and/or an Internet browser.

Stacking ports 130 may enable the stacking of network captured traffic distribution device 100 with one or more additional network captured traffic distribution devices arranged in a stacked topology. Stacking a network captured traffic distribution device may include, but is not limited to, an exchange of data and configuration information between two or more communicatively coupled, or stacked, network captured traffic distribution devices. Stacking port 130 may be compatible with, for example, a 10/100 Ethernet cable, a 1 Gb Ethernet cable, a 10 Gb Ethernet cable, a copper cable, a fiber optic cable, and/or any combination thereof. In some embodiments, stacking ports 130 may be similar to egress ports 120.

Power input 150 may be any appropriate device via which electrical power may be supplied to network captured traffic distribution device 100 such as, but not limited to, an electric plug or an electric cable that may be coupled to a conventional electric wall outlet.

Network captured traffic distribution device 100 may be coupled to one or more networks such as a telecommunications network, a carrier Ethernet network, a voice over Internet protocol (VoIP) network, the Internet, a local area network (LAN), and/or a wireless LAN (WLAN) via one or more bidirectional ports 110 and/or egress ports 120.

Management port 140 may be coupled directly and/or indirectly to a user and/or administrator (i.e., a device accessible to/employed by such an individual) of network captured traffic distribution device 100 and/or a stacked topology of which network captured traffic distribution device 100 is a member. Instructions and/or information may be received by network captured traffic distribution device 100 via management port 140. Additionally or alternatively, configuration information associated with network captured traffic distribution device 100 and/or one or more functions performed by network captured traffic distribution device 100 may be accessed or managed via a graphical user interface (GUI) such as GUI 300, 301 and/or 302 as discussed below with regard to FIGS. 3A through 3C.

Figure 1B:
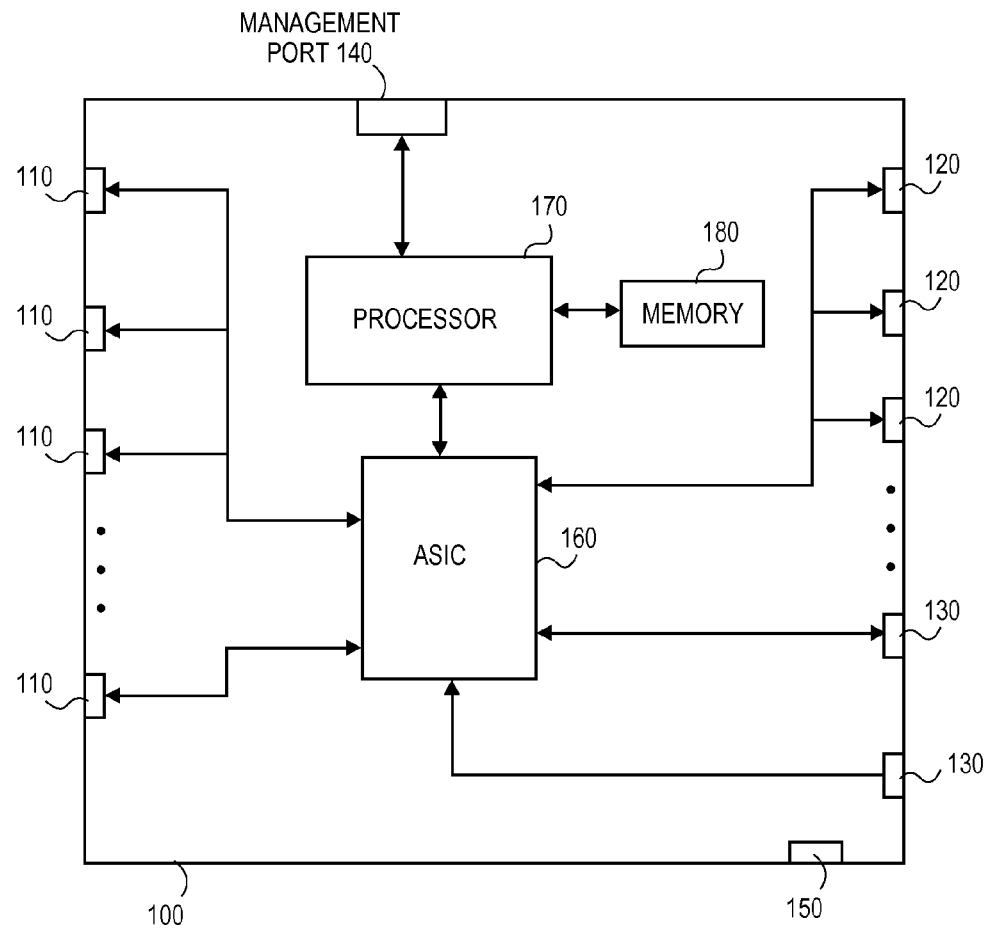
FIG. 1B is a block diagram further illustrating an exemplary network captured traffic distribution device, in accordance with an embodiment of the present invention.

FIG. 1B is a block diagram of a network captured traffic distribution device 100 configured in accordance with an embodiment of the present invention. Network captured traffic distribution device 100 includes bidirectional ports 110, management port 140, egress ports 120, stacking ports 130 and power input 150. Bidirectional ports 110 may be connected to an application specific integrated circuit (ASIC) 160. ASIC 160 may be configured to distribute captured network traffic through network captured traffic distribution device 100. In some embodiments, ASIC 160 may be one or more analog or electric field effect transistor switches. ASIC 160 may further be configured to perform one or more switching functions thereby facilitating the switching and/or distribution of captured network traffic through network captured traffic distribution device 100 and/or the echoing of captured network traffic via one or more bidirectional ports 110. ASIC 160 may be coupled to a processor 170. Processor 170 may be any appropriate computer-processing device or devices such as a microprocessor, digital signal processor or similar device.

Processor 170 may be configured (e.g., under the control of suitable computer-executable instructions) to manage the distribution of received captured network traffic through the network captured traffic distribution device 100 and may be coupled to one or more data storage devices or memories 180. Distribution management executed by processor 170 may include, for example, the management of a flow of received captured traffic through network captured traffic distribution device 100 and/or a stacked topology that includes network captured traffic distribution device 100. Optionally, the distribution management may include, for example, determining a target destination for received captured network traffic; pre-calculating at least one route for the transmission of received captured network traffic from network captured traffic distribution device 100, through the stacked topology, to a target destination; determining an optimum route for the transmission of captured network traffic from network captured traffic distribution device 100, through the stacked topology, to a target destination; load balancing a distribution of received captured traffic through network captured traffic distribution device 100 and/or the stacked topology, load spreading a distribution of received captured traffic through network captured traffic distribution device 100 and/or the stacked topology and evaluating the current operating conditions of the stacked topology.

In some cases, processor 170 may also be configured to groom received captured traffic. Grooming received captured traffic may include, for example, filtering received captured network traffic transmitted through network captured traffic distribution device 100 and/or the stacked topology according to one or more criteria, aggregating received captured network traffic with the same target destination, and modifying the content of one or more data packets included in the received captured traffic. Exemplary modification of the content of a data packet include adding data to the data packet, subtracting data from the data packet, truncating the data packet, and modifying data included in the data packet.

The processor 170 may further be configured to enable peer-to-peer communication and/or peer-to-peer management between network captured traffic distribution device 100 and an additional stacked network captured traffic distribution device included in a stacked topology. In some instances, processor 170 may be enabled to manage the distribution of received captured network traffic through a stacked topology of network captured traffic distribution devices.

Memory 180 may be coupled, directly or indirectly, to processor 170 and/or ASIC 160 and may store one or more instructions executable by processor 170 and/or ASIC 160. Memory 180 may be configured to store an Internet protocol (IP) address assigned to network captured traffic distribution device 100. In some embodiments, the IP address assigned to network captured traffic distribution device 100 may be unique for each individual network captured traffic distribution device present in a stacked topology. Memory 180 may further store, for example, configuration information associated with network captured traffic distribution device 100, data regarding captured network traffic received by network captured traffic distribution device 100, and the distribution and/or management of received captured network traffic by network captured traffic distribution device 100.

One or more stacking ports 130 may be configured to enable network captured traffic distribution device 100 to be stacked and/or communicatively coupled to at least one additional network captured traffic distribution device in a stacked topology. Exemplary configurations for stacked topologies include, but are not limited to, a ring topology, a mesh topology, a star topology, a topology of single links, a topology of multiple links, a topology including one or more redundant links, and/or any combination thereof. In some cases, stacking ports 130 may be configured as a monitoring port and may be compatible with one or more external devices.

When two or more network captured traffic distribution devices 100 are communicatively coupled, or stacked, in a topology, configuration information resident in one or more of network captured traffic distribution devices 100 may be exchanged between the two or more network captured traffic distribution devices 100. Exemplary configuration information may relate to, for example, the operation of the network captured traffic distribution device, the stacked topology, and/or a device or network coupled to the network captured traffic distribution device. For example, configuration information may include operational statistics associated with network captured traffic distribution device 100 such as an available ingress or egress transmission speed, a number of ports available, a level of congestion for ingressing or egressing traffic, and an indicator of whether network captured traffic distribution device 100 is fully or partially operational.

Optionally, configuration information may also include instructions regarding the determination of a target destination, such as an external device and/or an egress port resident in the network captured traffic distribution device for captured network traffic. On some occasions, configuration may relate to the pre-calculation of at least one route for the transmission of received captured network traffic from a location, such as a source of network captured network traffic, network captured traffic distribution device 100, or a port resident in network captured traffic distribution device 100, through the stacked topology, to a target destination or the retrieval of one or more pre-calculated routes from a data source such as memory 180 or an external device.

Configuration information may also relate to the determining an optimum route for the transmission of captured network traffic through the stacked topology to a target destination, load balancing a distribution of received captured traffic through the network captured traffic distribution device and/or stacked topology, load spreading a distribution of received captured traffic through the network captured traffic distribution device and/or stacked topology, grooming received captured traffic according to one or more criterion, filtering received captured network traffic according to one or more criterion, aggregating the received captured network traffic according to one or more criterion, and evaluating current operating conditions of the stacked topology and/or devices coupled to the stacked topology.

Figure 2:
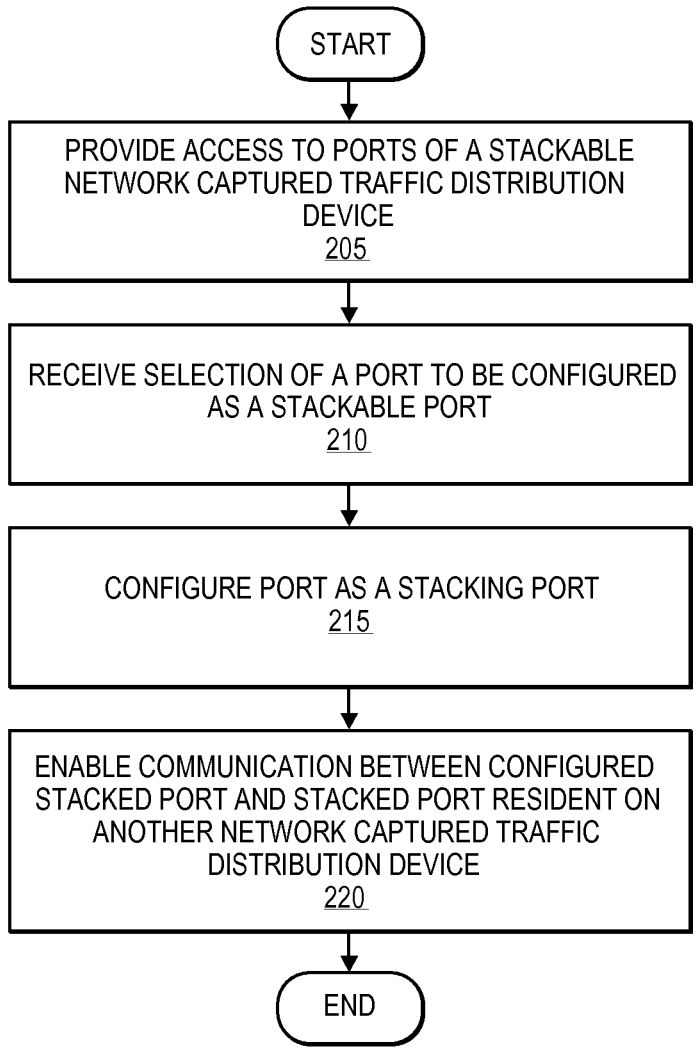
FIG. 2 is a flowchart illustrating an exemplary process for configuring a network captured traffic distribution device to operate within a stacked topology, in accordance with an embodiment of the present invention.

FIG. 2 is a flowchart illustrating an exemplary process 200 for the configuration of one or more ports resident in a stackable network captured traffic distribution device, such as network captured traffic distribution device 100, as a stacking port. Execution of process 200 may enable the stacking of the network captured traffic distribution device with one or more additional network captured traffic distribution devices. Process 200 may be executed by any of the systems and/or devices described herein and may be executed via, for example, a command line interface, a GUI like GUIs 300-302 as discussed below with reference to FIGS. 3A-3C, and/or instructions provided via, for example, management port 140 a GUI.

In step 205, access to one or more ports of the network captured traffic distribution device may be provided to a user and/or administrator, wherein at least one of the ports is a stacking port. Access may be provided via, for example, physical access to the ports, a processor resident in the network captured traffic distribution device, like processor 170, a management port, like management port 140 and/or a display device such as video monitor and/or a computer monitor. Access to the one or more ports may be facilitated by a network, such as a LAN, a WLAN, or the Internet. In Internet applications, access to the one or more ports may be facilitated by via an Internet browser using, for example, a unique IP address associated with the network captured traffic distribution device. In some cases, access to the ports may be provided via an interactive list displayed on a GUI, such as GUI 300-302 as discussed below with regard to FIGS. 3A-3C.

Then, in step 210, a selection of a port to be configured as a stackable port may be received. This selection may be received from a user and/or administrator via the medium by which access to the ports is provided. Such a selection may be made by, for example, physically connecting a port to a communication link and/or additional network captured traffic distribution device or selecting a port provided via a GUI. In some cases, process 200 may also include receiving an instruction to associate a function with at least one port of the network captured traffic distribution device and associating the selected function with the at least one port according to the received instruction.

Next, in step 215, the selected port may be configured as a stacking port. Step 215 may be executed by the network captured traffic distribution device. Then, in step 220, communication between the configured stacking port and a stacking port resident on an additional network captured traffic distribution device may be enabled. This may be enabled by, for example, the turning on of the communication, and/or the completion of a physical coupling between the two network captured traffic distribution devices and/or the selection or finalization of a selection by a user when selecting a port to be configured as a stackable port via, for example, a GUI. Once communication between the two stacking ports is established, the network captured traffic distribution device forms a stacked topology with the additional network captured traffic distribution device or becomes a member of an existing stacked topology including the additional network captured traffic distribution device. Following step 220, process 200 may end.

Figure 3A:
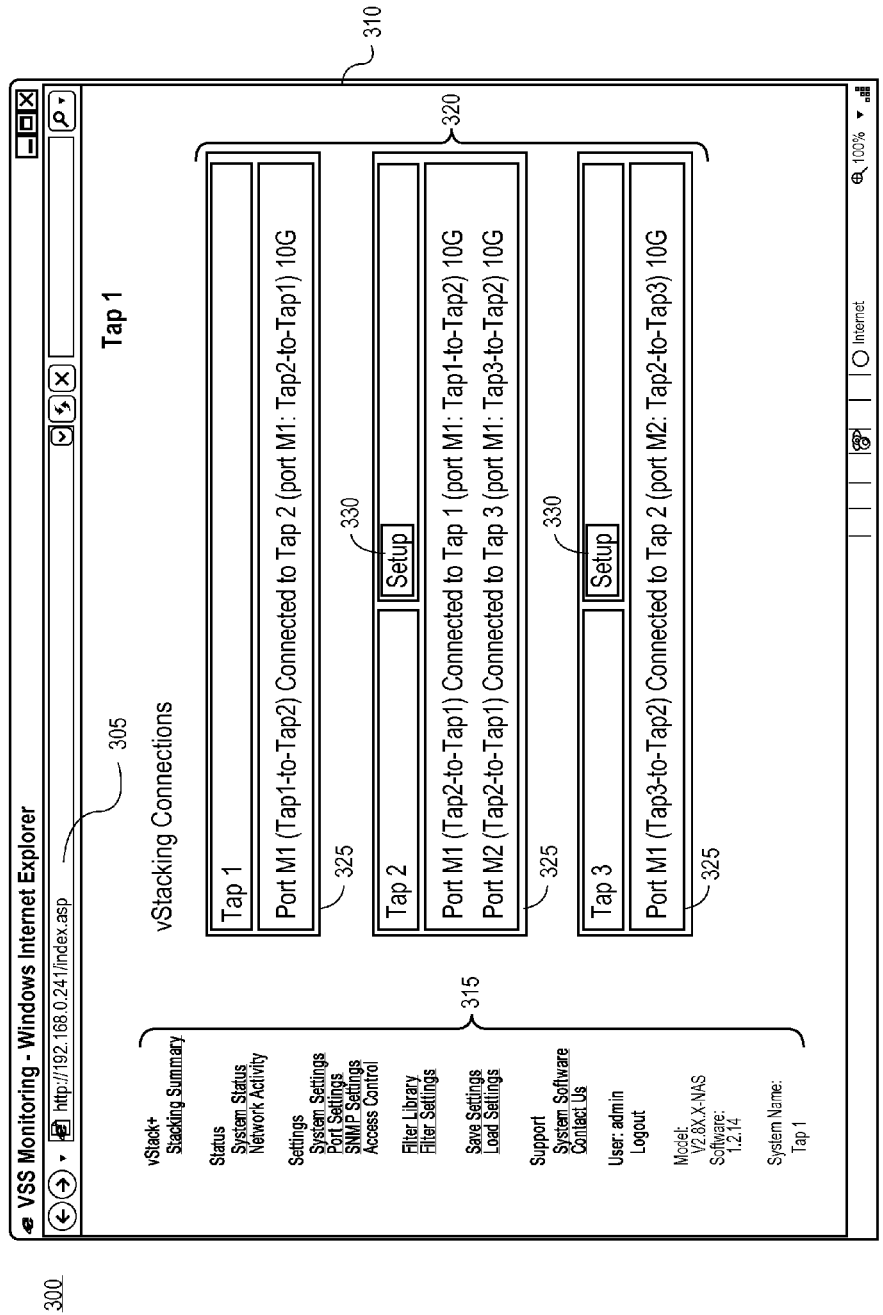
Figure 3B:
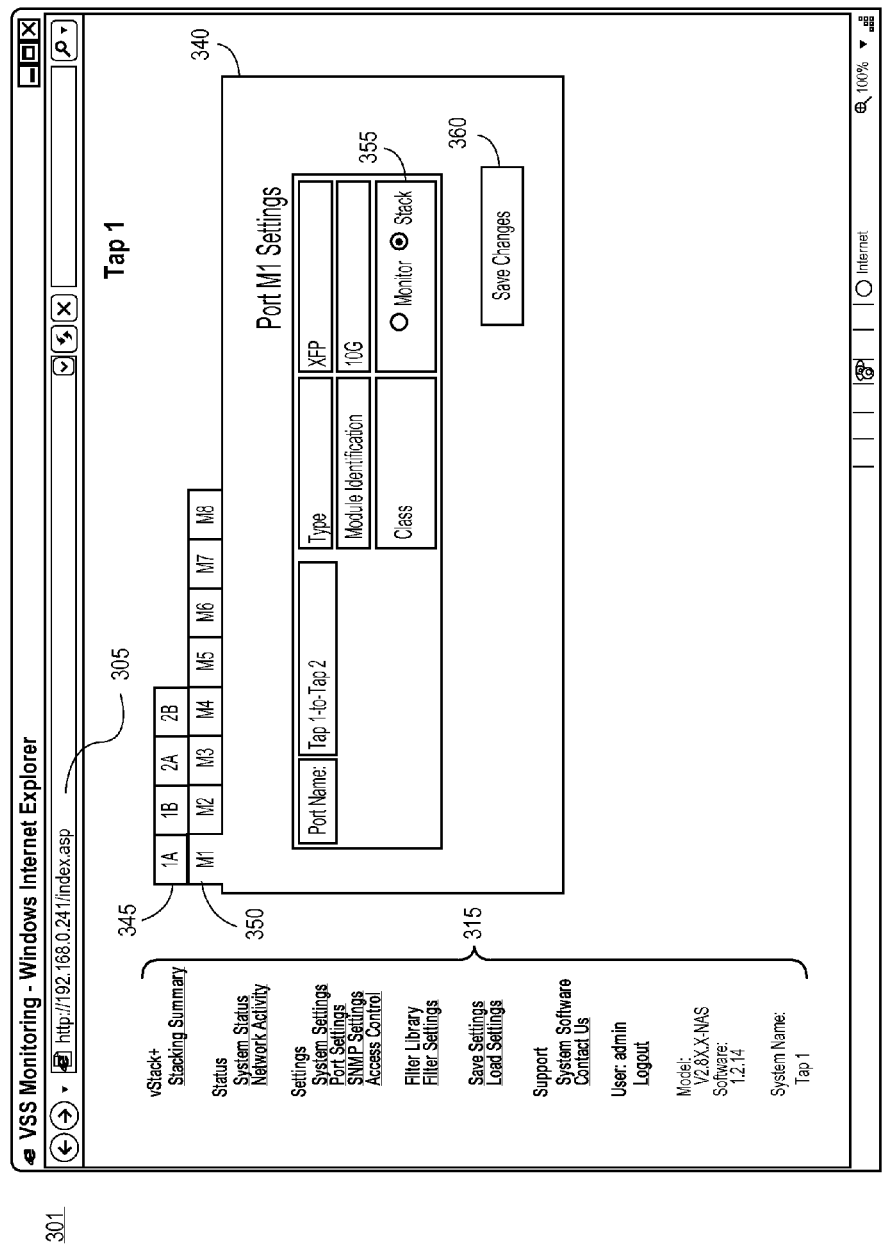
Figure 3C:
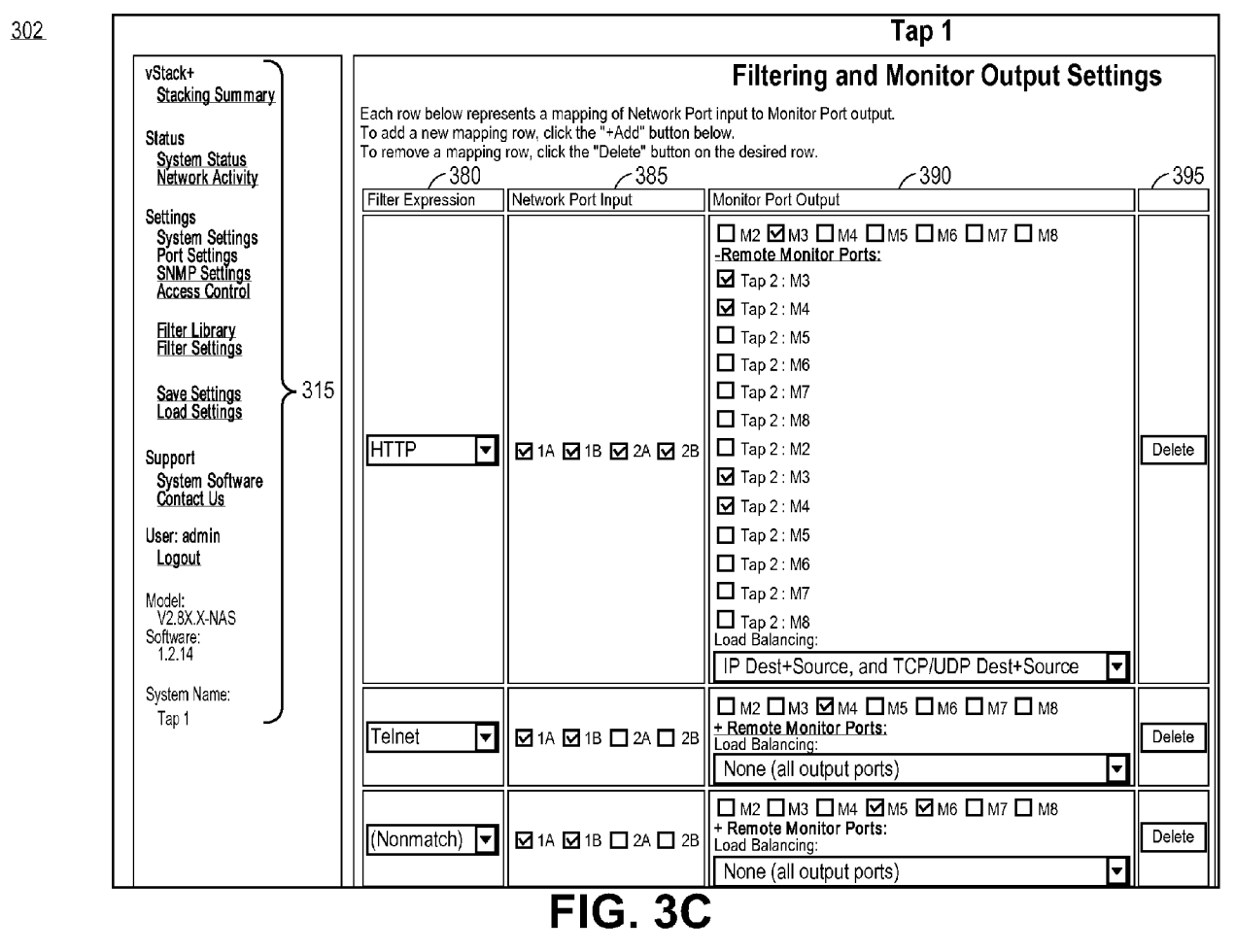

FIGS. 3A through 3C are screenshots of exemplary GUIs 300-302 that may be used to stack, or communicatively couple, two or more network captured traffic distribution device like network captured traffic distribution device 100 in a stacked topology, and/or add the network captured traffic distribution device to an existing stacked topology. In some embodiments, GUIs 300-302 may be used to facilitate (e.g., through manipulation of the graphical elements rendered therein or provision of information therethrough) any of the processes described herein.

FIG. 3A illustrates an exemplary GUI 300 that includes a status summary for three network captured traffic distribution devices like network captured traffic distribution device 100 that are included in a stacked topology. At the top of GUI 300 is a dialog box 305 indicating an exemplary IP address for one of the network captured traffic distribution devices included in the stacked topology. Window 310 includes information relevant to the stacked topology such as an interactive menu 315 of options and/or functions available via GUI 300 and an interactive list 320 of network captured traffic distribution devices included in the stacked topology.

Interactive menu 315 may include multiple options relating to use of GUI 300 such that selection of a menu item displayed in interactive menu 315 may initiate the display of various additional GUIs relating to the selected menu option. Exemplary options included in interactive menu 315 relate to the status of a network topology, the settings of a network topology including, but not limited, to system settings, port settings, simple network management protocol (SNMP) settings, access control settings, filter settings, a filter library, an option to save settings and an option to load setting. Interactive menu 315 may also include selectable options relating to technical assistance or support, such as help software, available to a user of the network captured traffic distribution device and a link to contact a support service for the network captured traffic distribution device. Interactive menu 315 may also include an option for a user and/or administrator to log in and/or log out of GUI 300, the network captured traffic distribution device, and/or the stacked topology and may also include model and/or software identifying information relevant to the network captured traffic distribution device.

Interactive list 320 may include one or more boxes or windows of information relating to one or more network captured traffic distribution devices included in the stacked topology. For example, interactive list 320 includes a listing of information related to a network captured traffic distribution device 1 which indicates that port M1 connects network captured traffic distribution device 1 to network captured traffic distribution device 2 325. Likewise, similar information is displayed for network captured traffic distribution devices 2 and 3.

FIG. 3B illustrates an exemplary GUI 301 that includes selectable options that enable access to port settings for a selected network captured traffic distribution device. GUI 301 includes dialog box 305 indicating an exemplary IP address for one of the network captured traffic distribution devices included in the stacked topology and interactive menu 315.

GUI 301 further includes and a window 340 displaying a list of selectable tabs 345 relating to ingress or bidirectional ports, like bidirectional ports 110 associated with a network captured traffic distribution device and a list of selectable tabs 350 relating to egress and/or monitoring ports, like egress ports 120 associated with the network captured traffic distribution device. By selecting one of the tabs provided in lists 345 and/or 350 a user may access information related to the port associated with the selected tab. This information may include, for example, an ingressing and/or egressing port speed, port identifying information, a port type, a port class and a selectable stacking option 355 which may enable the port to be configured as either a monitor port or a stacking port. For example, when port M1 is selected from list 350, information associated with port M1 is displayed in window 340. Window 340 may further include a save button 360 that, when selected, initiates the saving of any changes to the configuration of the port.

FIG. 3C is a screenshot of an exemplary GUI 302 showing an interactive list of ports available on a network captured traffic distribution device and an interactive list of functions that may be associated with one or more ports provided in the interactive list of ports. GUI 302 may include interactive menu 315, a list of available filters 380, a list 385 of bidirectional ports, a list 390 of egress/monitor ports and a plurality of delete options 395.

Exemplary filter list 380 may include one or more drop down boxes that may include various selectable filtering options, such as a filter for HTTP traffic, telnet traffic, and/or non-match received captured traffic. Additional functions that may be included in filter list 380 and/or on a separate selectable list provided via GUI 302 include, but are not limited to, determining a target destination for received captured traffic, pre-calculating a route for the transmission of received captured traffic from the network captured traffic distribution device, through the stacked topology, to a target destination, determining an optimum route, load balancing a distribution of received captured traffic through the stacked topology, load spreading a distribution of received captured traffic through the stacked topology, grooming the received captured traffic according to one or more criteria, filtering the received captured traffic, and aggregating received captured traffic transmitted through the stacked topology.

Bidirectional port list 385 may include selectable options for one or more bidirectional ports included in the network captured traffic distribution device and egress/monitor port list 390 may include a list of egress/monitor ports included in the network captured traffic distribution device and/or an additional network captured traffic distribution devices available or connected to network topology. Selection of a delete option 395 may initiate the deletion of one or more selectable options available via GUI 302.

II. Stacked Topology

Figure 4:
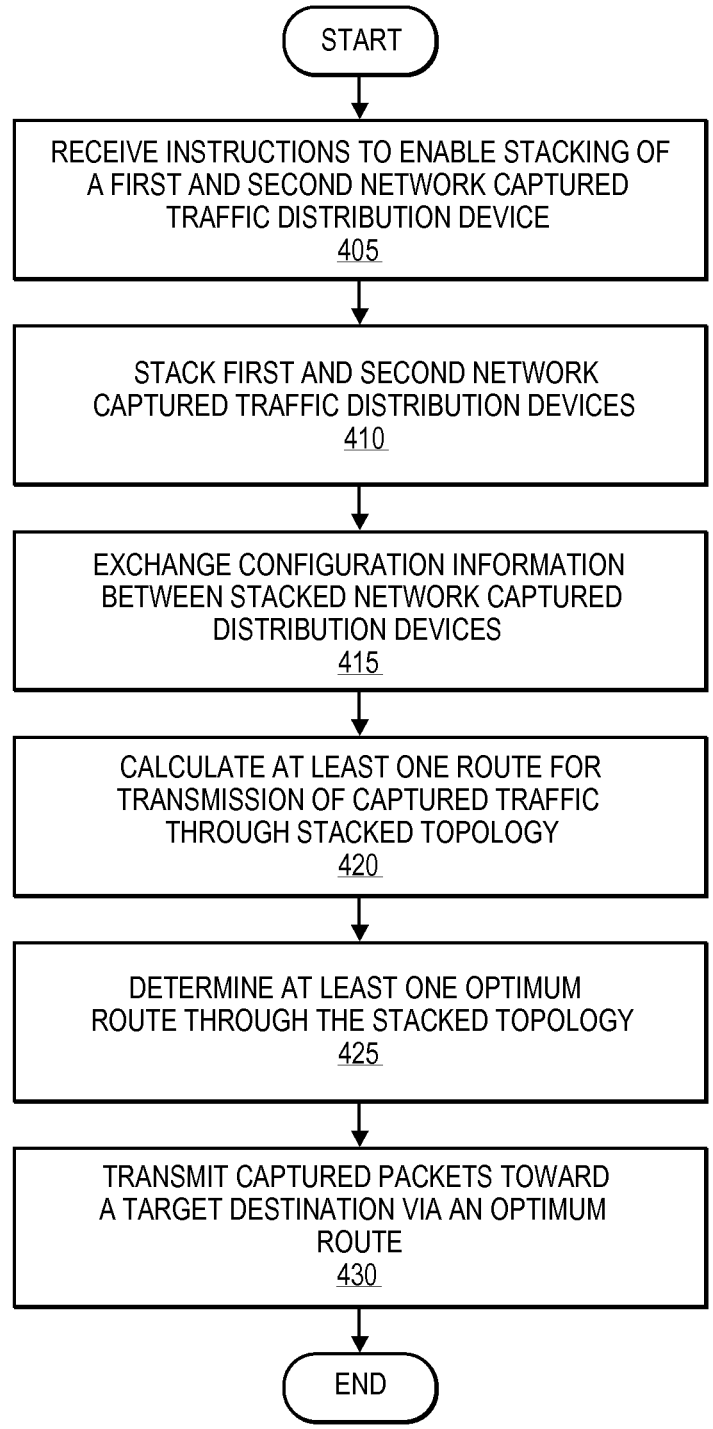
FIG. 4 is a flowchart illustrating an exemplary process for stacking two or more network captured traffic distribution devices in order to form a stacked topology, in accordance with an embodiment of the present invention.

FIG. 4 is a flowchart illustrating an exemplary process 400 for establishing or setting up a stacked topology of two or more network captured traffic distribution devices, like network captured traffic distribution device 100 and/or adding a network captured traffic distribution device to an existing stacked topology. Process 400 may be executed by any of the systems and/or devices described herein.

In step 405, instructions to enable the stacking of a first and second network captured traffic distribution device may be received by, for example, a first network captured traffic distribution device, such as network captured traffic distribution device 100, or a processor, such as processor 170. The instructions of step 405 may be received from, for example, a user or administrator via, for example, a GUI such as GUIs 300, 301 and/or 302, a memory in communication with the processor, such as memory 180, and/or a physical link between the first and second network captured traffic distribution devices.

Then, in step 410, the first and second network captured traffic distribution devices may be stacked and/or communicatively coupled according to the instructions received in step 405. The stacking of the first and second network captured traffic distribution device may form a new stacked topology or add the first network captured traffic distribution device to an existing stacked topology including the second network captured traffic distribution device. Exemplary stacked topology configurations include a ring topology, a mesh topology, a star topology, a topology of single links, a topology of multiple links, a topology including one or more redundant links and/or any combination thereof.

Next, in step 415, configuration information may be exchanged between the first and second network captured traffic distribution devices and/or between the first network captured traffic distribution device and the stacked topology of network captured traffic distribution devices. The configuration information exchanged may include, for example, instructions regarding a determination of a target destination for received captured network traffic, a pre-calculation of one or more routes for the transmission of received captured network traffic from the first network captured traffic distribution device, through the stacked topology, to a target destination, and a determination of an optimum route for the transmission of received captured network traffic from the first network captured traffic distribution device, through the stacked topology, to a target destination.

Exchanged configuration information may also include instructions regarding the grooming of received captured network traffic. Grooming received captured network traffic may include manipulating a traffic flow of received captured traffic and/or a data packet included in the traffic flow of received captured traffic according to one or more instructions or criterion. For example, grooming received network traffic may include removing unwanted information from one or more data packets included in the received captured network traffic, truncating one or more data packets included in the received captured network traffic, filtering the received captured network traffic according to a criterion, aggregating data packets and/or sets of data packets included in the received captured network traffic, altering the content of the received captured network traffic, modifying a data packet included in the received captured traffic so that it is compatible with one or more external devices, truncating one or more data packets included in the received captured network traffic, adding information to one or more data packets included in the received captured network traffic, and subtracting information from one or more data packets included in the received captured network traffic.

Exchanged configuration information may further include instructions regarding load balancing a distribution of the received captured network traffic through a network captured traffic distribution device and/or stacked topology and load spreading a distribution of the received captured network traffic through a network captured traffic distribution device and/or stacked topology.

Exchanged configuration information may also include information regarding the capabilities, such as current operating conditions, of the first or second network captured traffic distribution device, a communication link between the first and second network captured traffic distribution device, and a stacked topology including the second network captured traffic distribution device. For example, exchanged configuration information may include information regarding the link speed of a port included in the first or second network captured traffic distribution device or a communication link between the first and second network captured traffic distribution device, a number of ports included in the first and/or second network captured traffic distribution device, configuration information associated with a port of the first or second network captured traffic distribution device, routing information, and information regarding a failure or error within the stacked topology and/or first or second network captured traffic distribution device.

Next, in step 420, one or more routes for the transmission of captured network traffic from the first network captured traffic distribution device, through the stacked topology, to a target destination may be determined or calculated. Exemplary target destinations include another network captured traffic distribution device included in the stacked topology, external devices, monitoring devices, protocol analyzers, flight recorders, intrusion detection systems, media analyzers, signaling analyzers, web analyzers, database analyzers, voice signaling analyzers, IPTV analyzers, application analyzers, voice analyzers and forensic analyzers. In some embodiments, received captured traffic may be groomed prior to its transmission toward its target destination. Then, in step 425, at least one optimum route through the stacked topology may be determined. Further details regarding the determination of an optimum route are provided below with regard to FIGS. 14 and 15.

Finally in step 430, the received captured network traffic may be transmitted from the first network captured traffic distribution device toward a target destination via, for example, the determined optimum route of step 425. Following step 430, process 400 may end.

Figure 5A:
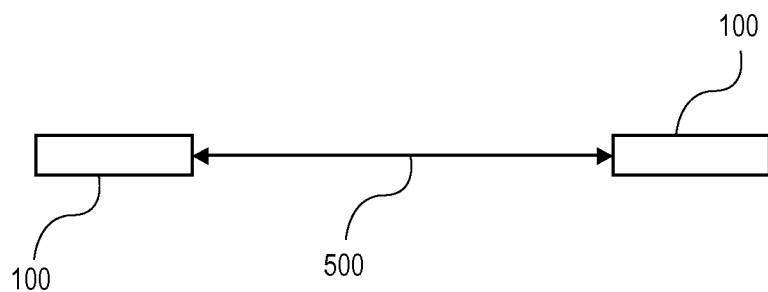
FIGS. 5A-5E are block diagrams depicting exemplary stacked topologies of network captured traffic distribution devices, in accordance with embodiments of the present invention.

FIGS. 5A through 5E are block diagrams illustrating exemplary stacked topologies of network captured traffic distribution devices, like network captured traffic distribution device 100. FIG. 5A illustrates an exemplary stacked topology 501 of two network captured traffic distribution devices 100 communicatively coupled, or stacked, via a communication link 500. Communication link 500 may be wired or wireless and may be enabled to facilitate communication between the network captured traffic distribution devices 100. For example, communication link 500 may be a wireless link capable of transmitting network traffic at a rate of, for example, 1 or 10 Gb/s or a wired link such as a 10/100 Ethernet cable, a 1 Gb Ethernet cable, a 10 Gb Ethernet cable, a copper cable, and/or a fiber cable.

Figure 5B:
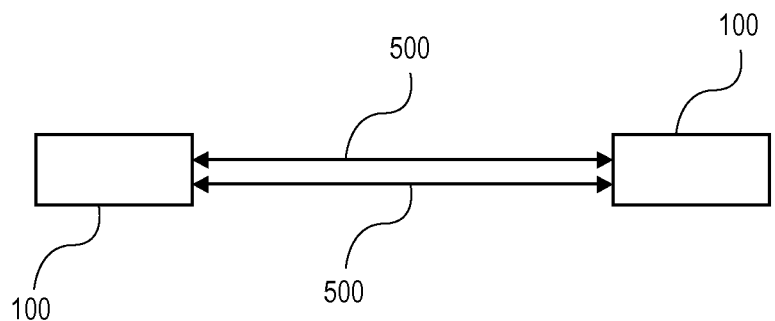

FIG. 5B illustrates an exemplary stacked topology 502 of two network captured traffic distribution devices communicatively coupled via two communication links 500. In stacked topology 501, communication links 500 may link two separate stacking ports resident on each of network captured traffic distribution devices 100 and, on some occasions, communication links 500 may be redundant and/or communication along communication links may be similar or redundant.

Figure 5C:
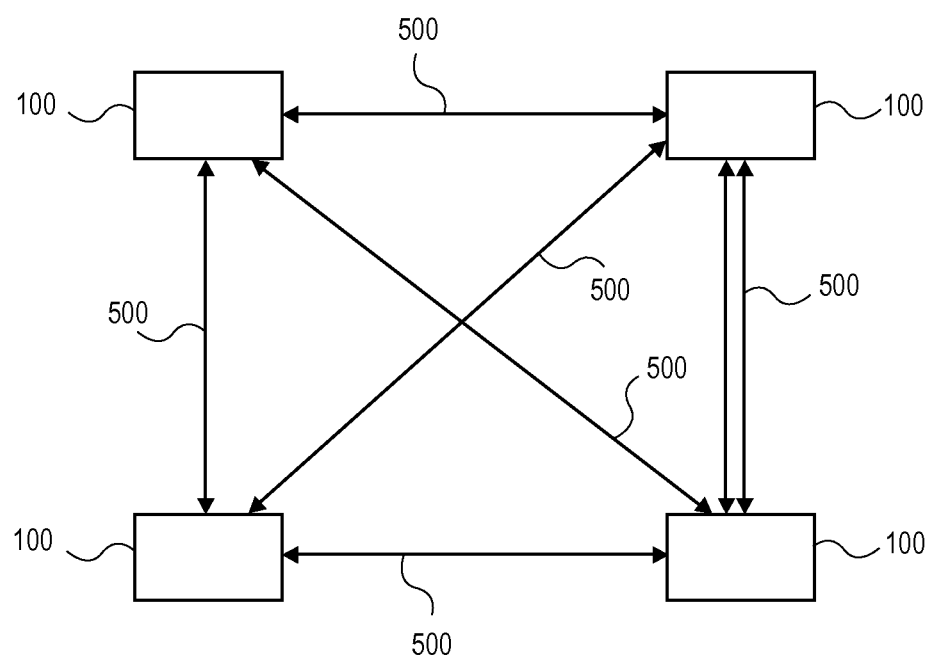

FIG. 5C illustrates network captured traffic distribution devices 100 arranged in an exemplary complex, or mesh, stacked topology 503. Complex, or mesh, stacked topology 503 includes four network captured traffic distribution devices 100 coupled via multiple communication links 500 such that every network captured traffic distribution device 100 is communicatively coupled, directly and/or indirectly, to every other network captured traffic distribution device 100 included in stacked topology 503.

Figure 5D:
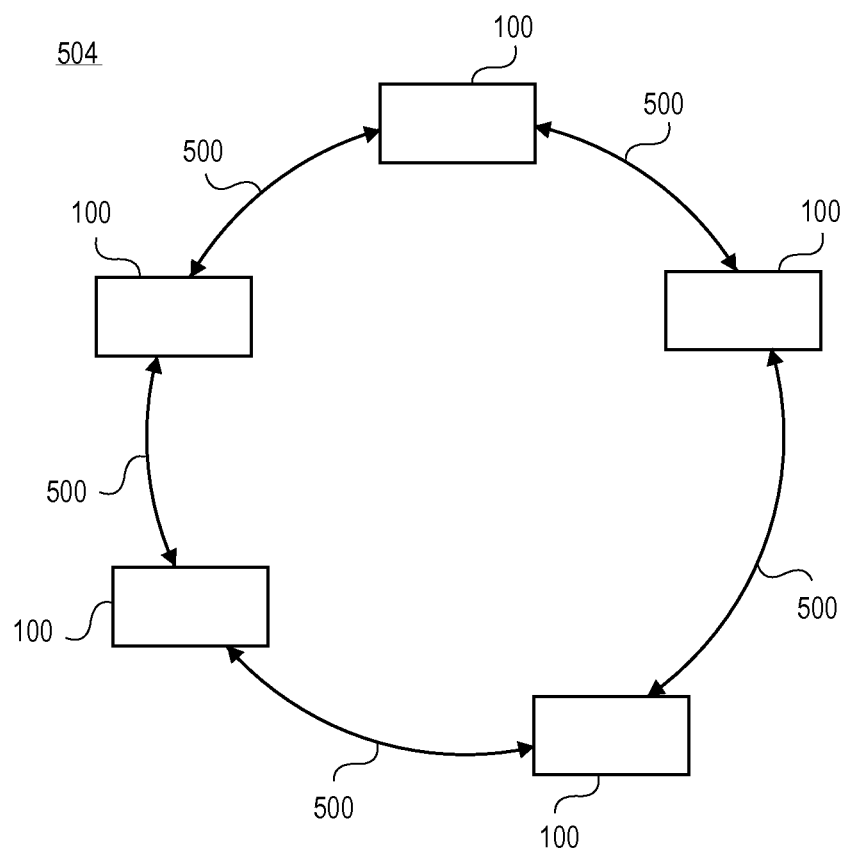

FIG. 5D illustrates network an exemplary ring stacked topology 504 wherein five network captured traffic distribution devices are communicatively coupled to one another in a round-robin or ring configuration arrangement via communication links 500.

Figure 5E:
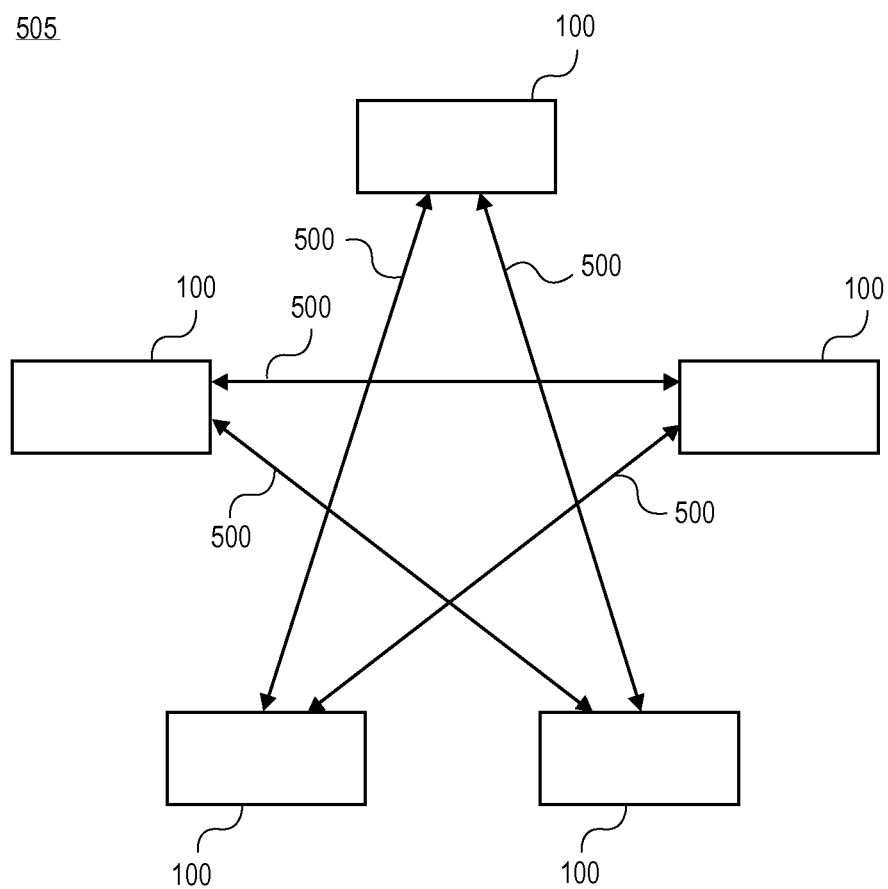

FIG. 5E illustrates an exemplary star stacked topology 505 wherein five network captured traffic distribution devices 100 are communicatively coupled to one another in a star shaped arrangement via communication links 500.

Figure 6A:
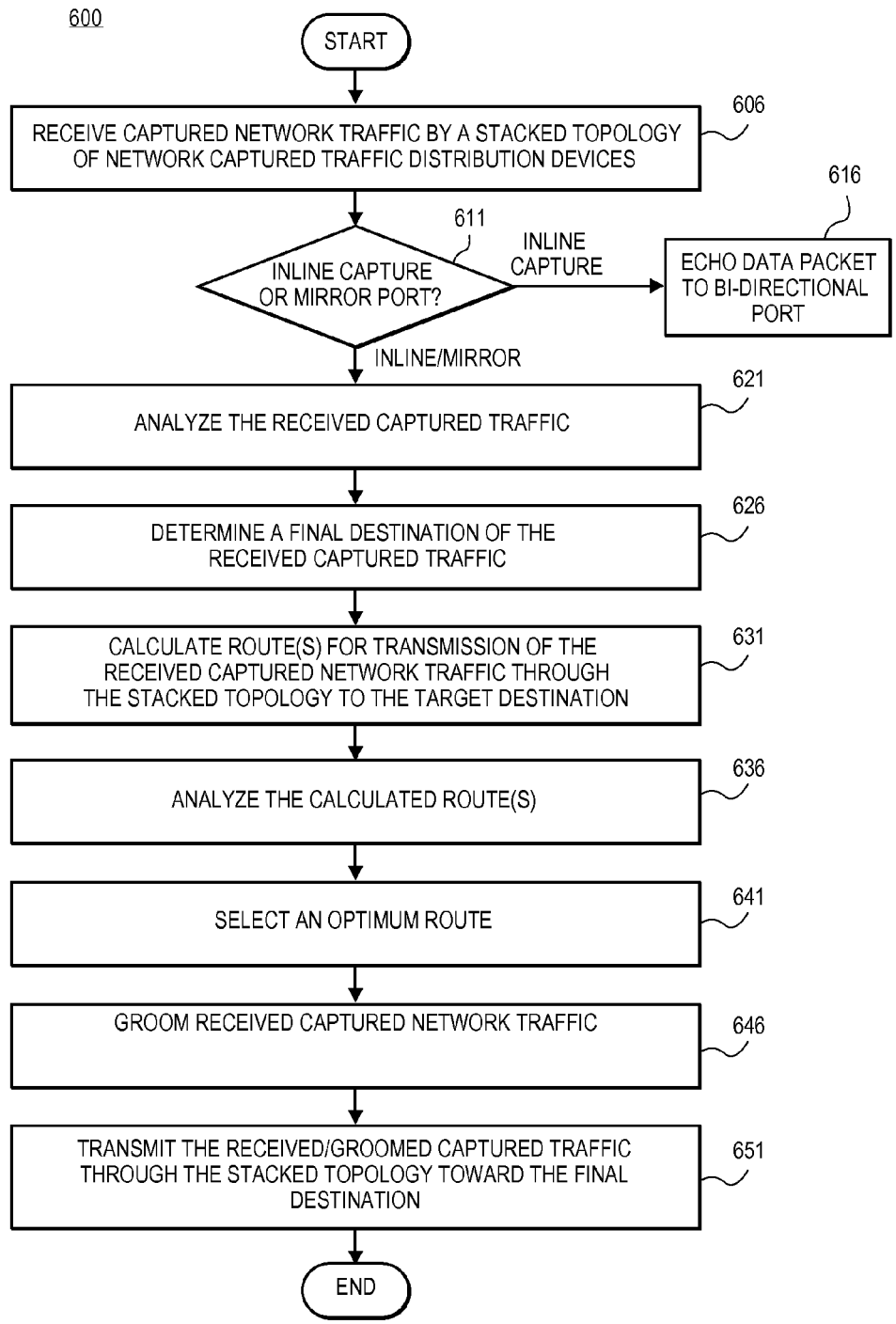
FIG. 6A is a flowchart illustrating an exemplary process for the transmission of captured network traffic via a stacked topology, in accordance with an embodiment of the present invention.

III. Use of Stacked Topology as a Layer Intervening Between Communication Infrastructure and External Device Layers FIG. 6A illustrates a process 600 for the transmission of captured network traffic via a stacked topology using a layered approach. Process 600 may be executed by, for example, any system or device disclosed herein.

In step 1606, captured network traffic may be received by, for example, a network captured traffic distribution device included in a stacked topology, like network captured traffic distribution device 100. The captured traffic may be received from one or more sources and, in step 611, it may be determined whether the source of the received captured network traffic is, for example, an inline traffic capture point, such as inline captured traffic point 665 or a mirror port, such as mirror port 660 (see FIG. 6B). When the captured network traffic is received via an inline capture point, the received captured network traffic may be echoed to a bidirectional port, such as bidirectional port 110, for eventual transition to, for example, a communication device intended to receive the network traffic prior to its capture (step 616).

Whether the network captured traffic is received via an inline capture point or a mirror port, the received captured traffic may be analyzed according to, for example, one or more criteria (step 621). The analysis of step 621 may include determining whether a VLAN tag was inserted into a captured network data packet included in the received captured network traffic, as discussed below with regard to process 1200 and FIG. 12. Then, in step 626, a target destination of the received captured traffic may be determined based on, for example, the analysis of step 621. In some cases, received captured traffic may have multiple target destinations such as multiple external devices.

Next, in step 631, one or more routes for the transmission of the received captured network traffic from the network captured traffic distribution device, through the stacked topology, to the target destination determined via, for example, step 626 may be determined. The determined routes may then be analyzed (step 636) and an optimum route may be selected (step 641) based on, for example, the analysis of step 636. Further details regarding the analysis of step 636 and the selection of an optimum route (step 641) are provided below in processes 1400 and 1500 as discussed with regard to FIGS. 14 and 15.

On some occasions, the received captured traffic may be groomed and/or modified according to one or more criteria or instructions (step 646). Finally, in step 651, the received and/or groomed captured traffic may be transmitted from the network captured traffic distribution device through the stacked topology toward the target destination. Following step 651, process 600 may end.

Figure 6B:
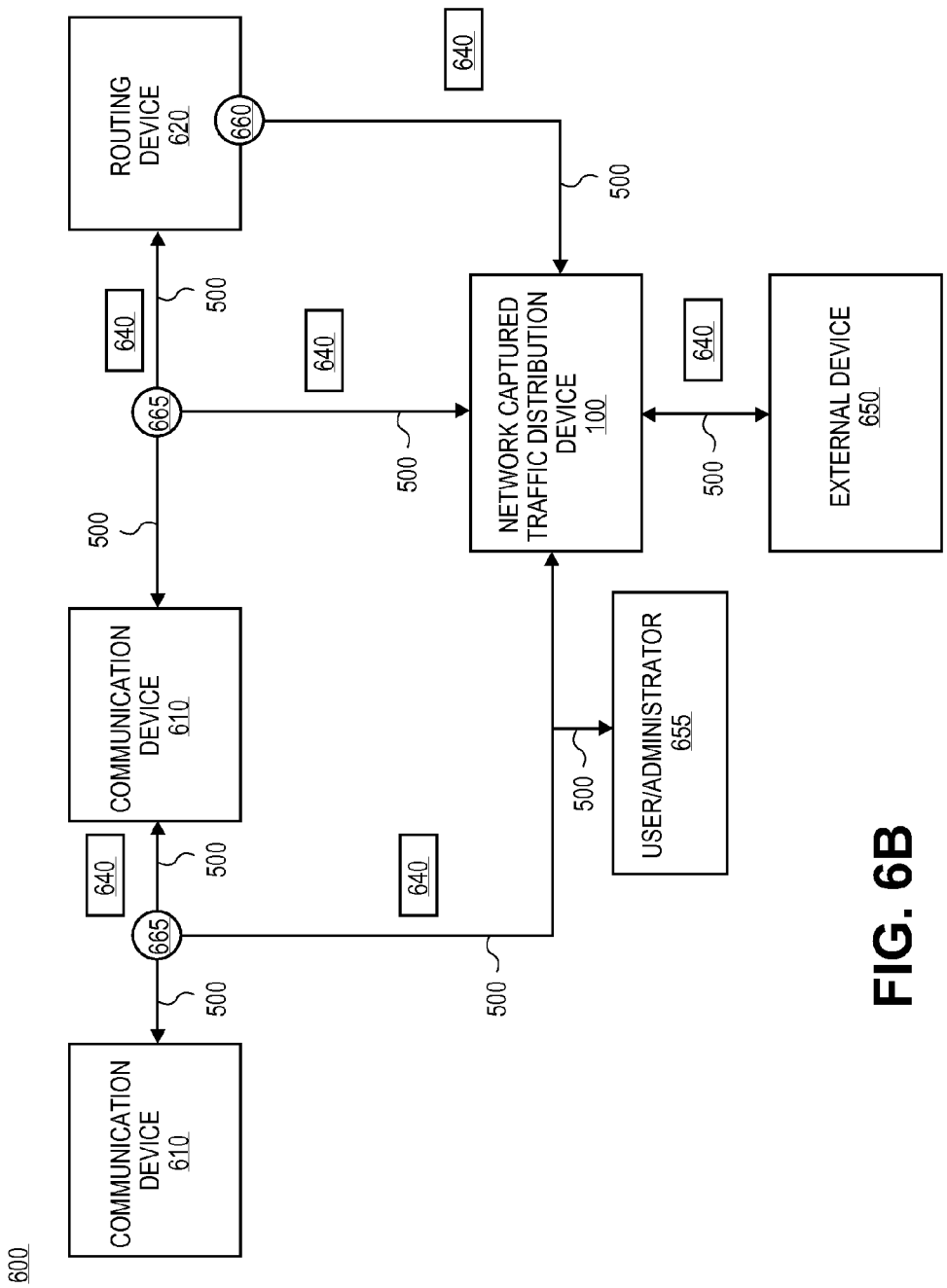
FIG. 6B is a block diagram illustrating an exemplary system for capturing network traffic, in accordance with an embodiment of the present invention.

FIG. 6B is block diagram depicting a network communication system 600. System 600 may be, for example, any network system capable of transmitting and/or receiving data packets. In one embodiment, system 600 is a telecommunication system such as a Global System for Mobile communication (GSM) system or a multi-protocol label switching (MPLS) system. In some embodiments, system 600 may be Gateway General Packet Radio Service (GPRS) system, an Enhanced Data Rates for GSM Evolution (EDGE) system, an Enhanced GPRS (EGPRS) system, an International Mobile Telecommunications-2000 (IMT-2000) system, an IMT Single Carrier (IMT-SC) system, an Universal Mobile Telecommunications System (UMTS) system, a Long Term Evolution (LTE) system, a Code Division Multiple Access (CDMA) system, a system compliant with the IEEE 802.1 Q standard for configuring virtual LANs (VLAN), or a system enabled to transmit and/or receive data packets including VLAN tags. System 600 may also be, for example, a carrier Ethernet system, an IPTV system, a network security system, and/or a VoIP system.

System 600 may include two or more communication devices 610 coupled to one another via communication links 500. Communication devices 610 may be any device capable of generating, receiving, transmitting, and/or forwarding network traffic or a data packet, such as data packet 640 to, for example, another communication device 610 and/or a routing device 620 via communication link 500. Exemplary communication devices 610 include personal computers, mobile computing devices, and mobile telephones. Data packet 640 may be any type of data packet or amount of data transmitted via system 600. Communication device 610 may also receive data packet 640 via communication link 500 from another communication device 610 and/or routing device 620. Routing device 620 may be any router enabled to route data packets through communication system 600.

One or more communication devices 610 may be coupled to a network captured traffic distribution device 100 via communication link 500. Exemplary network captured traffic distribution devices 100 include network captured traffic distribution devices, network taps, network bypass devices, network fail-safe devices, link bypass appliances, and firewalls.

Network captured traffic distribution device 100 may also be communicatively coupled so as to provide information to and/or receive instructions from a user and/or administrator 655. User/administrator 655 may be, for example, a user and/or administrator of system 600 and/or network captured traffic distribution device 100.

Network captured traffic distribution device 100 may be communicatively coupled via communication link 500 to a mirror port 660 present on routing device 620 and may receive a traffic flow of captured data packets, including data packet 640, from routing device 620 via mirror port 660. Network captured traffic distribution device 100 may also be communicatively coupled to an inline traffic capture point 665 located along a communication link between communication devices 610 and/or between communication device 610 and routing device 620. Network captured traffic distribution device 100 may capture data packets, like data packets 640 and/or receive captured data packets, via inline network traffic point 665. Network captured traffic distribution device 100 may further be coupled an external device 650 via, for example, an egress port. Exemplary external devices 650 include a network monitor, a network analyzing device, a communication device, a protocol analyzer, a flight recorder, an intrusion detection system, a media analyzer, a signaling analyzer, a web analyzer, a database analyzer, a voice signaling analyzer, an Internet protocol television (IPTV) analyzer, an application analyzer, a voice analyzer, a telecommunications analyzer, and a forensic analyzer. Network captured traffic distribution device 100 may also echo one or more data packets to, for example, communication device 610 and/or external device 650.

Figure 7A:
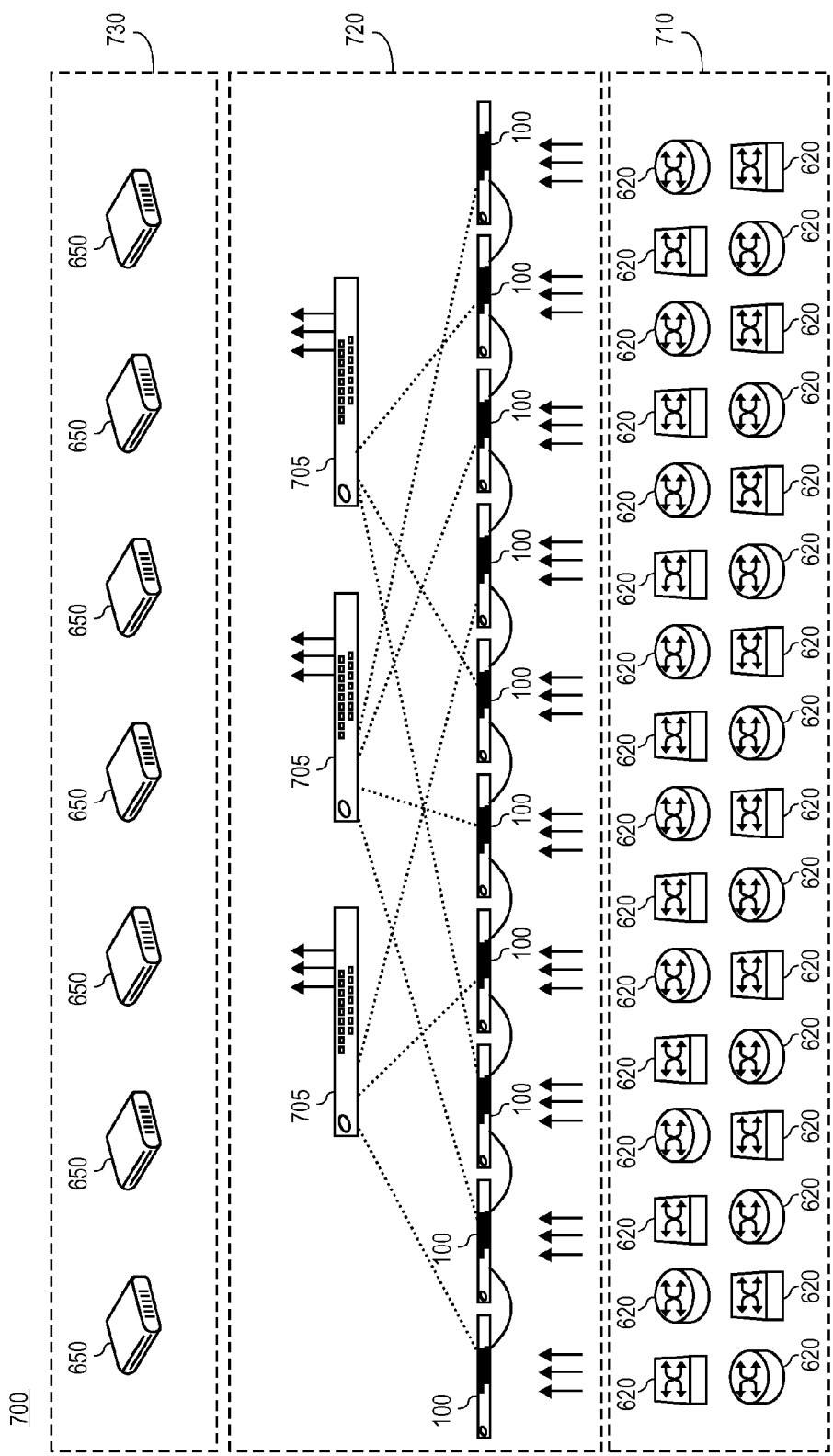
FIGS. 7A and 7B are block diagrams illustrating exemplary stacked topologies of network captured traffic distribution devices configured as a layer intervening between a communication infrastructure layer and an external device layer, in accordance with an embodiment of the present invention.

FIG. 7A is a block diagram illustrating a layered system 700 including an exemplary stacked topology of network captured traffic distribution devices wherein the stacked topology is a layer intervening between a layer of communication infrastructure devices and a layer of external devices such as monitoring devices and/or analyzing devices. System 700 includes three layers; a communication infrastructure layer 710, a captured traffic distribution layer 720, and an external device layer 730.

Communication infrastructure layer 710 includes a plurality of communication infrastructure device 620, such as routers and switches. One or more communication devices 620 may be communicatively coupled with one another, and/or one or more network captured traffic distribution devices 100 as included in the captured traffic distribution layer 720 via, for example, inline traffic capture point 665 or mirror port 660. Captured traffic distribution layer 720 may include multiple network captured traffic distribution devices 100 arranged in a stacked topology. Some, or all, network captured traffic distribution devices 100 may further be communicatively coupled to one or more large capacity network captured traffic distribution devices 705. Large capacity network captured traffic distribution devices 705 may be capable of, for example, aggregating captured network traffic received from a plurality of network captured traffic distribution devices 100, filtering captured network traffic received from a plurality of network captured traffic distribution devices 100 and/or grooming captured traffic received from a plurality of network captured traffic distribution devices 100. On some occasions, large capacity network captured traffic distribution device 705 may groom or specifically tailor the network captured traffic transmitted to an external device 650 according to one or more criteria specific to the external device 650. One or more large capacity network captured traffic distribution devices 705 may be communicatively coupled to one or more external devices as provided in external device layer 730.

Figure 7B:
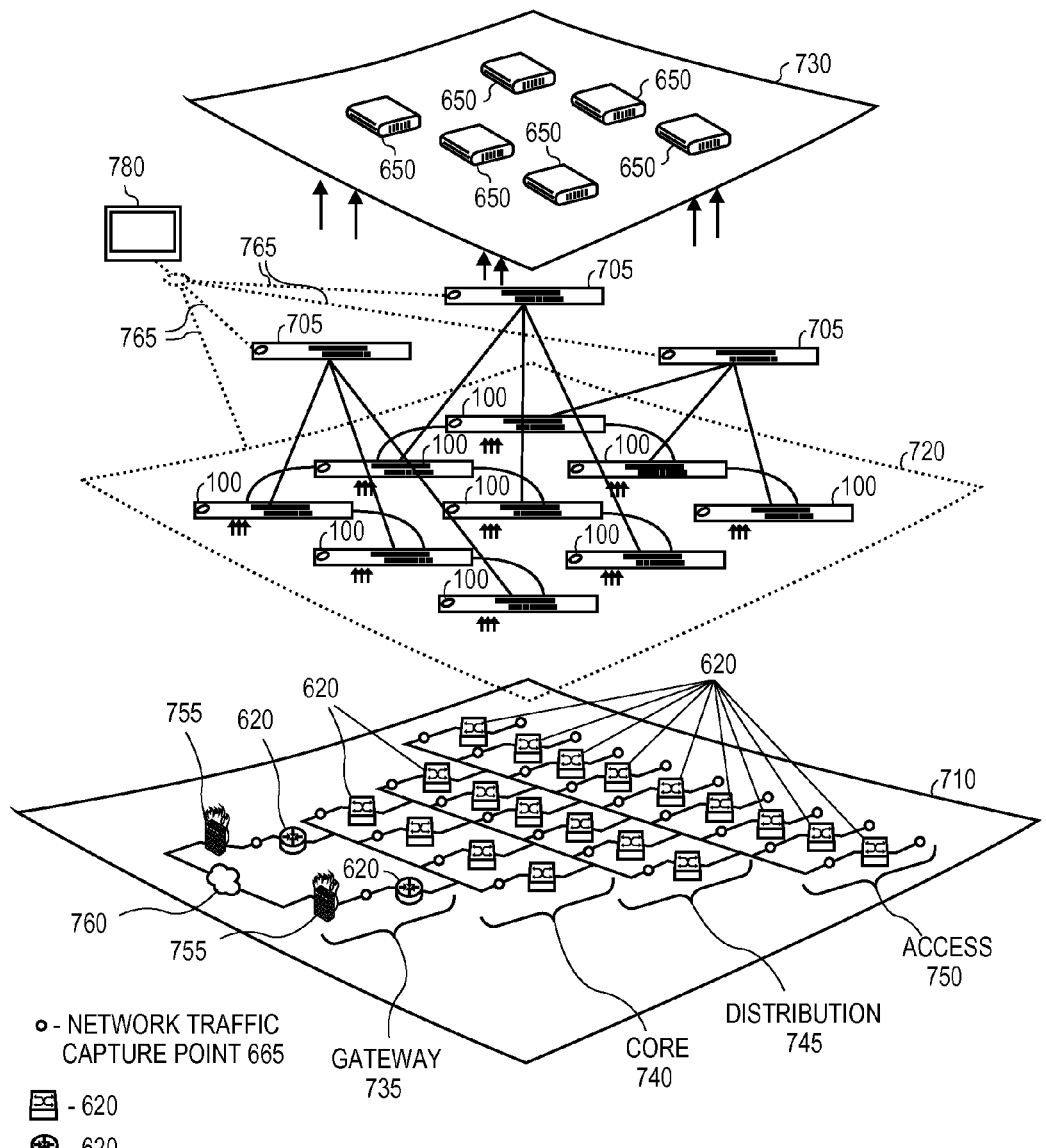

FIG. 7B is a diagram illustrating an exemplary layered system 701 including an exemplary stacked topology of network captured traffic distribution devices wherein the stacked topology is a layer intervening between a layer of communication infrastructure devices and a layer of external devices such as monitoring devices and/or analyzing devices. System 701 includes communication infrastructure layer 710, captured traffic distribution layer 720, and external device layer 730. Some or all communication links included in system 701 may include an inline traffic capture point 665.

Communication infrastructure layer 710 includes a gateway layer 735, a core layer 740, a distribution layer 745, and an access layer 750. Gateway layer 735 may include, for example, a network cloud 760 communicatively coupled to a plurality of firewalls 755 that are communicatively coupled via a communication link, like communication link 500, to a plurality of communication infrastructure devices 620. Communication infrastructure devices 620 of gateway layer 735 may be communicatively coupled via a communication link, like communication link 500, to a plurality of communication infrastructure devices 620 included in core layer 740. Communication infrastructure devices 620 of core layer 740 may be communicatively coupled via a communication link, like communication link 500, to a plurality of communication infrastructure devices 620 included in distribution layer 745. Communication infrastructure devices 620 of distribution layer 745 may be communicatively coupled via a communication link, like communication link 500, to a plurality of communication infrastructure devices 620 included in access layer 750.

One or more communication infrastructure devices 620 of communication infrastructure layer 710 may be communicatively coupled via, for example, a communication link, like communication link 500 or inline traffic capture point 665 or a mirror port, like mirror port 660, to one or more network captured traffic distribution devices 100 included in captured traffic distribution layer 720. Captured traffic distribution layer 720 may include a plurality of network captured traffic distribution devices 100 communicatively coupled to one another or arranged in a stacked topology via communication links 500. Network captured traffic distribution devices 100 may be further coupled to large capacity network traffic captured distribution devices 705. Large capacity network captured traffic distribution devices 705 may be coupled to a central management device 780 via a management communication link 765. Management communication link 765 may be any appropriate wired or wireless link that enables communication between high capacity network captured traffic distribution device 705 and central management device 780. Exemplary central management devices 780 include a computer monitor or computer system as may be managed by a user and/or administrator such as user administrator 655. Large capacity network captured traffic distribution devices 705 may be further coupled to one or more external devices 650 as included in external device layer 730.

Figure 8A:
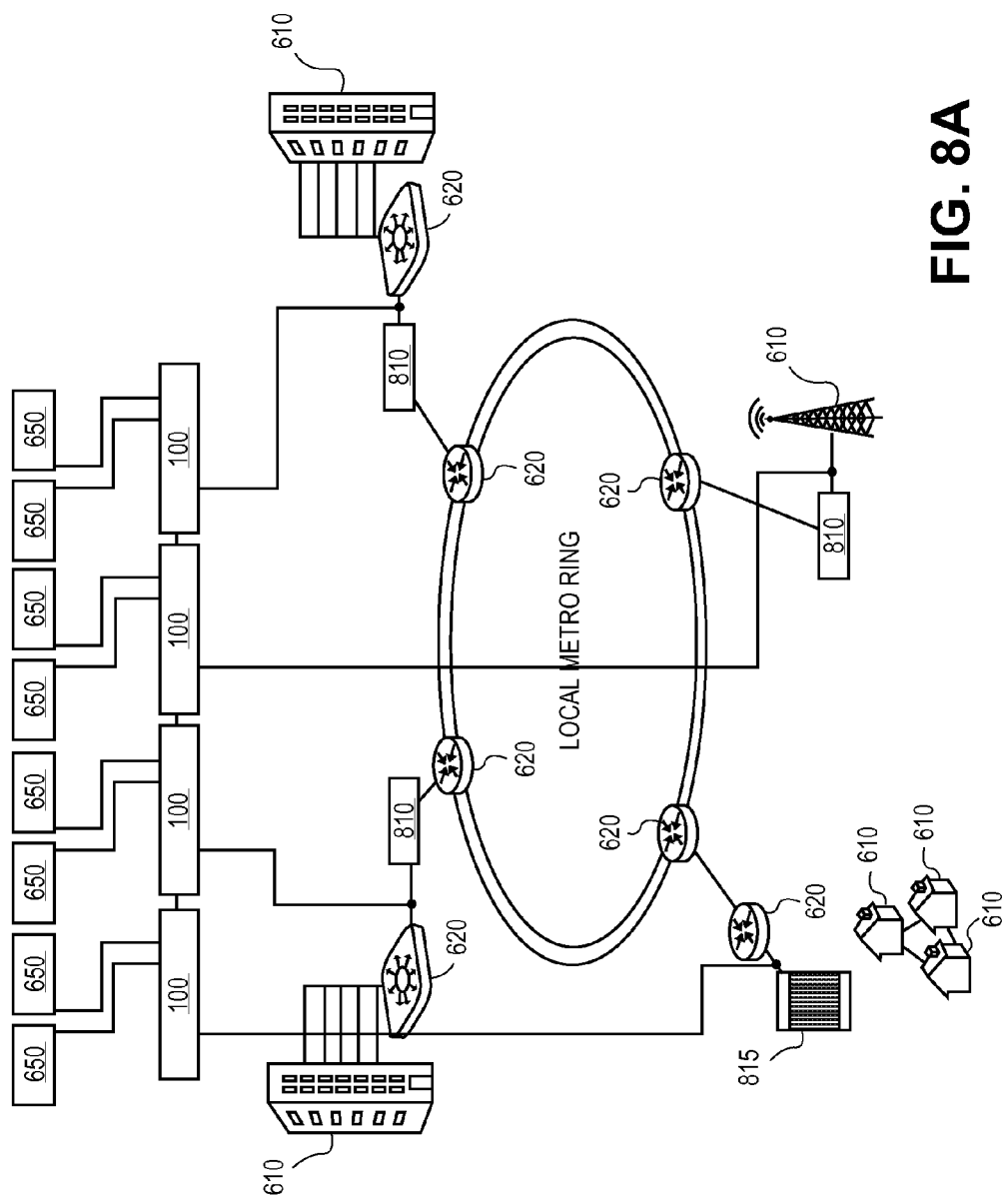
FIGS. 8A-8C are diagrams illustrating exemplary carrier Ethernet systems utilizing a stacked topology of network captured traffic distribution devices, in accordance with an embodiment of the present invention.
Figure 8B:
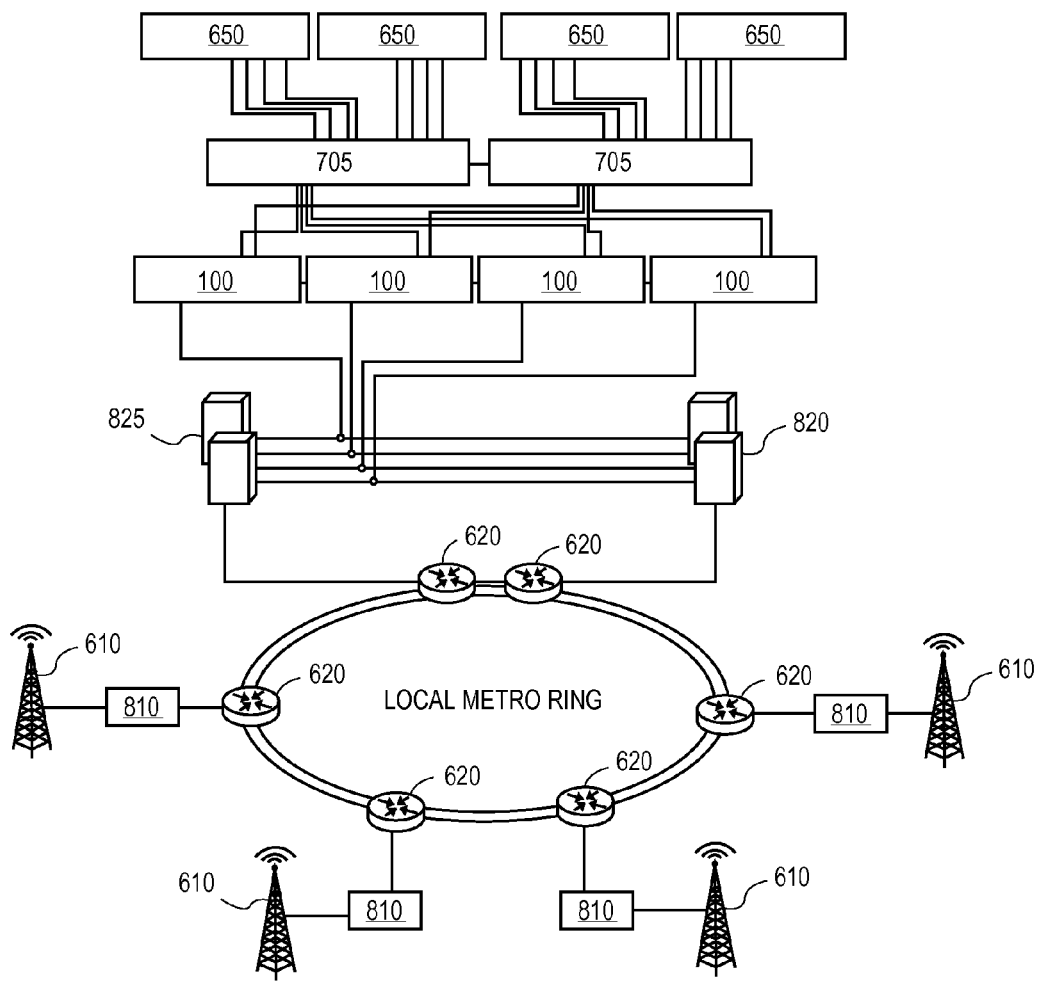
Figure 8C:
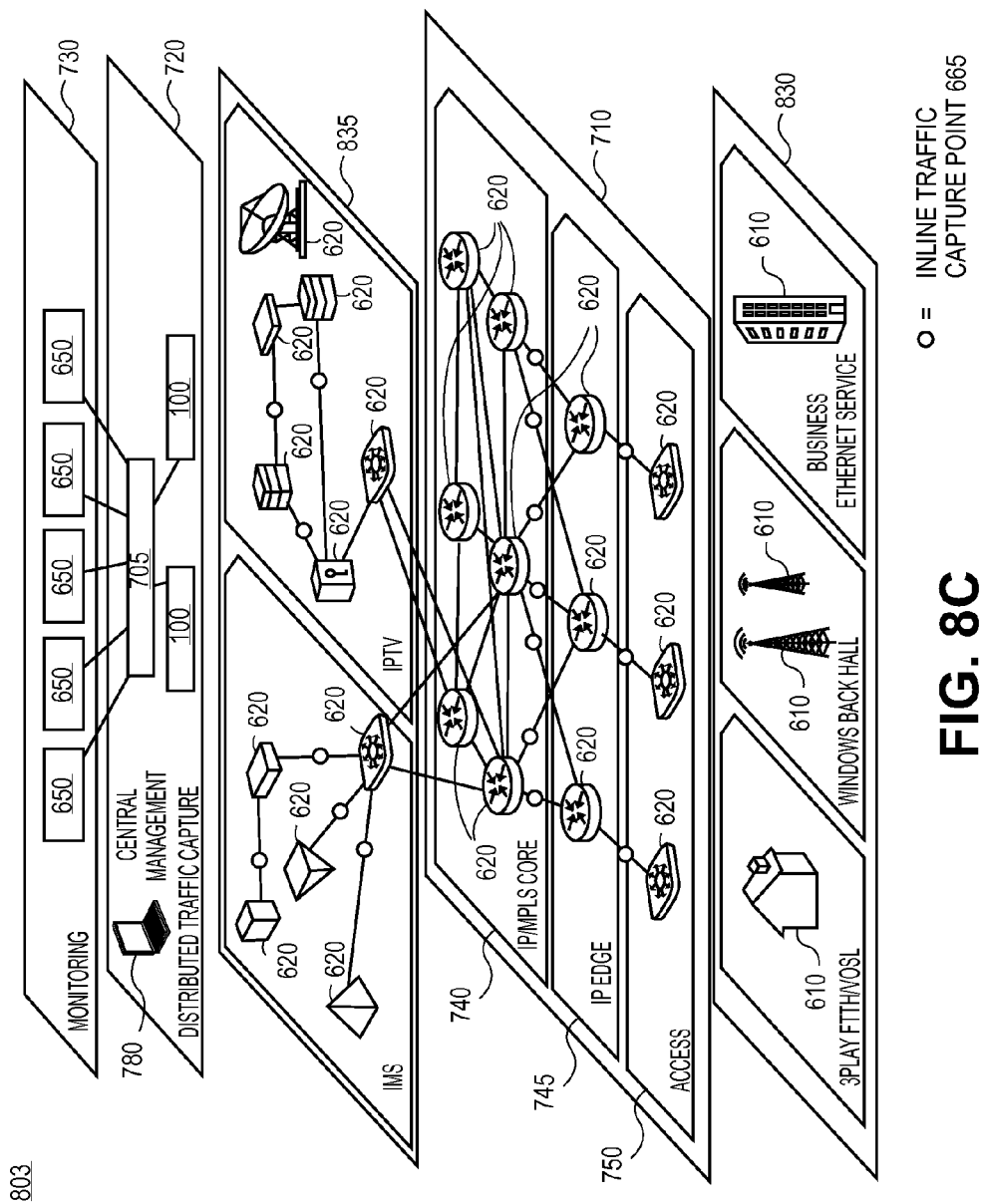

FIGS. 8A through 8C are diagrams illustrating exemplary carrier Ethernet embodiments of the present invention. FIG. 8A is a diagram illustrating a carrier Ethernet system 801 including a plurality of communication devices 610, or structures that support communication devices 610 such as residences, office buildings and antennas, via which multiple users are communicatively coupled via a communication link, like communication link 500, to one or more communication infrastructure devices 620. Exemplary communication infrastructure devices 620 included in system 801 are switches, routers, Ethernet network intrusion devices (NID), edge routers, and optical line termination (OLT) devices 815. A plurality of communication infrastructure devices 620 of system 801 may be arranged in a topology, such as a local metro ring, via communication links, like communication links 500.

Communication links between communication infrastructure devices 620 and/or between communication infrastructure devices 620 and communication devices 610 may be communicatively coupled to a stacked topology of network captured traffic distribution devices 100 via, for example, inline traffic capture points 665. The stacked topology of network captured traffic distribution devices 100 may also be coupled to one or more external devices 650 via communication links, like communication links 500.

FIG. 8B is a diagram illustrating a carrier Ethernet system 802 of the present invention. In FIG. 8B a plurality of communication devices 610, such as wireless antenna are communicatively coupled to one or more network security devices 810, such as a network forensic security device or a network intrusion detection device. Network security devices 810 may then be coupled via communication links, like communication links 500, to one or communication infrastructure devices 620 arranged in a local metro ring topology. One or more of communication infrastructure devices 620 located along the local metro ring may be communicatively coupled to, for example, a public switched data network (PSDN) 825 and/or a radio network controller (RNC) 820 via communication links, like communication links 500. PSDN 825 and RNC 820 may also be communicatively coupled to one another via communication links, like communication links 500. Along these communication links may be one or more inline traffic capture points 665. Network traffic capture points 665 may be communicatively coupled to one or more network captured traffic distribution devices 100 arranged in a stacked topology. Network captured traffic distribution devices 100 may also be coupled to large capacity network captured traffic distribution devices 705 via communication links, like communication links 500. Large capacity network captured traffic distribution devices 705 may also be communicatively coupled to one or more external devices 650.

FIG. 8C is a diagram illustrating a layered carrier Ethernet system 803. Carrier Ethernet system 803 includes five layers; a communication device layer 830, communication infrastructure layer 710, a media communication layer 835, captured traffic distribution layer 720, and external device layer 730. Devices included in the layers of system 803 may be communicatively coupled via communication links like communication links 500. One or more of the communication links in system 803 may include inline traffic capture point 665.

Communication device layer 830 includes multiple communication devices 610, such as a triple play fiber to the home (FTTH)/very high bit rate DSL (VDSL) device, a wireless backhaul antenna, commercial or business Ethernet services.

Communication infrastructure layer 710 may include three layers; an access layer 750, IP edge layer 745, and an IP/MPLS core layer 740. Access layer 750 may include multiple communication infrastructure devices 620, such as routers, PC-MAN routers, and switches that are communicatively coupled to communication infrastructure devices 620 included in IP edge layer 745. Communication infrastructure devices 620 present in IP edge layer 745 may be communicatively coupled to one or more communication infrastructure devices 620 included in IP/MPLS core 740. Communication infrastructure devices 620 included in IP/MPLS core 740 may serve to switch and/or route communications to media communication layer 835.

On some occasions, media communication layer 835 may include a IMF system and/or an IPTV system. Exemplary IMF systems include a media gateway controller function (MGCF), a master switch or router, a media gateway (MGW), a high-speed serial interface (HSS), a central router may also be communicatively, and a proxy call session control function (P-CSCF). IPTV system may include a router communicatively coupled to an encryption device. The encryption device may be communicatively coupled to a distribution server, a voice on demand (VoD) server, and/or an audio voice on demand (VoDA) server. The distribution server and/or the VoD server may also be communicatively coupled to an encoder.

Captured traffic distribution layer 720 may be coupled to one or more devices included in communication device layer 830, communication infrastructure layer 710, and media communication layer 835 via, for example, inline traffic capture point 665 and/or mirror port 660. Captured traffic distribution layer 720 may include one or more network captured traffic distribution devices 100 arranged in a stacked topology and central management device 780. One or more of the network captured traffic distribution devices 100 may be communicatively coupled to a large capacity network captured traffic distribution device 705. Large capacity network captured traffic distribution device may further be coupled to one or more external devices included in external device layer 730.

Figure 9A:
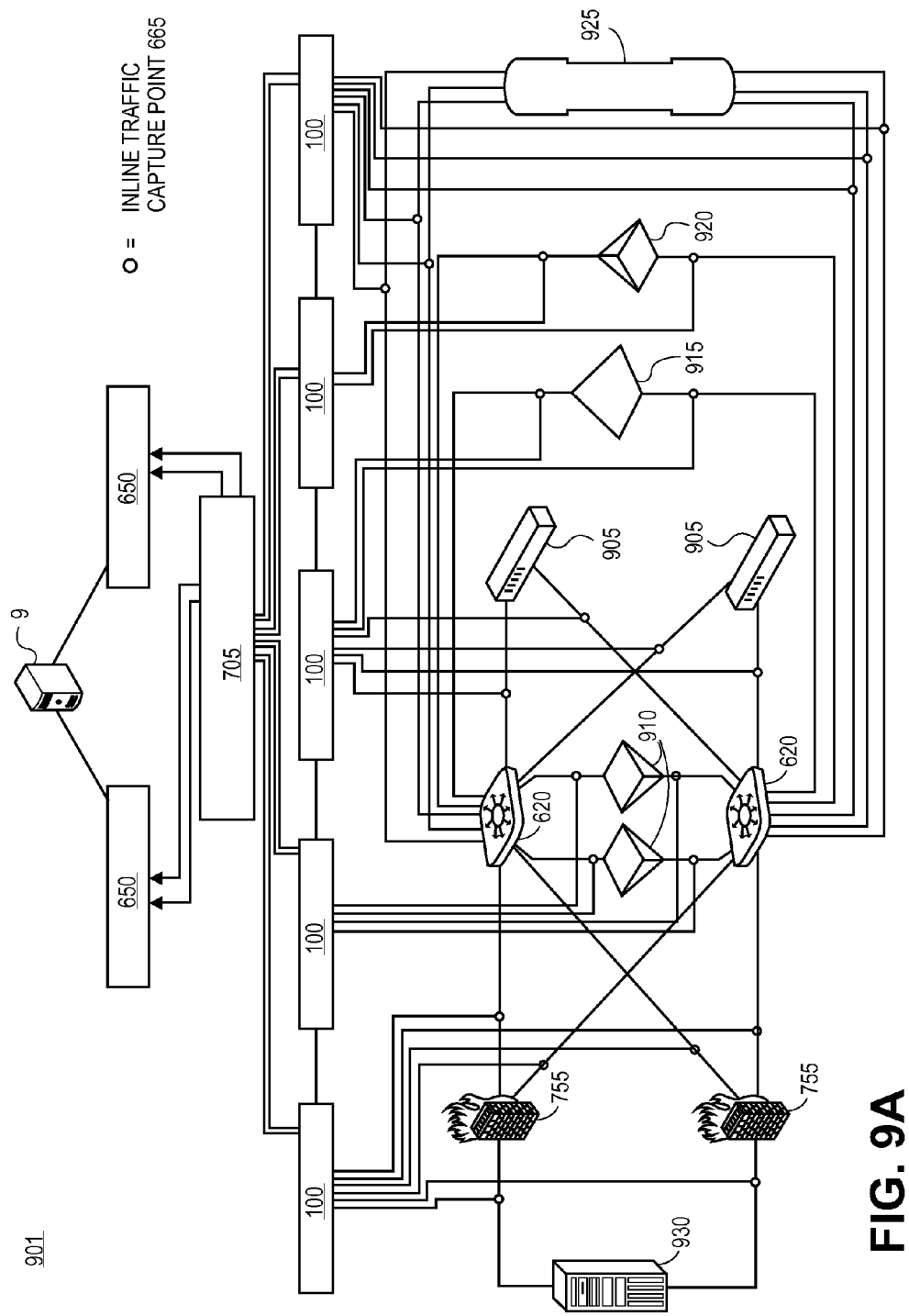
FIGS. 9A-9C are diagrams illustrating exemplary carrier VoIP systems utilizing a stacked topology of network captured traffic distribution devices, in accordance with an embodiment of the present invention.

FIG. 9A is a block diagram depicting an exemplary carrier voice over IP (VoIP) system 901. System 901 may include one or more communication infrastructure components such as servers 930, firewalls 775, communication infrastructure devices 620, media gateways 910, core devices 915, EGV devices 920 and/or base stations 925 communicatively coupled to one another via communication links, like communication links 500. One or more communication links may include inline traffic capture points 665.

System 901 may further include a plurality of network captured traffic distribution devices arranged in a stacked topology. One or more of the components of communication layer 710 may be communicatively coupled to network captured traffic distribution device 100 via inline traffic capture point 665. Network captured traffic distribution devices 100 may be coupled to one or more large capacity network captured traffic distribution devices 705 that may be communicatively coupled to one or more external devices 650. External devices 650 may further be coupled to an application server 935.

Figure 9B:
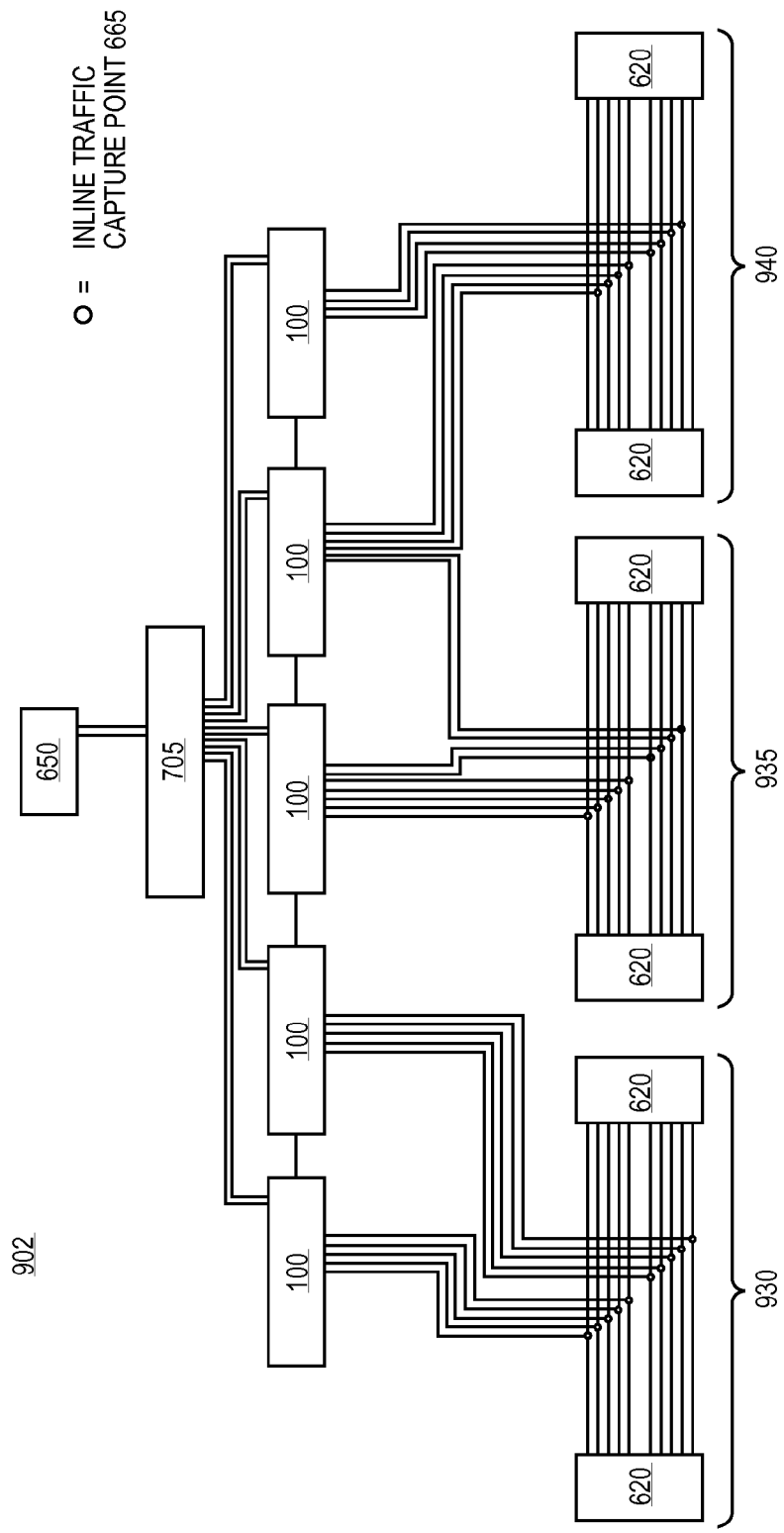

FIG. 9B is a block diagram illustrating an exemplary carrier VoIP system 902. System 902 includes multiple communication infrastructure devices 620, such as service GPRS support node (SGSN) servers, communicatively coupled to one another 620 via communication links like communication links 500. Communication links between communication infrastructure devices 620 may include one or more inline traffic capture points 665 via which one or more network captured traffic distribution devices such as network captured traffic distribution devices 100 may receive captured traffic. Network captured traffic distribution devices are arranged in a stacked topology and are communicatively coupled to one or more large capacity network captured traffic distribution devices 705. Large capacity network captured traffic distribution device 705 may be communicatively coupled to one or more external devices 650.

Figure 9C:
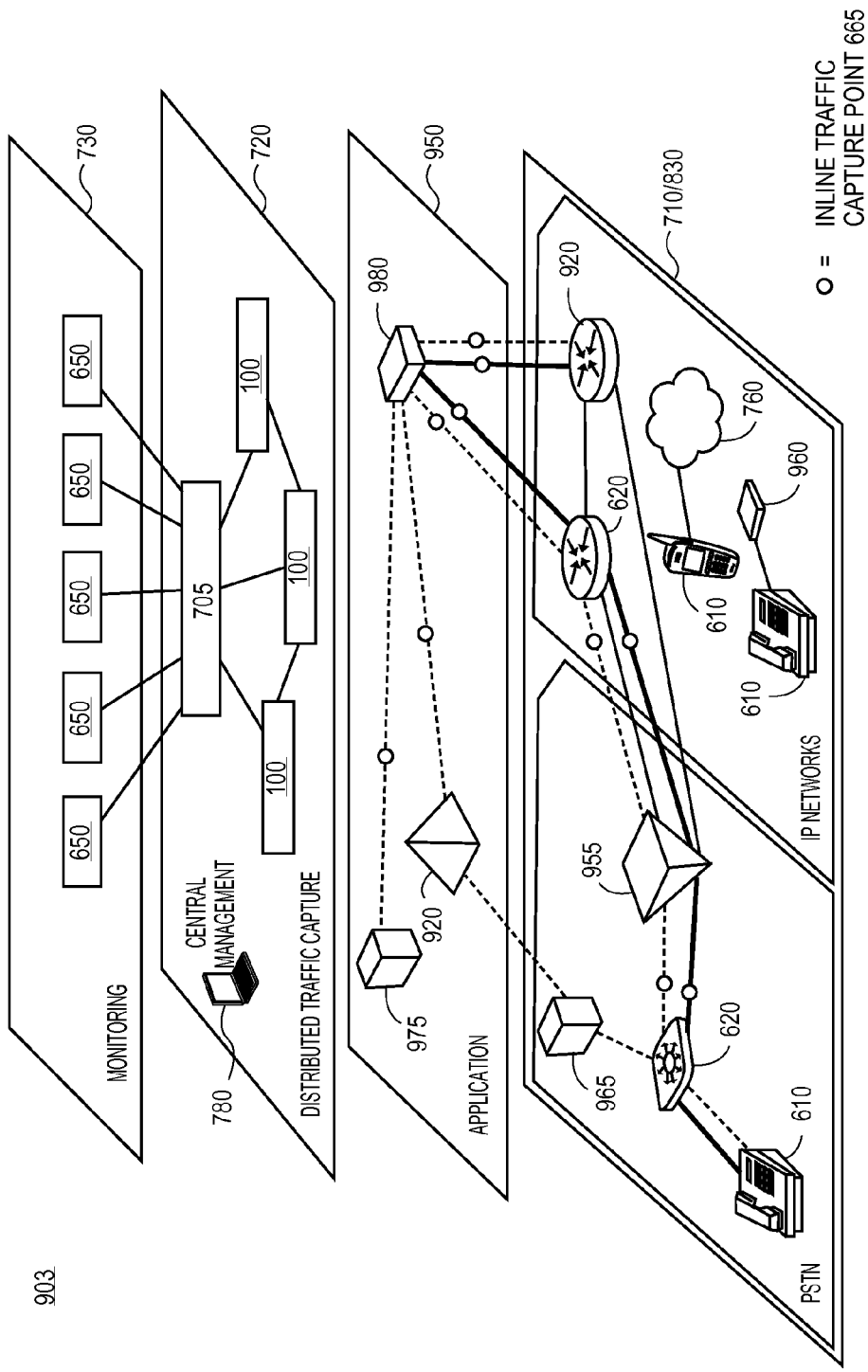

FIG. 9C is a block diagram illustrating an exemplary carrier VoIP system 903. System 903 has four layers; a communication infrastructure/communication device layer 710/830, an application layer 950, captured traffic distribution layer 720 and external device layer 730. Components within communication infrastructure/communication device layer 710/830 and application layer 950 may be communicatively coupled via a media link, shown in FIG. 9C as a dashed line, and/or a signaling link, shown in FIG. 9C as a bold line, to one another. One or more media links and/or signaling links of system 903 may include an inline traffic capture point 665.

Communication infrastructure layer 710 includes components of a public switch telephone network (PSTN) and an IP network. Exemplary PSTN components include communication devices 610, such as a telephone, communicatively coupled to communication infrastructure devices 620 such as a media gateway (MGW) 955 and a signal transfer point (STN) 965.

Exemplary IP network components include communication devices 610, such as a telephone or mobile phone, communicatively coupled to an IAB 960 or a network 760. The IP network may also include communication infrastructure device 620, such as a switch, router, or edge router communicatively coupled to one or more components of application layer 950 or PSTN.

Application layer 950 includes communication infrastructure devices like a proxy call session control function (P-CSCF) device 980 that may be coupled to one or more components of IP network via a media and/or signaling link. Application layer 950 further includes a media gateway 920 and a high speed serial interface 975 (HSS). Both HSS 975 and media gateway 920 may be communicatively coupled to P-CSCF 980. Application layer 950 may be communicatively coupled to a network captured traffic distribution layer 720 via, for example, one or more inline traffic capture points 665.

Network captured traffic distribution layer 720 may include one or more network captured traffic distribution devices 100 arranged in a stacked topology. Network captured traffic distribution devices 100 may be communicatively coupled to a large capacity network captured traffic distribution device 705. Captured traffic distribution layer 720 may further include a central management device 780 which may operate to manage one or more network captured traffic distribution devices 100 and/or large capacity network captured traffic distribution devices 705. The devices present in captured traffic distribution layer 720 may be coupled to one or more external devices included in monitoring layer 730.

FIG. 10A is a block diagram illustrating an exemplary IPTV system 1001. System 1001 includes multiple communication infrastructure devices 620, such as an insertion server, a key server, and a plurality of VoD servers, communicatively coupled with one another via communication links, like communication link 500. One or more inline traffic capture points 665 may be present along the communication links via which the communication links are coupled to a stacked topology of network captured traffic distribution devices 100. Captured network traffic may be received by network captured traffic distribution device 100 via inline traffic capture points 665 or a mirror port like mirror port 660. Network captured traffic distribution devices 100 included in the stacked topology may also be communicatively coupled via communication links, like communication link 500, to one or more large capacity network captured traffic distribution devices 705. Large capacity network captured traffic distribution devices 705 may further be coupled to one or more external devices 650.

Figure 10B:
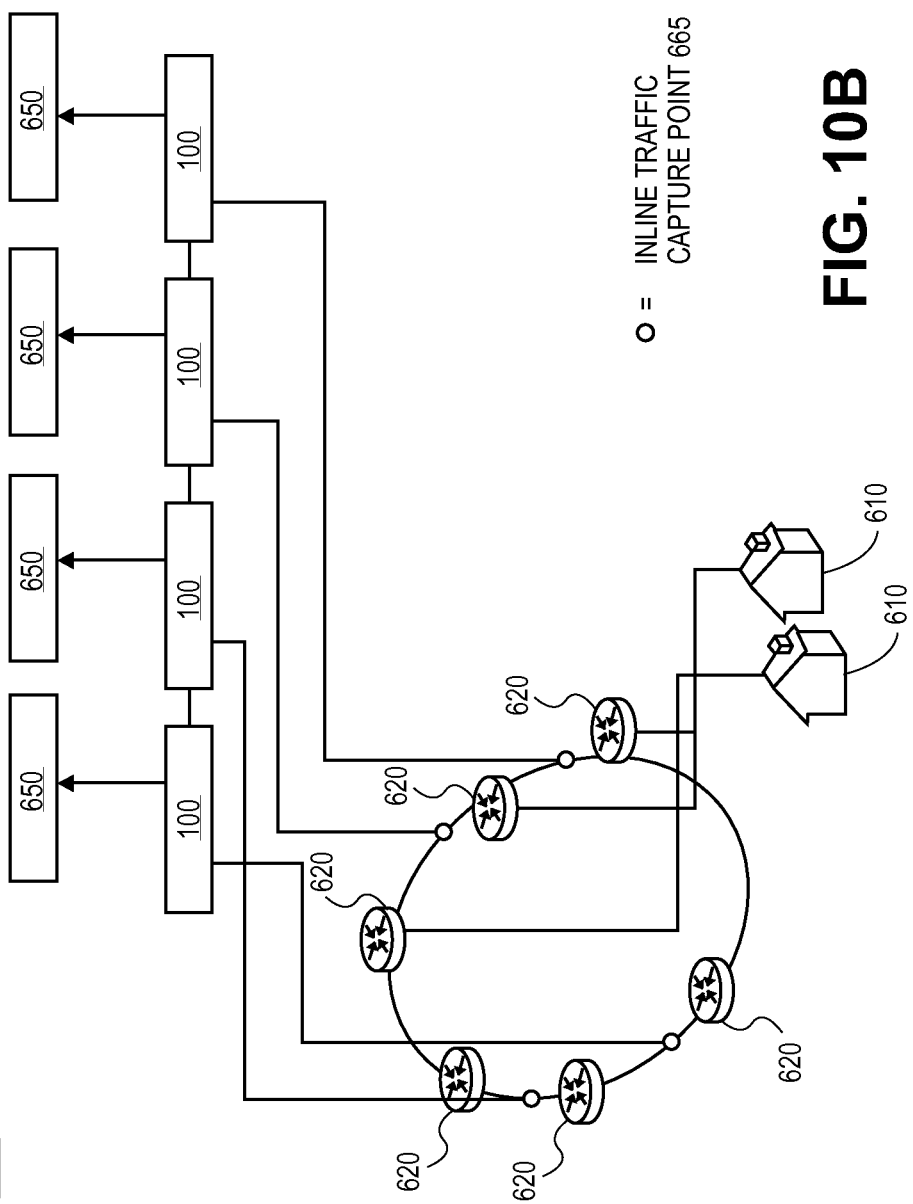

FIG. 10B is a block diagram illustrating an exemplary IPTV system 1002. System 1002 includes multiple communication devices 610 communicatively coupled to one or more communication infrastructure devices 620 via communication links, like communication link 500. In system 1002, communication infrastructure devices 620 may be digital subscriber line access multiplexers (DSLAM). Communication links between one or more communication devices 610 and/or communication infrastructure devices 620 may include inline traffic capture points 665 that are communicatively coupled to one or more network captured traffic distribution devices 100 arranged in a stacked topology. Network captured traffic distribution devices 100 may also be communicatively coupled to one or more external devices 650.

Figure 10C:
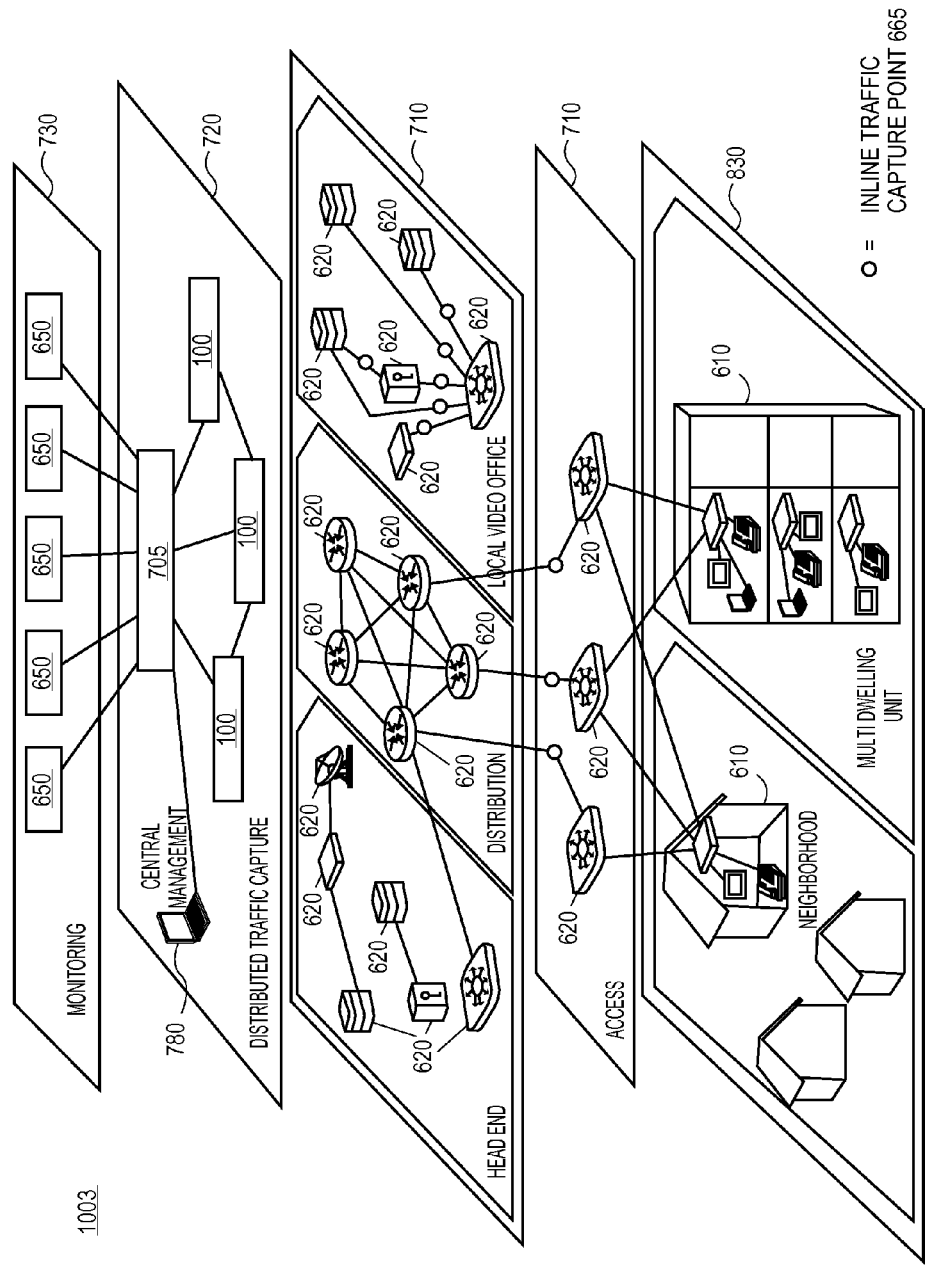

FIG. 10C is a diagram illustrating an exemplary layered IPTV system 1003. System 1003 includes communicating device layer 830, multiple communication infrastructure layers 710, captured traffic distribution layer 720, and external device layer 730. Devices included in the layers of system 1003 may be communicatively coupled via communication links like communication links 500. One or more of the communication links in system 1003 may include inline traffic capture point 665.

Exemplary devices included in communication device layer 705 include one or more residential communication devices or residential gateways. One or more of the communicating devices 610 present in communication device layer 830 may be communicatively coupled to one or more communication infrastructure devices 620, such as a DSAM router resident in a first communication infrastructure layer, or access layer 710. One or more communication infrastructure devices 620 resident in first communication infrastructure layer may be communicatively coupled to one or more additional communication infrastructure devices 620 resident in a second communication infrastructure layer 710.

Second communication infrastructure layer 710 may include a head end system, a distribution system, and a local video office system. Exemplary head end systems include multiple communication infrastructure devices 620, such as switches, encryption devices, VoD server, a distribution server, and an encoder, communicatively coupled to one another. Exemplary distribution systems may include one or more communication infrastructure devices 620, such as routers and/or switches that may be communicatively coupled to the local office video system. Exemplary local office video system may include multiple communication infrastructure devices 620, such as a switch or router communicatively coupled to infrastructure servers, ACS, encryption devices, VoD servers, and/or content providers.

One or more of the communication links communicatively coupling the devices of communication device layer 830 and communication infrastructure layer 710 may include an inline traffic capture point 665 via which captured network traffic may be communicated to one or more network captured traffic distribution devices 100 arranged in a stacked topology present in captured traffic distribution layer 720. Network captured traffic distribution devices 100 may also be communicatively coupled to large capacity network captured traffic distribution device 705. Large capacity network captured traffic distribution device 705 may also be communicatively coupled to central management device 780 and one or more external devices present in external device layer 730.

Figure 11A:
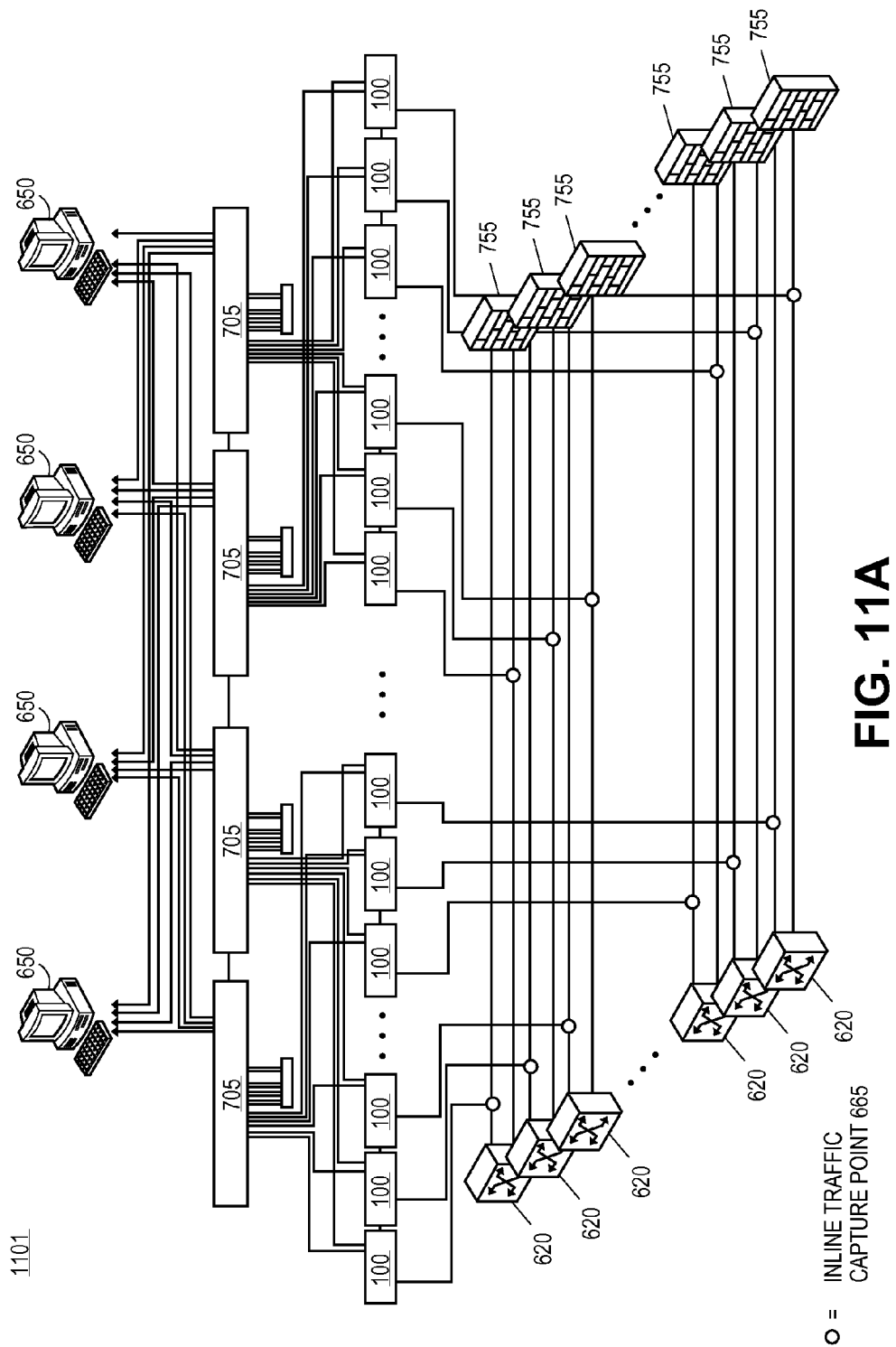
FIGS. 11A-11C are diagrams illustrating exemplary security systems utilizing a stacked topology of network captured traffic distribution devices, in accordance with an embodiment of the present invention.

FIG. 11A is a diagram illustrating an exemplary network security system 1101. System 1101 includes multiple communication infrastructure devices 620, such as switches, communicatively coupled via an active and/or passive communication link, like communication link 500, to one or more firewalls 755. Active communication links are depicted in FIG. 11A as bold lines while passive communication links are depicted in FIG. 11A as dotted lines.

One or more network traffic capture points 665 may be located along active and/or passive links between communication infrastructure devices 620 and firewalls 775 via which captured network traffic may be communicated to one or more network captured traffic distribution devices 100 arranged in a stacked topology. Network captured traffic distribution devices 100 may also be communicatively coupled to one or more large capacity network captured traffic distribution devices 705 which may be communicatively coupled to one or more external devices 650 via an active and/or passive communication link.

Figure 11B:
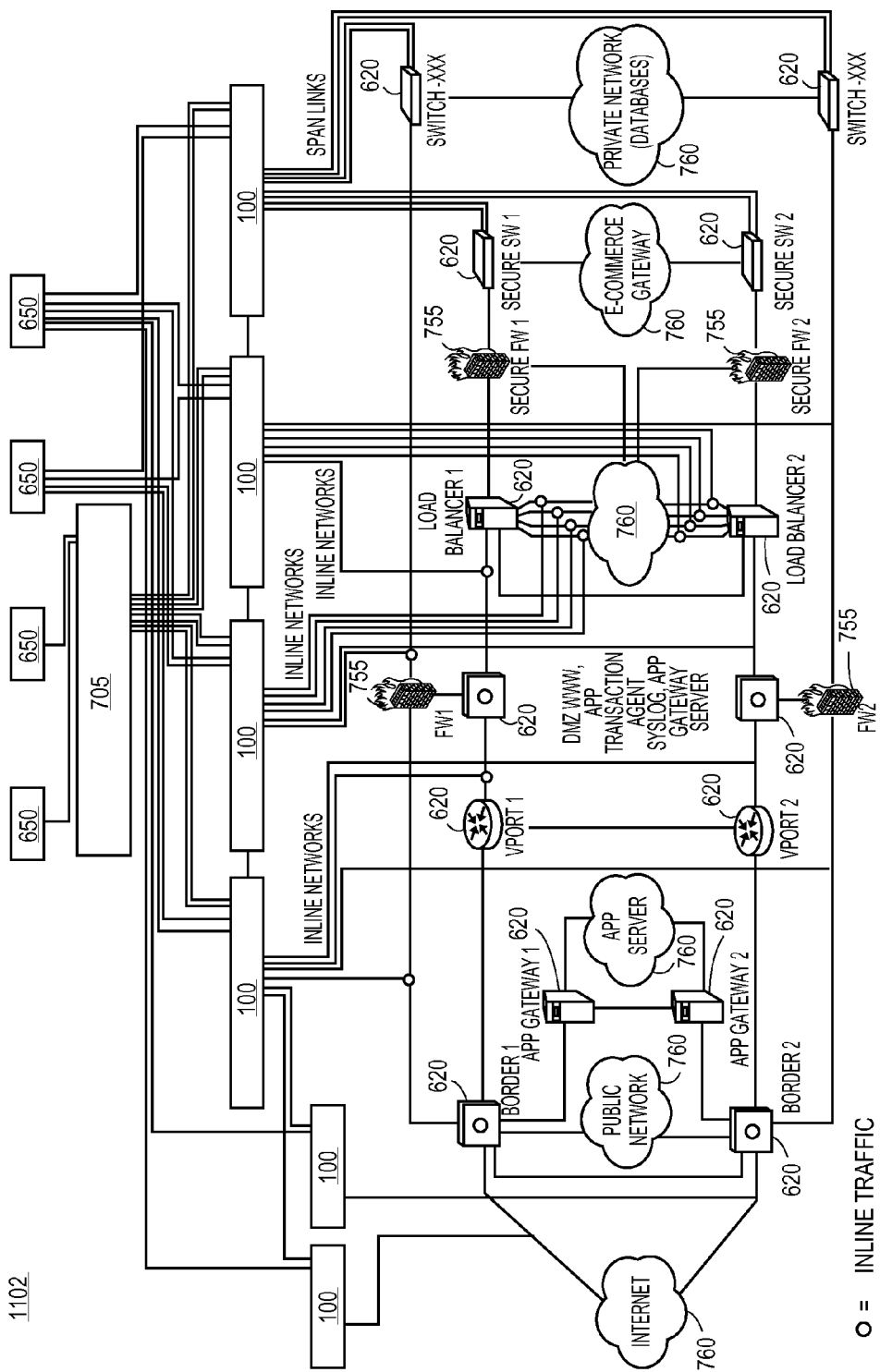

FIG. 11B is a diagram illustrating an exemplary network security system 1102. Network security system 1102 includes a plurality of communication infrastructure devices 620, such as routers, switches, application gateways, vports, load balancers, secure switches, firewalls 755 and networks 760 (e.g., public networks, application server networks, electronic commerce gateway networks, and/or private networks (databases)), in communication with one another via one or more communication links, like communication links 500. The communication links may include one or more inline traffic capture points 665 via which captured network traffic may be communicated to one or more network captured traffic distribution devices 100 arranged in a stacked topology. Network captured traffic distribution devices 100 may further be communicatively coupled to one or more large capacity network captured traffic distribution devices 705 which may, in turn, be coupled to one or more external devices 650.

Figure 11C:
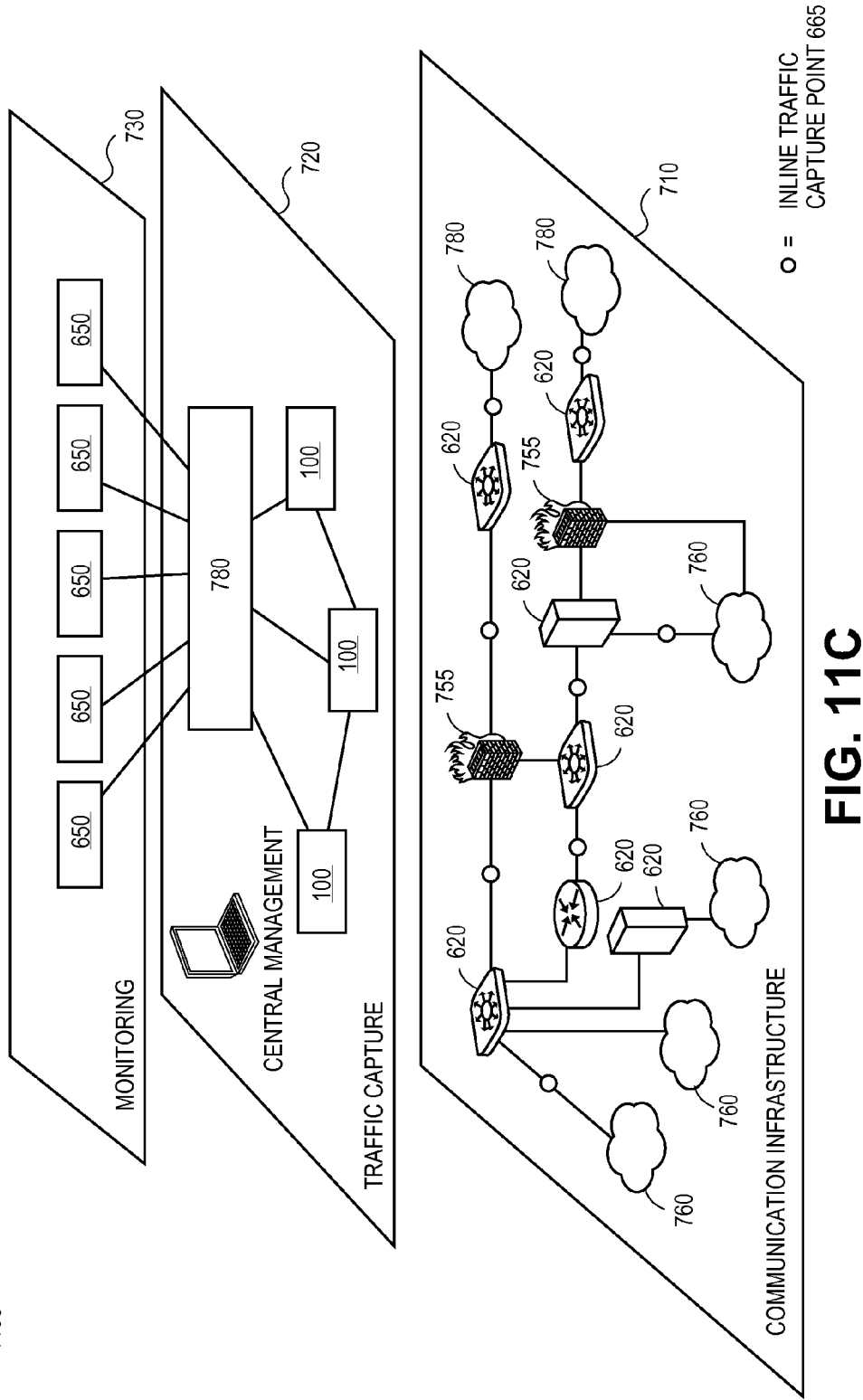

FIG. 11C illustrates an exemplary network security system 1103 including communication infrastructure layer 710, captured traffic distribution layer 720, and external device layer 730. Exemplary components included in communication infrastructure layer 710 include communication infrastructure devices 620, such as networks 760, firewalls 755, routers, switches, load balancers, etc. One or more components of communication infrastructure 710 may be communicatively coupled to one or another via a communication link, like communication link 500. These communication links may include one or more inline traffic capture points 665 via which captured network traffic may be communicated to one or more network captured traffic distribution devices 100 arranged in a stacked topology resident in captured traffic distribution layer 720. Network captured traffic distribution devices 100 may be communicatively coupled to one or more large capacity network captured traffic distribution devices 705. Captured traffic distribution layer 720 may further include a central management device 780 communicatively coupled to large capacity network captured traffic distribution device 705. Large capacity network captured traffic distribution device 705 may further be coupled to one or more external devices 650.

IV. VLAN Tagging

Figure 12:
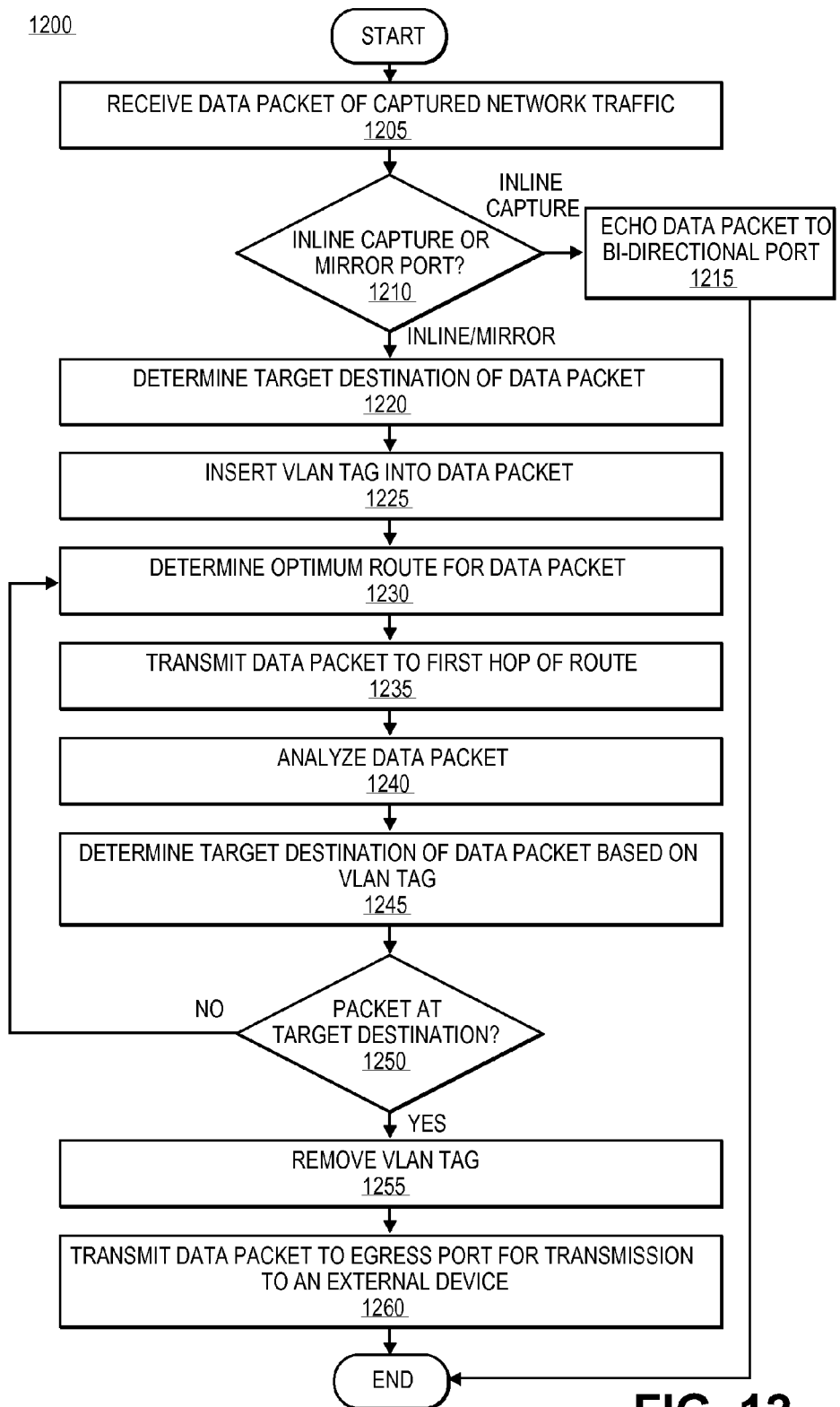
FIG. 12 is a flowchart illustrating an exemplary process for inserting a VLAN tag into a data packet, in accordance with an embodiment of the present invention.

FIG. 12 is a flow chart illustrating an exemplary process 1200 for inserting a virtual LAN (VLAN) tag into one or more received captured data packets. Process 1200 may be executed by, for example, any of the devices and/or systems disclosed herein.

In step 1205, one or more data packets of captured network traffic may be received by a network captured traffic distribution device included in a stacked topology, such as network captured traffic distribution device 100. The captured data packet may be received from one or more sources and, in step 1210, it may be determined whether the source of the received captured data packet is, for example, an inline traffic capture point, such as inline captured traffic point 665 or a mirror port, such as mirror port 660. When the captured data packet is received via an inline capture point, the received captured data packet may be echoed to a bidirectional port, such as bidirectional port 110, for eventual transition to, for example, a communication device intended to receive the captured data packet (step 1215). Whether the captured data packet was received via an inline traffic capture point or a mirror port, a target network captured traffic distribution device included in the stacked topology for the captured data packet may be determined (step 1220).

Then, in step 1225, a VLAN tag may be inserted into the captured data packet. The VLAN tag may serve to indicate, for example, identifying information associated with the data packet, such as an origin of the data packet, a target network captured traffic distribution device for the data packet, data packet size, and data packet type. The inserted VLAN tag may remain in the data packet during its transport through successive network captured traffic distribution devices included in the stacked topology.

Next, in step 1230, an optimum route for transmission of the captured data packet from the receiving network captured traffic distribution device to the target network captured traffic distribution device may be determined. The optimum route for the captured data packet may be determined via, for example, process 1400 and/or 1500 as discussed below with reference to FIGS. 14 and 15. Then, in step 1235, the captured data packet may be transmitted to a second network captured traffic distribution device in the stacked topology along the optimum route. The data packet may then be analyzed at the second network captured traffic distribution device (step 1240) to determine, for example, the target network captured traffic distribution device of the data packet based on the inserted VLAN tag (step 1245). Next, in step 1250, it may be determined whether the second network captured traffic distribution device is the target destination of the captured data packet based on, for example, information included in the VLAN tag inserted at step 1225. When the second network captured traffic distribution device is not the target destination, steps 1230 through 1250 may repeat themselves.

When the second network captured traffic distribution device is the target network captured traffic distribution device, the VLAN tag inserted at step 1225 may be removed (step 1255) by, for example, the second network captured traffic distribution device. Finally, at step 1260, the captured data packet may be transmitted towards an egress port of the second network captured traffic distribution device via which, in some embodiments, the captured data packet may be transmitted to one or more external devices. Exemplary external devices include a monitoring device, a protocol analyzer, a flight recorder, an intrusion detection system, a media analyzer, a signaling analyzer, a web analyzer, a database analyzer, a voice signaling analyzer, an IPTV analyzer, an application analyzer, a voice analyzer, a telecommunications analyzer, and a forensic analyzer. Following step 1260, process 1200 may end.

FIG. 13A is a block diagram of an exemplary data packet 1301. Data packet 1301 includes a header 1305, a payload 1315, and an old frame check sequence (FCS) and/or cyclic redundancy check (CRC) block 1320. In some embodiments, data packet 1301 may resemble data packet 640. Header 1305 may include, for example, address information and other information, as needed, for the transmission of data packet 1305 through a network communication system, like network communication system 601. Payload 1315 may include any payload or data appropriate for data packet 1301. Old FCS/CRC block 1320 may include information necessary for compliance with one or more system protocols, communication protocols, and/or the routing of data packet 1301 through a network communication system, like network communication system 601.

FIG. 13B illustrates an exemplary modified data packet 1302 including header 1305, payload 1315, a VLAN tag 1310, and a new FCS/CRC 1330. In some cases modified data packet 1302 may be a modified form of data packet 1301 and/or 640. Modified data packet 1302 may be generated via a process for inserting a VLAN tag into a data packet, such as process 1200, as discussed above with reference to FIG. 12. Although FIG. 13B indicates a location of VLAN tag 1310 that is immediately after header 1305, VLAN tag 1310 may be inserted into any location within modified data packet 1302. New FCS/CRC 1330 may include information indicating that data packet 1302 includes a VLAN tag and in some cases may be an updated version of old FCS/CRC 1320.

V. Optimum Route

FIG. 14 is a flowchart illustrating a process 1400 for determining an optimum route for the transmission of captured network traffic and/or a captured data packet included in captured network traffic through a stacked topology of two or more network captured traffic distribution devices. Process 1400 may be executed by, for example, any of the devices and/or systems disclosed herein.

In step 1405, a traffic flow of captured network traffic may be received at, for example, a network captured traffic distribution device included in a stacked topology, such as network captured traffic distribution device 100. The captured traffic may be received from one or more sources of captured traffic. Next, in step 1410 it may be determined whether the source of the received captured network traffic is, for example, an inline traffic capture point, such as inline captured traffic point 665 or a mirror port, such as mirror port 660. When the captured network traffic is received via an inline capture point, the received captured network traffic may be echoed to a bidirectional port, such as bidirectional port 110, for eventual transition to, for example, a communication device and/or external device intended to receive the captured network traffic (step 1215).

Whether the captured traffic was received via an inline captured traffic point or a mirror port, a target destination of the captured traffic may be determined (step 1420). Exemplary target destinations of the captured network traffic include a network captured traffic distribution device included in the stacked topology, a monitoring device, a protocol analyzer, a flight recorder, an intrusion detection system, a media analyzer, a signaling analyzer, a web analyzer, a database analyzer, a voice signaling analyzer, an IPTV analyzer, an application analyzer, a voice analyzer, a telecommunications analyzer, and a forensic analyzer.

Next, in step 1425 one or more routes, or transmission pathways, from the receiving network captured traffic distribution device through the stacked topology to the target destination may be determined. In some cases, a route may be determined in real time or on an as-needed basis. In one embodiment, the determination of step 1425 may include accessing one or more pre-calculated routes for the transmission of received captured network traffic through the stacked topology to a target destination. Pre-calculated routes may be stored at, for example, the network captured traffic distribution device in a memory, such as memory 180, accessed via another network captured traffic distribution device included in the stacked topology and/or accessed from an external storage location via, for example, a management port, such as management port 140 and/or bidirectional port 110. In another embodiment, one or more routes may be determined via a download or exchange from a web browser by the network captured traffic distribution device. In some cases, step 1425 may include accessing previously stored determined routes and/or selected optimum routes. Further details regarding the determination of step 1425 are discussed below with reference to FIG. 15 and process 1500.

In step 1430, the determined and/or pre-calculated routes may be analyzed according to one or more criterion. In some cases, the analysis of step 1430 may include determining a transmission capacity or transmission/link speed available for each route and/or segment of a route determined in step 1420. The analysis may also include determining, for each route, the number of network captured traffic distribution devices in the stacked topology that received captured data packets will pass through prior to arrival at the target destination. The analysis of step 1430 may further include determining a load balanced route through the stacked topology and/or determining a load spread route through the stacked topology.

In some cases, the analysis of step 1430 may indicate two or more similar, or redundant optimum routes through the stacked topology. Redundant optimum routes may be routes through the stacked topology that are equivalent according to the analysis criteria. In some embodiments, the selection of one similar, or redundant route over another may be made in light of a load balancing and/or load spreading consideration.

Then, in step 1435, it may be determined whether load balancing for the network captured traffic distribution device is enabled. Whether load balancing is enabled or not, it may be further determined in step 1440 whether load spreading is enabled. When load spreading is enabled, an optimum load spread route for received captured network traffic may be determined (step 1445). When load spreading is not enabled, the transmission capacity of possible optimum load balanced routes and/or optimum load spread routes may be analyzed (step 1455).

When load balancing is enabled in step 1435, an optimum load balanced route for the received captured network traffic may be determined (step 1450). Then the transmission capacity of possible optimum load balanced routes and/or optimum load spread routes may be analyzed (step 1455).

Next, in step 1460, an optimum route for transmission of the captured network traffic may be selected based upon, for example, the analysis of step 1455. Following this selection, the received captured network traffic may be transmitted toward the target destination via the selected optimum route (step 1455). The target destination may be, for example, another network captured traffic distribution device included in the stacked topology or an external device coupled to one or more network captured traffic distribution devices included in the stacked topology.

Optionally, in step 1465, the determined routes of step 1425 and/or the selected optimum route of step 1460 may be stored in, for example, the network captured traffic distribution device, in a memory, such as memory 180, and/or may be communicated to one or more network captured traffic distribution devices included in the stacked topology or an external device.

Figure 15:
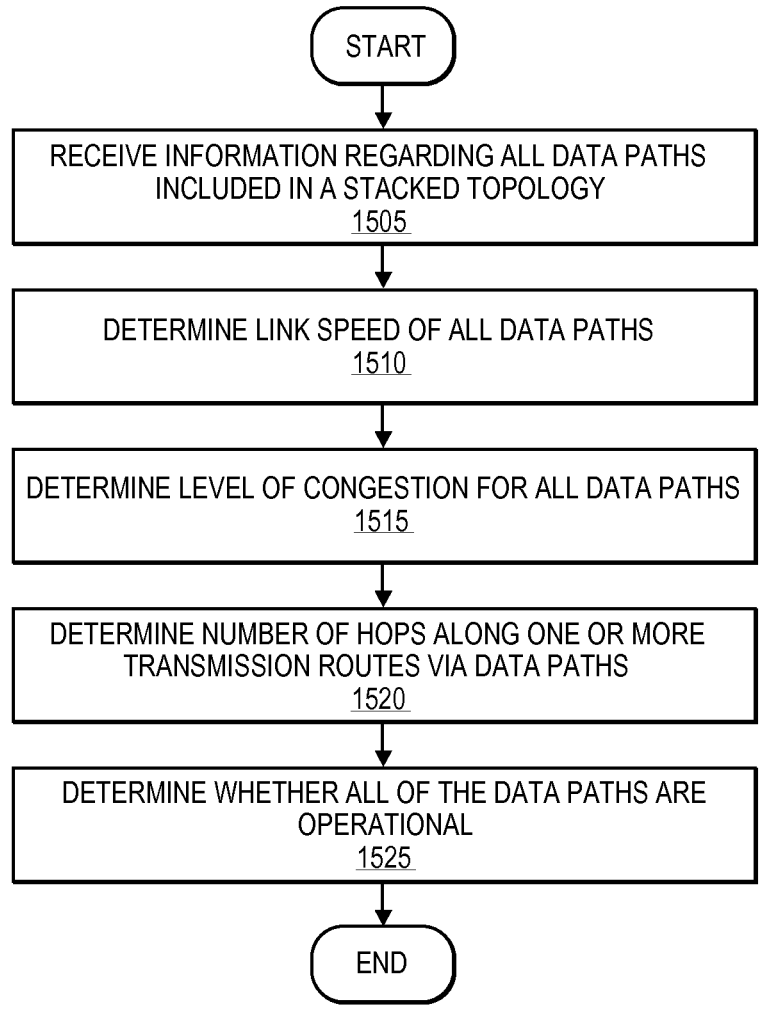
FIG. 15 is a flowchart illustrating an exemplary process for determining an optimum route through a stacked topology of network captured traffic distribution devices, in accordance with an embodiment of the present invention.

FIG. 15 is a flowchart illustrating an optional process 1500 or steps included in the analysis of step 1430 as discussed above with regard to FIG. 14. Process 1500 may be executed by, for example, any of the devices and/or systems disclosed herein.

In step 1505, information regarding some or all data paths available or included in a stacked topology may be received by, for example, a network captured traffic distribution device, such as network captured traffic distribution device 100. The information may be received via, for example, an exchange of configuration information, between the network captured traffic distribution device and an additional network captured traffic distribution device included in the stacked topology or a message from, for example, an additional network captured traffic distribution device included in the stacked topology, a communication device, or an external device.

Optionally, in step 1510, a link/transmission speed of some or all of the communication links and network captured traffic distribution devices included in the stacked topology and/or communication devices and external devices coupled to the stacked topology may be determined. Then, in step 1515, a level of congestion for some or all of the communication links and network captured traffic distribution devices included in the stacked topology and/or communication devices and external devices coupled to the stacked topology may be determined.

Optionally, in step 1520, the number of hops or intervening network captured traffic distribution devices along a route may be determined. Finally, in step 1525, it may be determined whether some or all of the data paths included in a route are operational. This determination may include a determination of whether a data path is online, transmitting at an optimum link speed, and/or congested.

Figure 16:
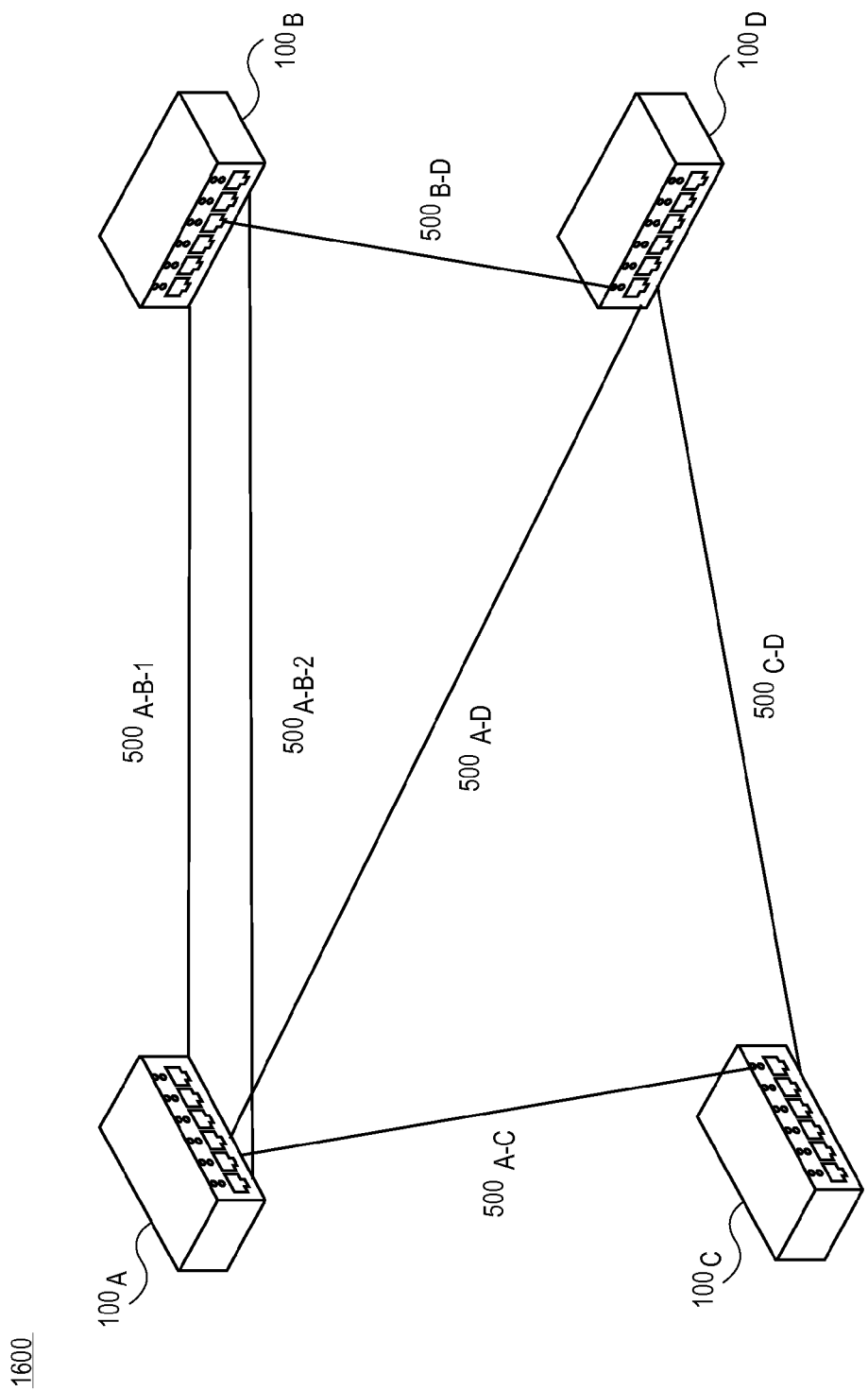
FIG. 16 is a block diagram illustrating an exemplary stacked topology of network captured traffic distribution devices, in accordance with an embodiment of the present invention.

FIG. 16 is a block diagram illustrating an exemplary mesh network of four network captured traffic distribution devices, such as network captured traffic distribution devices 100. FIG. 16 shows four network captured traffic distribution devices; a network captured traffic distribution device $100_A$, a network captured traffic distribution device $100_B$, a network captured traffic distribution device $100_C$, and a network captured traffic distribution device $100_D$. Network captured traffic distribution devices $100_A$-$100_D$ are communicatively coupled to one another via one or more communication links 500. For example, network captured traffic distribution device $100_A$ is communicatively coupled to network captured traffic distribution device $100_B$ via two communication links $500_{A-B-1}$ and $500_{A-B-2}$. Network captured traffic distribution device $100_A$ is also communicatively coupled to network captured traffic distribution device $100_D$ via a communication link $500_{A-D}$. Network captured traffic distribution device $100_A$ is further connected to network captured traffic distribution device $100_C$ via a communication link $500_{A-C}$. Network captured traffic distribution device $100_B$ is connected to network captured traffic distribution device $100_D$ via a communication link $500_{B-D}$ and network captured traffic distribution device $100_C$ is communicatively coupled to network captured traffic distribution device $100_D$ via a communication link $500_{C-D}$.

In cases where the link speed of all communication links 500 pictured in FIG. 16 is the same and traffic received by network captured traffic distribution device $100_A$ were to go to network captured traffic distribution device $100_C$, then network captured traffic distribution device $100_A$ would determine that communication link $500_{A-C}$ would be the optimum route for the transmission of captured network traffic as it is the most direct route between network captured traffic distribution device $100_A$ and network captured traffic distribution device $100_C$. In the event that communication link $500_{A-C}$ has failed or is not operating properly, network captured traffic distribution device $100_A$ may then select a new optimum route for the transmission of captured data packets to network captured traffic distribution device $100_C$. Again, given that all communication links 500 are transmitting at the same speed, the next optimum route selected by network captured traffic distribution device $100_A$ may be via communication link $500_{A-D}$ to network captured traffic distribution device $100_D$. Once received, the target destination of captured network traffic is determined at network captured traffic distribution device $100_D$ and communication link $500_{C-D}$ may be selected by network captured traffic distribution device $100_D$ for transmission of the received captured traffic from network captured traffic distribution device $100_D$ to network captured traffic distribution device $100_C$.

In a case where the link speed for all communication links 500 illustrated in FIG. 16 is not the same and, for example, the transmission speed of communication link $500_{A-C}$ is slower than the remaining links, network captured traffic distribution device $100_A$ may select communication links $500_{A-D}$ and $500_{C-D}$ for the transmission of captured network from network captured traffic distribution device $100_A$ to network captured traffic distribution device $100_B$, although it is a longer route through the stacked topology than the direct link between network captured traffic distribution devices $100_A$ and $100_C$, because it may be faster due to the higher link speed of communication links $500_{A-D}$ and $500_{C-D}$ when compared to the link speed of communication link $500_{A-C}$.

VI. Filtering

Figure 17:
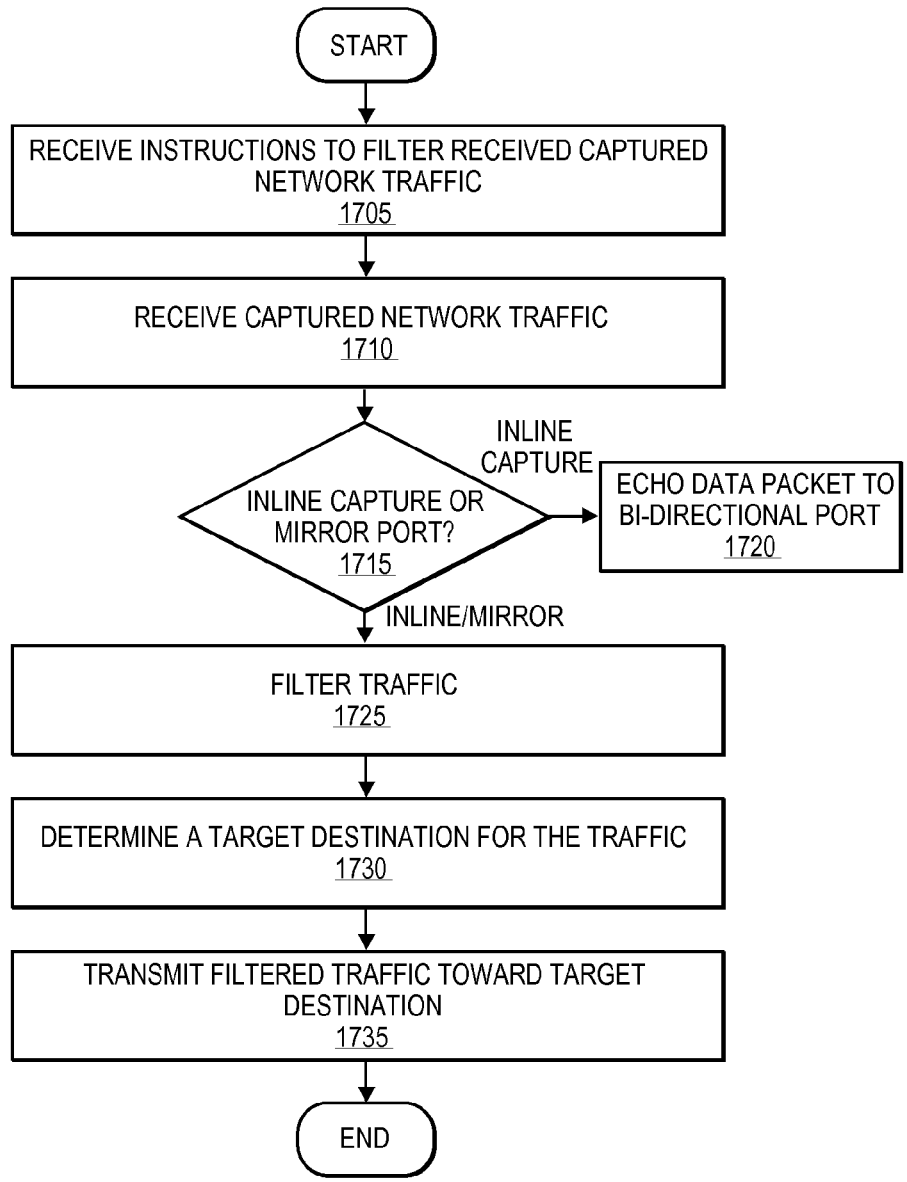
FIG. 17 is a flowchart illustrating an exemplary process for filtering captured network traffic, in accordance with an embodiment of the present invention.

FIG. 17 is a flowchart illustrating an exemplary process 1700 for filtering captured network traffic according to one or more criteria by a network captured traffic distribution device included in a stacked topology of network captured traffic distribution devices. Process 1700 may be executed by, for example, any of the devices and/or systems disclosed herein.

In step 1705, instructions to filter received captured network traffic may be received by, for example, a network captured traffic distribution device included in a stacked topology of network captured traffic distribution devices, such as network captured traffic distribution device 100. The instructions may be received from, for example, a user and/or administrator of the captured network distribution device, such as user/administrator 655 via, for example, a GUI such as GUIs 300-302 as discussed above with regard to FIGS. 3A-3C and/or a management port, such as management port 140. The instructions may also be received as, for example, exchanged configuration information from a network captured traffic distribution device included in the stacked topology. The instructions of step 1705 may also be received by a processor, like processor 170, from, for example, a memory, such as memory 180.

The received instructions may indicate that received captured network traffic is to be filtered according to a criterion or combination of criteria. Exemplary criterion include, but are not limited to, an origin of the captured network traffic, a target destination of the captured network traffic, a source of the captured network traffic, a type the captured network traffic, a protocol used to encode the captured network traffic, a size of one or more data packets included in the captured network traffic, a speed at which the captured network traffic is received, and an operating condition within the stacked topology, a receiving network captured traffic distribution device, and/or a target destination.

In some embodiments, filtration instructions may enable the filtering of captured network traffic based on an amount of available capacity associated with the stacked topology, a communication link, a receiving network captured traffic distribution device, a target destination, a communication device coupled to the stacked topology and/or an external device coupled to the stacked topology. Indicators of available capacity include a maximum transmission or intake speed for captured traffic and a level of congestion associated with the stacked topology, a communication link, a receiving network captured traffic distribution device, and/or a target destination.

In one embodiment, filtration instructions may be specific to one or more characteristics of the captured network traffic such that, for example, all captured traffic received from a source or via a particular bidirectional port included in the network captured traffic distribution device is filtered.

In yet another embodiment, filtration instructions may enable the filtering of captured network traffic based on a target destination associated with the captured network traffic. Exemplary target destinations include a network captured traffic distribution device included in the stacked topology, a monitoring device, a protocol analyzer, a flight recorder, an intrusion detection system, a media analyzer, a signaling analyzer, a web analyzer, a database analyzer, a voice signaling analyzer, an IPTV analyzer, an application analyzer, a voice analyzer, and a forensic analyzer.

Next, in step 1710, captured network traffic may be received by, for example, the network captured traffic distribution device, according to, for example, any of the methods described herein. Then, in step 1715, it may be determined whether the captured network traffic was received via an inline traffic capture point, such as inline traffic capture point 665 and/or a mirror port, such as mirror port 660. When the captured network traffic is received via an inline capture point, the received network captured traffic may be echoed to a bidirectional port, such as bidirectional port 110, resident on the network captured traffic distribution device (step 1720). Whether the captured network traffic is received via an inline capture point or a mirror port, the received captured traffic may be filtered according to, for example, the instructions received in step 1705 (step 1725).

Then, in step 1730, a target destination for the received captured network traffic may be determined according to, for example, process 1400 and/or 1500 as discussed above with regard to FIGS. 14 and 15, respectively. The filtered captured network traffic may then be transmitted toward the target destination determined via, for example, step 1730 (step 1735). Following step 1735, process 1700 may end.

Figure 18:
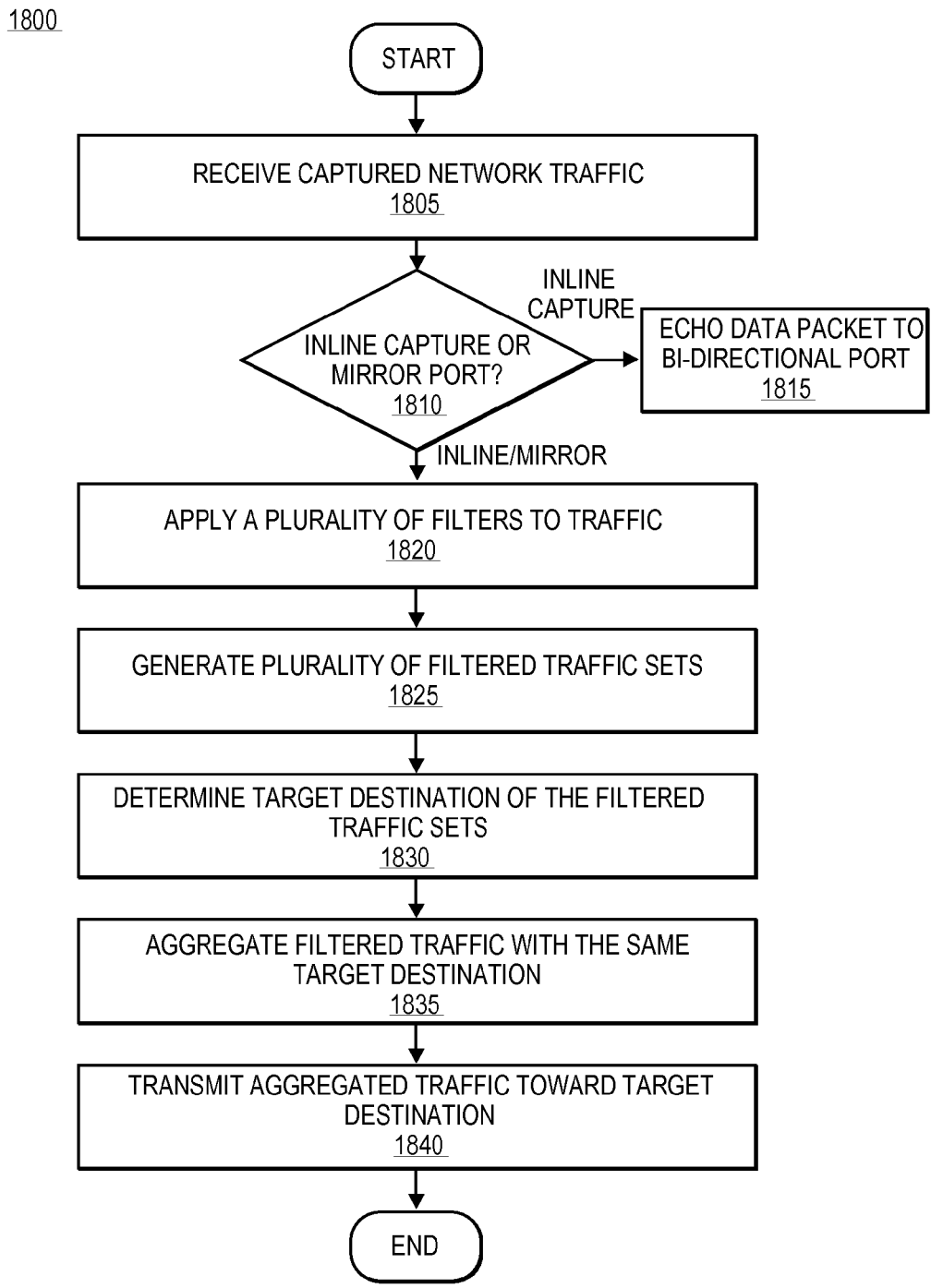
FIG. 18 is a flowchart illustrating a process for filtering and aggregating captured network traffic, in accordance with an embodiment of the present invention.

FIG. 18 is a flowchart illustrating an exemplary process 1800 for filtering and/or aggregating received captured network traffic by a network captured traffic distribution device included in a stacked topology of network captured traffic distribution devices. Process 1800 may be executed by, for example, any of the devices and/or systems disclosed herein.

In step 1805, captured network traffic may be received by, a network captured traffic distribution device included in a stacked topology of network captured traffic distribution devices, like network captured traffic distribution device 100. Then, in step 1810, it may be determined whether the captured network traffic was received via an inline traffic capture point such as inline traffic capture point 665 and/or a mirror port, such as mirror port 660. When the captured network traffic is received via an inline capture point, the received network captured traffic may be echoed to another bidirectional port, such as bidirectional port 110, resident on network captured traffic distribution device (step 1815).

Whether the captured network traffic is received via an inline traffic capture point or a mirror port, a plurality of filters may be applied to the received captured network traffic using, for example, process 1700 (step 1820) and thereby generating a plurality of filtered traffic sets (step 1825). Then, in step 1830, a target destination of each of the filtered traffic sets included in the plurality of filtered traffic sets may be determined via, for example, process 1400 and/or 1500 as discussed above with regard to FIGS. 14 and 15.

Next, in step 1835, filtered traffic sets with the same target destination may be aggregated together. Further details regarding the aggregation of step 1835 are provided below with regard to FIG. 19 and process 1900. Finally, in step 1840, the aggregated filtered traffic sets may be transmitted toward the determined target destination. Step 1840 may be performed via one or more network captured traffic distribution devices included in the stacked topology of network captured traffic distribution devices. Following step 1840, process 1800 may end.

VII. Aggregation

Figure 19:
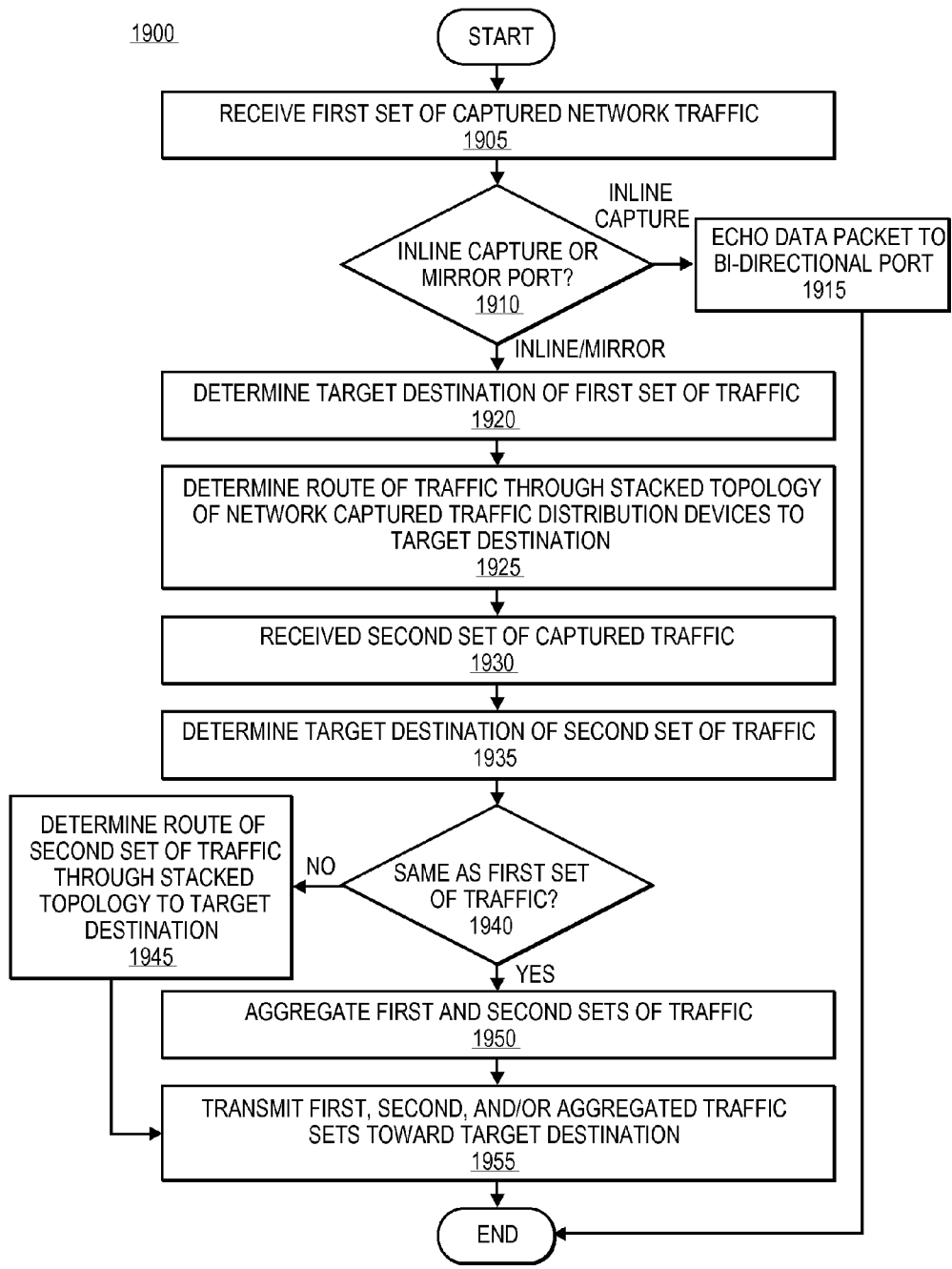
FIG. 19 is a flowchart illustrating an exemplary process for aggregating captured network traffic, in accordance with an embodiment of the present invention.

FIG. 19 illustrates an exemplary process 1900 for aggregating sets of captured network traffic received by a network captured traffic distribution device included in a stacked topology of network captured traffic distribution devices. Process 1900 may be executed by, for example, any of the devices and/or systems disclosed herein.

In step 1905, a first set of captured network traffic may be received by, for example, a network captured traffic distribution device included in a stacked topology of network captured traffic distribution devices, such as network captured traffic distribution device 100. Then, in step 1910, it may be determined whether the captured network traffic was received via an inline traffic capture point, such as inline traffic capture point 665 and/or a mirror port, such as mirror port 660. When the captured network traffic is received via an inline capture point, the received captured network traffic may be echoed to another bidirectional port resident on the network captured traffic distribution device, such as bidirectional port 110, for eventual transmission to, for example, a communication or external device.

Whether the first set of captured traffic is received via an inline traffic capture point or a mirror port, in step 1920, a target destination for the first set of captured network traffic may be determined via, for example, processes 1400 and/or 1500 as discussed above with regard to FIGS. 14 and 15. Next, in step 1925, a route from the network captured traffic distribution device, through the stacked topology of network captured traffic distribution devices, to a determined target destination may be determined.

Then, in step 1930 a second set of captured network traffic may be received by, for example, the network captured traffic distribution device. On some occasions, following step 1930, steps 1910 and 1915 may repeat themselves. Then, in step 1935, a target destination of the second set of captured network traffic may be determined. Again, this determination may be made via, for example, processes 1400 and/or 1500 as discussed above with regard to FIGS. 14 and 15. Next, in step 1940, it may be determined whether the target destination of the second set of traffic is similar to the target destination of the first set of traffic. When the target destination for the second set of traffic is not similar to the target destination of the first set of traffic, the target destination for the second set of captured network traffic may be determined (step 1945). The first and second sets of captured network traffic may then be transmitted toward their respective target destinations (step 1955).

When the target destination of the second set of captured network traffic is similar to, or the same as, the target destination of the first set of captured network traffic, the first and second set of captured network traffic may be aggregated together (step 1950). Then, the aggregated first and second sets of captured network traffic may be transmitted toward the determined target destination (step 1955). Following step 1955, process 1900 may end.

In some embodiments, the first and second sets of captured network traffic may be received from the same source, while in other embodiments, the first set of captured network traffic may be received from a first source and the second set of captured network traffic may be received from a second source. In some cases, the first and second sources may be positioned in geographically disperse positions. For example, a first source may be located on the first floor of an office building, while the second source of captured network traffic may be located on the second floor of the office building, an adjacent office building, and/or an office building miles away from the first source. In some cases, the first and second sources may not be located within the same city, region, or country as one another.

Figure 20:
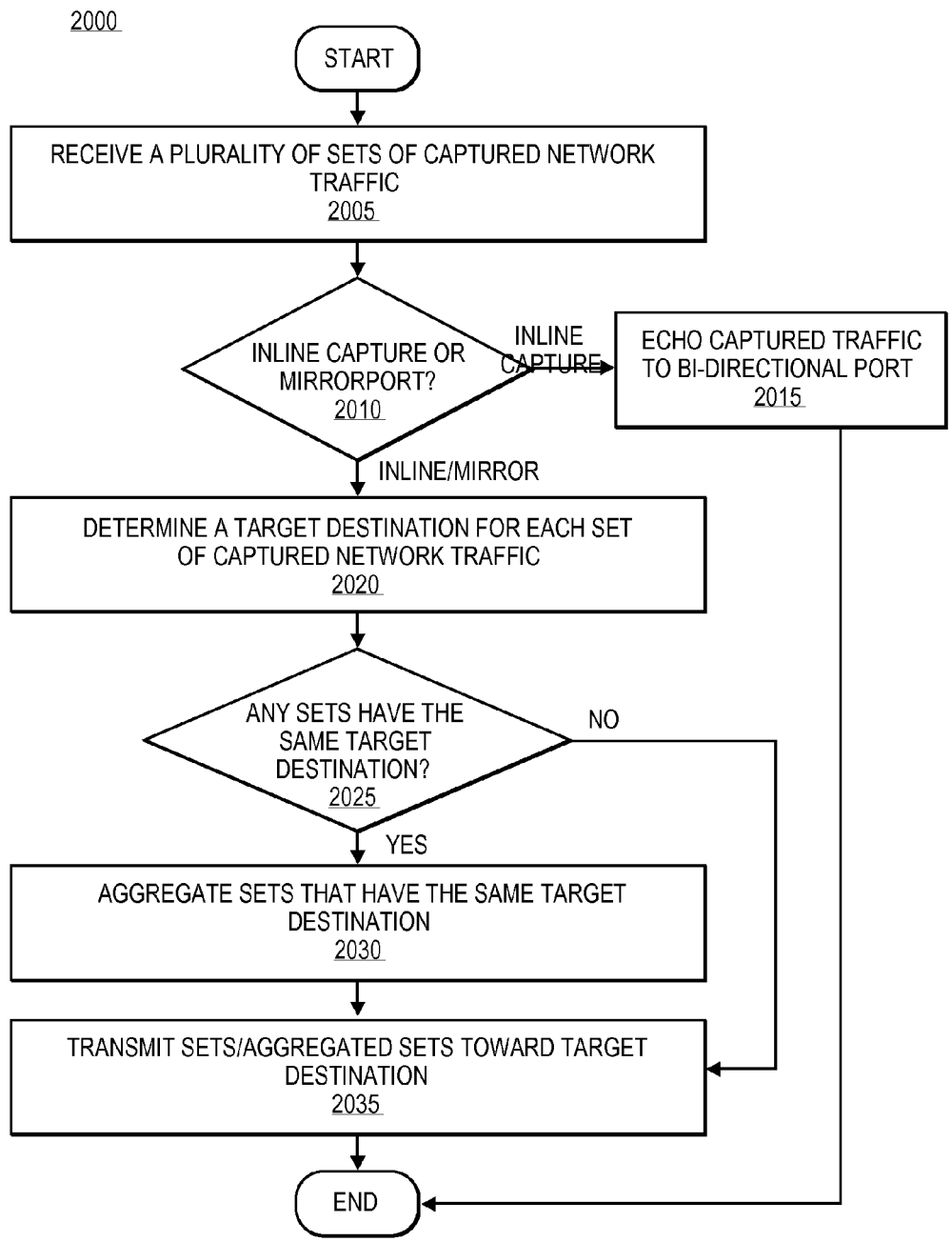
FIG. 20 is a flowchart illustrating an exemplary process for aggregating captured network traffic, in accordance with an embodiment of the present invention.

FIG. 20 is a flowchart illustrating an exemplary process 2000 for aggregating sets of captured network traffic received by a network captured traffic distribution device included in a stacked topology of network captured traffic distribution devices. Process 2000 may be executed by, for example, any of the devices and/or systems disclosed herein.

In step 2005, a plurality of sets of captured network traffic may be received by, for example, a network captured traffic distribution device coupled to a plurality of network captured traffic distribution devices arranged in a stacked topology, such as network captured traffic distribution device 100. The plurality of sets of captured network traffic may be received from a plurality of geographically dispersed sources.

Then, in step 2010, it may be determined whether the captured network traffic was received via an inline traffic capture point, such as inline traffic capture point 665 and/or a mirror port, such as mirror port 660. When the captured network traffic is received via an inline capture point, the received network captured traffic may be echoed to another bidirectional port, such as bidirectional port 110, resident on network captured traffic distribution device (step 2015).

Whether one or more of the plurality of sets of captured network traffic is received via an inline traffic capture point or a mirror port, in step 1220 a target destination for each set of received captured network traffic may be determined. Step 2020 may be executed using, for example, processes 1400 and/or 1500 as discussed above with regard to FIGS. 14 and 15. Next, in step 2025, it may be determined whether any of the received sets of captured network traffic have the same target destination. Then, in step 2030, sets of captured network traffic with the same target destination may be aggregated together and transmitted toward the target destination (step 2035).

VIII. Monitoring Stacked Topology

Figure 21A:
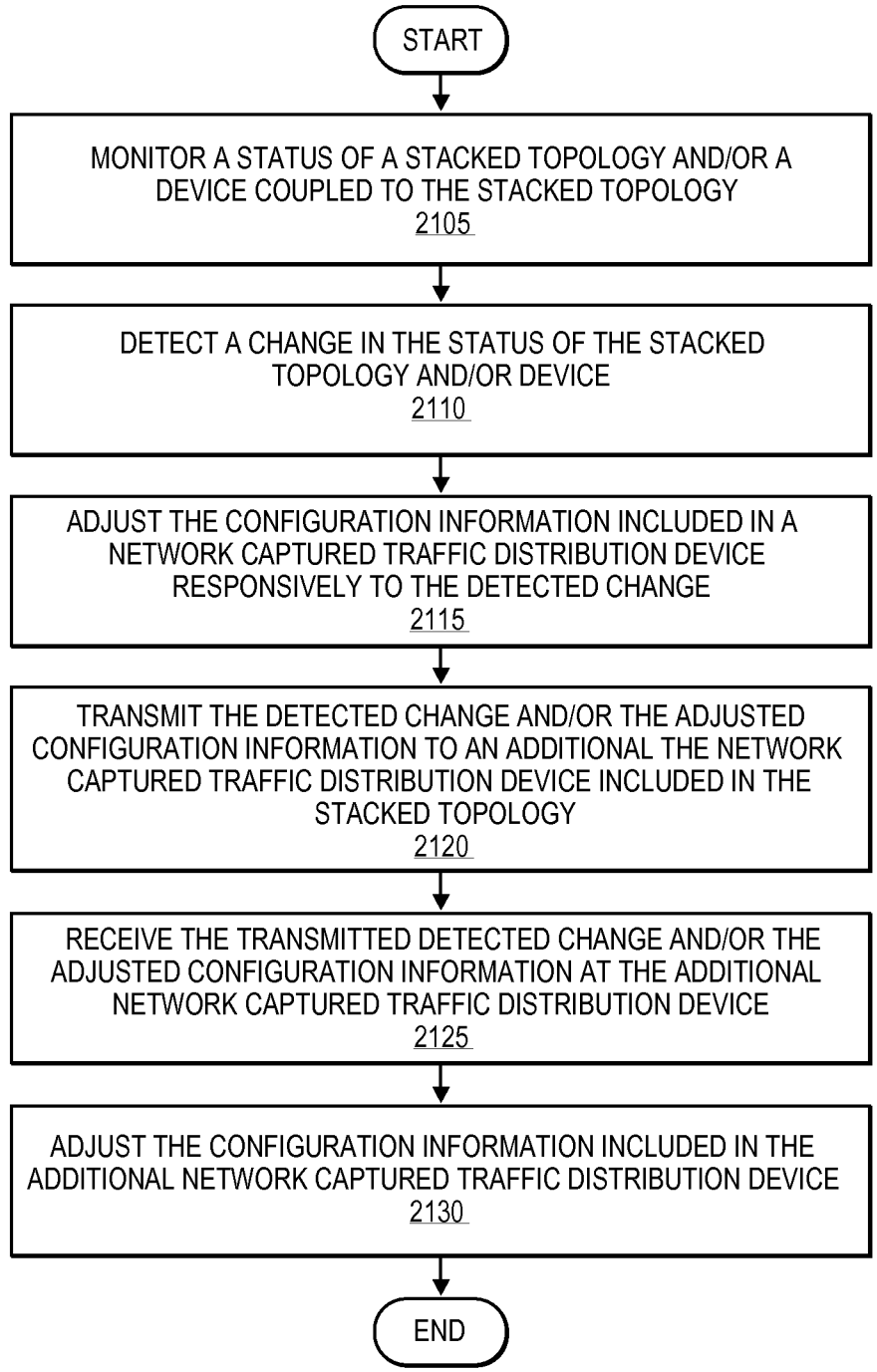
FIGS. 21A and 21B are flowcharts illustrating exemplary processes for monitoring a stacked topology of network captured traffic distribution devices, in accordance with an embodiment of the present invention.

FIG. 21A is a flowchart depicting an exemplary process 2100 for monitoring a stacked topology of network captured traffic distribution devices and/or a device communicatively coupled to the stacked topology. Process 2100 may be executed by, for example, any of the devices and/or systems disclosed herein.

In step 2105, a status of a stacked topology and/or a device, such as a network captured traffic distribution device included in the stacked topology, a network communicatively coupled to the stacked topology, a network device communicatively coupled to the network, a communication device communicatively coupled to the stacked topology, a communication link included in the stacked topology, and/or an external device communicatively coupled to the stacked topology may be monitored. Step 2105 may be executed by, for example, one or more network captured traffic distribution devices included in the stacked topology, such as network captured traffic distribution device 100.

The monitored status of step 2105 may relate to, for example, a level of congestion present at the stacked topology and/or a monitored device, an operational status of the stacked topology and/or a monitored device, and any changes in the make-up of the stacked topology, including, but not limited to, an addition or subtraction of a network captured traffic distribution device to/from the stacked topology or a change in a function associated with a port. In some cases, the monitored status of step 1205 may also relate to an intrusion, or the detection of an intrusion, by an unauthorized user to, for example, the stacked topology or a device coupled to the stacked topology. In some embodiments, the monitored status may also relate to the detection of unauthorized activity occurring on the stacked topology or a device coupled to the stacked topology.

Then, in step 2110, a change in the status of the stacked topology and/or a monitored device may be detected by, for example, the network captured traffic distribution device. Exemplary detected changes include a failure, a security breach, a loss of power, a level of congestion that exceeds a threshold amount, the addition of a new network captured traffic distribution device to the stacked topology, the removal of a network captured traffic distribution device from the stacked topology, and a change in the status of a network device included coupled to the stacked topology.

Then, in step 2115, the configuration information included in the network captured traffic distribution device may be adjusted responsively to the detected change. For example, when a failure of a network captured traffic distribution device included in the stacked topology is detected, the network captured traffic distribution device may update its configuration information to reflect the change and/or calculate alternative routes from the network captured traffic distribution device, through the stacked topology, to target destinations that do not include the failed network captured traffic distribution device.

Next, in step 2120, a detected change and/or adjusted configuration information may be transmitted to one or more additional network captured traffic distribution devices included in the stacked topology. On some occasions, step 2120 may be selectively executed such that only network captured traffic distribution devices that may be affected by the detected change and/or adjusted configuration information may have the detected change and/or adjusted configuration information transmitted to them. On other occasions, a detected change and/or adjusted configuration information may be transmitted from the network captured traffic distribution device to all network captured traffic distribution devices present in the stacked topology and/or devices coupled to the stacked topology.

In one embodiment, step 2120 may also include transmission of a message indicating the detected change and/or adjusted configuration information to a network captured traffic distribution device included in the stacked topology and/or a device coupled to the stacked topology. The message may be designed and/or transmitted such that it is transmitted to each network captured traffic distribution device or device only once thus resolving a cyclical or repeated sending of detected changes and/or adjusted configuration information throughout the stacked topology.

Next, in step 2125, the transmitted detected change and/or adjusted configuration information may be received at one or more additional network captured traffic distribution devices. Then, in step 2130, the configuration information of the additional network captured traffic distribution devices may be adjusted to incorporate the received detected change and/or adjusted confirmation information. Following step 2130, process 2100 may end.

Figure 21B:
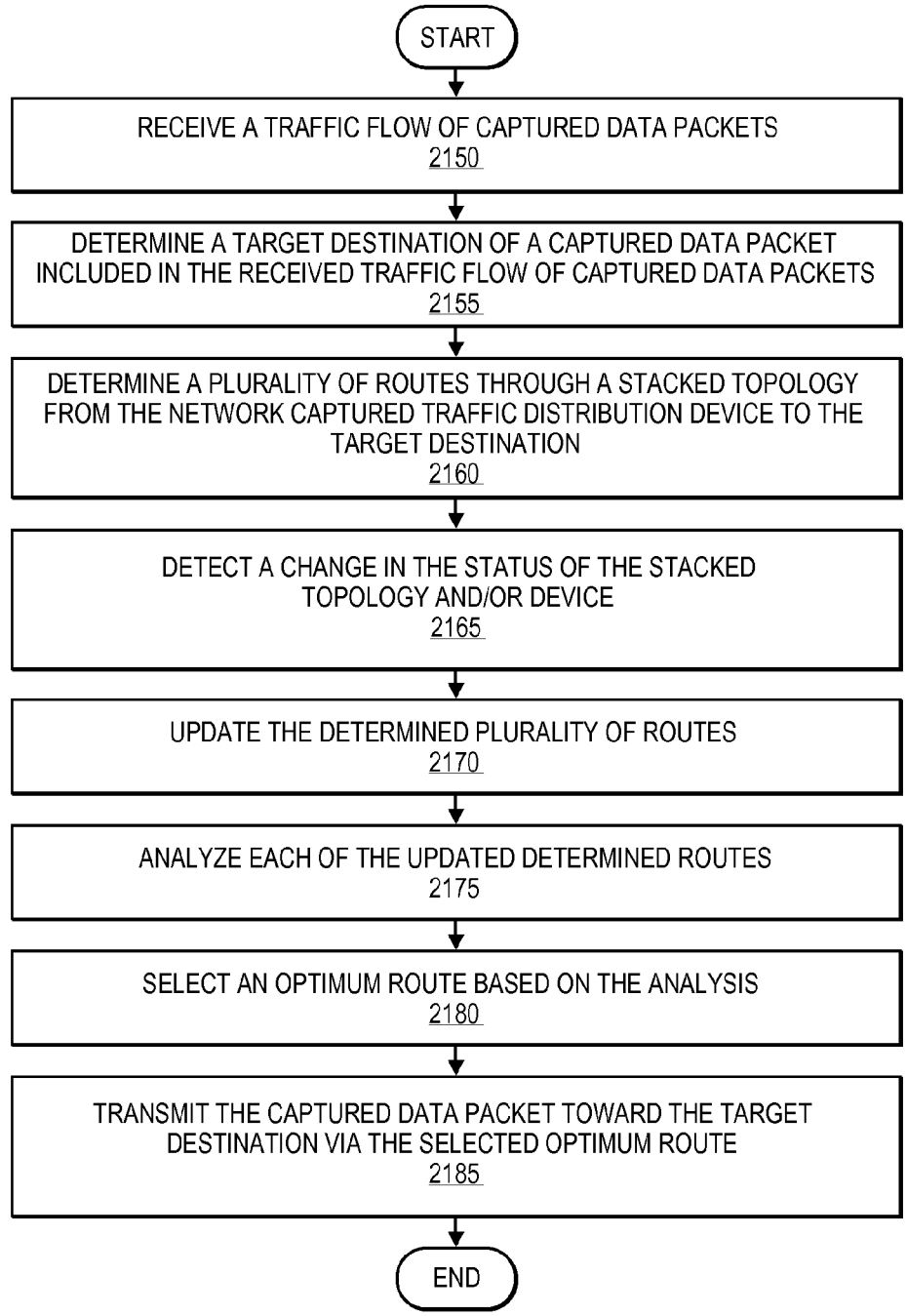

FIG. 21B illustrates an exemplary process 2101 for updating configuration information associated with one or more network captured traffic distribution devices included in the stacked topology. Process 2100 may be executed by, for example, any of the devices and/or systems disclosed herein.

In step 2150, a traffic flow of captured data packets may be received by, for example, a network captured traffic distribution device included in a stacked topology, like network captured traffic distribution device 100. Then, in step 2155, a target destination of a captured data packet included in the received traffic flow of captured data packets may be determined. Next, step 2160, a plurality of routes through the stacked topology from the network captured traffic distribution device to the target destination may be determined. In some cases, step 2160 may be performed according to processes 1400 and/or 1500 as described above with reference to FIGS. 14 and 15.

In step 2165, a change in the status of the stacked topology and/or a device communicatively coupled to the stacked topology may be detected according to, for example, process 2100, as discussed above, with reference to FIG. 21A. Following step 2165, the plurality of routes determined in step 2160 may be updated to incorporate the detected change (step 2170). For example, in the case of a newly added network captured traffic distribution device, one or more routes may be updated to include, for example, the addition of a network captured traffic distribution device to the stacked topology.

Next, in step 2175, each of the updated routes may be analyzed according to one or more criteria. The analysis of step 2175 may be similar to the analysis of step 1430 as discussed above with regard to FIG. 14. Then, in step 2180, an optimum route may be selected based upon the analysis. Step 2180 may be similar to, for example, step 1460 discussed above with regard to FIG. 14. Finally, in step 2185, the captured data packet may be transmitted toward the target destination via the selected optimum route. Following step 2185, process 2101 may end.

IX. Exchange of Configuration Information

Figure 22:
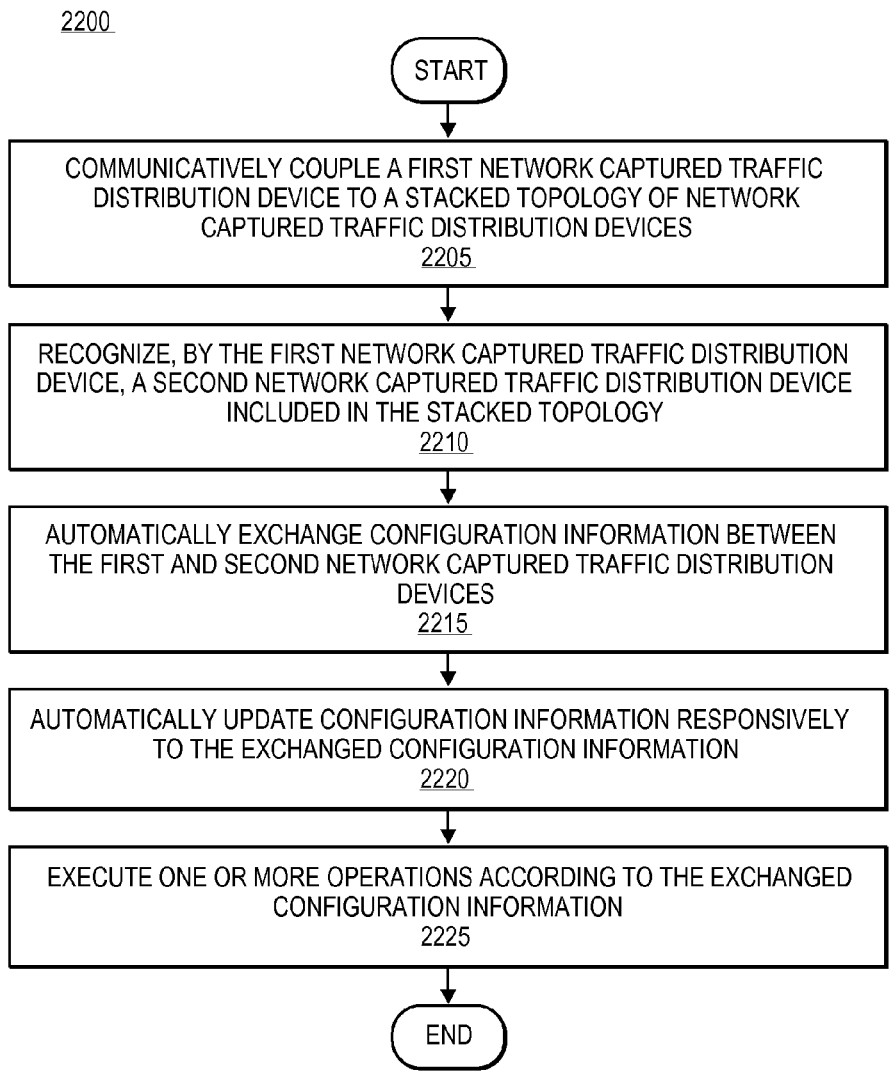
FIG. 22 is a flowchart depicting an exemplary process for exchanging configuration information between two or more network captured traffic distribution devices included in a stacked topology, in accordance with an embodiment of the present invention.

FIG. 22 illustrates an exemplary process 2200 for exchanging configuration information between two or more network captured traffic distribution devices arranged in a stacked topology. Process 2200 may be executed by, for example, any of the devices and/or systems disclosed herein.

In step 2205, a first network captured traffic distribution device, like network captured traffic distribution device 100, may be communicatively coupled to a stacked topology of network captured traffic distribution devices via a coupling with a second network captured traffic distribution device included in the stacked topology. In some embodiments, step 2205 may be executed according to process 200 as discussed above with regard to FIG. 2. Some or all of the network captured traffic distribution devices present in the stacked topology may be associated with configuration information. Exemplary configuration information relates to one or more of determining a target destination for received captured traffic, pre-calculating a route for the transmission of received captured traffic from a receiving network captured traffic distribution device, through the stacked topology, to a target destination, determining an optimum route for the transmission of received captured network traffic from the network captured traffic distribution device through, the stacked topology, to a target destination. On some occasions, configuration information may also relate to evaluating the current operating conditions of the stacked topology.

In one embodiment, the configuration information may relate to grooming received captured network traffic according to one or more criteria, load balancing a distribution of received captured network traffic through the network captured traffic distribution device and/or the stacked topology, removing unwanted information from one or more data packets included in the received captured network traffic, truncating one or more data packets included in the received captured network traffic, and load spreading a distribution of received captured network traffic through the stacked topology. Configuration information relating to grooming the received captured network traffic may also relate to filtering the received captured network traffic according to one or more criterion, aggregating one or more sets of captured network traffic transmitted through the stacked topology, altering the content of the received captured network traffic, adding information to one or more data packets included in the received captured network traffic, and subtracting information from one or more data packets included in the received captured network traffic.

On some occasions, the communicative coupling of step 2205 may include physically coupling the first network captured traffic distribution device to the stacked topology via a physical communication link such as, for example, an Ethernet cable, an optical fiber cable, and/or a copper cable. On some occasions, the communicative coupling of the first network captured traffic distribution device to the stacked topology may include wirelessly coupling the first network captured traffic distribution device to the stacked topology via a wireless communication link.

Then, in step 2210, the first network captured traffic distribution device may recognize the second network captured traffic distribution device included in the stacked topology. On some occasions, step 2210 may include the transmission of a message from the first network captured traffic distribution device to the second network captured traffic distribution device and the receipt of an acknowledgement message from a second network captured traffic distribution device by the first network captured traffic distribution device responsively to the transmitted message.

Next, in step 2215, a portion of the configuration information associated with the first network captured traffic distribution devices may be automatically exchanged with the second network captured traffic distribution device and/or a portion of the configuration information associated with the second network captured traffic distribution devices may be automatically exchanged with the first network captured traffic distribution device. In one embodiment, the automatic exchange of configuration information of step 2215 may include the transmission of a request from the first to the second network captured traffic distribution device for a portion of the configuration information associated with the second network captured traffic distribution device. The first network captured traffic distribution device may then receive the requested configuration information responsively to the transmitted request.

In step 2220, the configuration information of the first and/or second network captured traffic distribution devices may be automatically updated responsively to some or all of the exchanged configuration information. Optionally, in step 2225, one or more operations may be executed by the first and/or second network captured traffic distribution devices responsively to the exchanged configuration information. For example, when determining an optimum route through a stacked topology, the first network captured traffic distribution device may incorporate configuration information regarding the link speed of various links present in the stacked topology received from the second network captured traffic distribution device into the calculation of an optimum route through the stacked topology. Following step 2225, process 2200 may end.

In the preceding discussion various embodiments of the present invention were discussed as being implemented with the aid of computer-implemented processes or methods (a.k.a. programs or routines). Such programs may be rendered in any computer-readable language and, in general, are meant to encompass any series of logical steps performed in a sequence to accomplish the stated purpose. Any part of the foregoing description that was presented in terms of algorithms and/or symbolic representations of operations on data within a computer memory should be understood as steps requiring physical manipulations of physical quantities (usually represented in the form of electrical or magnetic signals) within computer-readable storage devices. Accordingly, throughout the preceding description of the present invention, terms such as "processing", "computing", "calculating", "determining", "displaying" or the like, should be understood as referring to the actions and processes of an appropriately programmed computer processor, or similar electronic device, that manipulates and transforms data represented as physical (electronic) quantities within the computer processor's registers and any associated memories or other storage devices into other data similarly represented as physical quantities within those memories or registers or other such information storage devices. The programs comprise computer-executable instructions stored on one or more such computer-readable storage mediums accessible to the computer processor, for example any type of disk including hard disks, floppy disks, optical disks, compact disk read only memories (CD-ROMs), and magnetic-optical disks, read-only memories (ROMs), random access memories (RAMs), erasable programmable read only memories (EPROMs), electrically erasable programmable read only memories (EEPROMs), flash memories, other forms of electrical, magnetic or optical storage media accessible to the computer processor.

What is claimed is:

1. A method comprising:
    receiving captured network traffic from at least one of an inline traffic capture point and a mirror port at a network captured traffic distribution device communicatively coupled to a plurality of network captured network traffic distribution devices arranged in a stacked topology, the captured network traffic being a copy of the network traffic flowing through a communication network;
    determining, by the network captured network traffic distribution device, a target destination of a data packet included in the captured network traffic, wherein there is at least one intervening network captured traffic distribution device in the stacked topology in-line between the network captured traffic distribution device and the target destination and wherein the data packet comprises at least a header, a payload and a frame check sequence associated with the data packet;
    inserting, by the network captured network traffic distribution device, a virtual local area network (VLAN) tag into the captured data packet responsively to the determined target destination, wherein the inserting includes updating the frame check sequence associated with the captured data packet to include information indicating that the captured data packet includes the inserted VLAN tag;
    transmitting, by the network captured network traffic distribution device, the data packet to the at least one intervening network captured traffic distribution device positioned between the network captured traffic distribution device and the target destination;
    receiving, by the intervening network captured traffic distribution device, the transmitted data packet;
    determining, by the intervening network captured traffic distribution device, the target destination of the received data packet based on the VLAN tag inserted into the received data packet; and
    transmitting, by the intervening network captured traffic distribution device, the received data packet toward the target destination.

2. The method of claim 1, wherein the target destination is a target network captured traffic distribution device included in the stacked topology, the method further comprising:
    determining, by the target network captured traffic distribution device receiving the data packet from the intervening network captured traffic distribution device, whether the target network captured traffic distribution device receiving the data packet is the target destination for the data packet;
    removing, by the target network captured traffic distribution device, the VLAN tag from the data packet responsively to a determination that the target network captured traffic distribution device is the target destination for the data packet; and
    transmitting, by the target network captured traffic distribution device, the data packet, without the VLAN tag, to an external device.

3. The method of claim 1, wherein the stacked topology is arranged as at least one of a ring topology, a mesh topology, a star topology, a topology of single links, a topology of multiple links, a topology including one or more redundant links, and some combination thereof.

4. The method of claim 1, wherein the target destination is at least one of a monitoring device, a protocol analyzer, a flight recorder, an intrusion detection system, a media analyzer, a signaling analyzer, a web analyzer, a database analyzer, a voice signaling analyzer, an Internet protocol television (IPTV) analyzer, an application analyzer, a voice analyzer, and a forensic analyzer.

5. The method of claim 1, further comprising:
    grooming, by the network captured traffic distribution device, the received captured traffic.

6. The method of claim 5, wherein the grooming includes at least one of load balancing a distribution of received captured traffic through the stacked topology, removing information from one or more data packets included in the received captured traffic, truncating one or more data packets included in the received captured traffic, load spreading a distribution of received captured traffic through the stacked topology, filtering the received network traffic transmitted through the stacked topology according to a criterion, and aggregating the received network traffic transmitted through the stacked topology.

7. A network captured traffic distribution device, comprising:
    a plurality of bi-directional ports configured to perform at least one of receiving captured network traffic from at least one of an inline traffic capture point and a mirror port and echoing received captured network traffic to one or more of the plurality of bi-directional ports, the captured network traffic being a copy of the network traffic flowing through a communication network;
    an egress port configured to transmit received captured network traffic to an external device;
    a stacking port configured to enable, via a communication link, the stacking of the network captured traffic distribution device with at least one additional network captured traffic distribution device in a stacked topology wherein the stacking includes an exchange of configuration information between the network captured traffic distribution device and the additional network captured traffic distribution device;
a processor configured to manage distribution of received captured network traffic through the network captured traffic distribution device, determine a target destination of a data packet included in the captured network traffic, wherein the data packet comprises at least a header, a payload and a frame check sequence associated with the data packet, and insert a virtual local area network (VLAN) tag into the data packet responsively to the determined target destination, wherein the inserting includes updating the frame check sequence associated with the captured data packet to include information indicating that the captured data packet includes the inserted VLAN tag; and
an application specific integrated circuit configured to transmit the data packet to the at least one of the additional network captured traffic distribution device.

8. The network captured traffic distribution device of claim 7, wherein a received data packet included in the received captured network traffic includes a VLAN tag and the processor is further configured to determine the target destination of the received data packet based on the VLAN tag.

9. The network captured traffic distribution device of claim 7, wherein at least one of the bi-directional ports, the egress port, and the stacking port is compatible with at least one of a 10/100 Ethernet cable, a 1 gigabit Ethernet cable, a 10 gigabit Ethernet cable, a copper cable, and a fiber cable.

10. The network captured traffic distribution device of claim 7, wherein the processor is further configured to enable peer-to-peer management between the network captured traffic distribution device and the additional stacked network captured traffic distribution device.

11. The network captured traffic distribution device of claim 7, wherein the stacked topology is arranged as at least one of a ring topology, a mesh topology, a star topology, a topology of single links, a topology of multiple links, a topology including one or more redundant links, and some combination thereof.

12. The network captured traffic distribution device of claim 7, wherein the target destination is at least one of a monitoring device, a protocol analyzer, a flight recorder, an intrusion detection system, a media analyzer, a signaling analyzer, a web analyzer, a database analyzer, a voice signaling analyzer, an Internet protocol television (IPTV) analyzer, an application analyzer, a voice analyzer, and a forensic analyzer.

13. A system comprising:
a stacked topology comprising:
a first network captured traffic distribution device configured to receive captured network traffic from at least one of an inline traffic capture point and a mirror port, the captured network traffic being a copy of the network traffic flowing through a communication network, determine a target destination of a data packet included in received captured network traffic, wherein the data packet comprises at least a header, a payload and a frame check sequence associated with the data packet, determine a route for transmission of the data packet through the stacked topology to the target destination, wherein a second network captured traffic distribution device is positioned in the stacked topology between the first network captured traffic distribution device and the target destination, insert a virtual local area network (VLAN) tag into the data packet responsively to the determined target destination, wherein the inserting includes updating the frame check sequence associated with the captured data packet to include information indicating that the captured data packet includes the inserted VLAN tag, and transmit the data packet to the second network captured traffic distribution device;
the second network captured traffic distribution device communicatively coupled to the first network captured traffic distribution device, wherein the second network captured traffic distribution device is configured to automatically exchange configuration information with the first network captured traffic distribution device, receive the data packet transmitted from the first network captured traffic distribution device, determine the target destination of the data packet based on the VLAN tag inserted into the received data packet, and transmit the data packet toward the determined target destination; and
the communication link, wherein the communication link is enabled to facilitate communication between the first and second network captured traffic distribution devices.

14. The system of claim 13, further comprising:
a third network captured traffic distribution device communicatively coupled to the second network captured traffic distribution device in the stacked topology via a communication link, wherein the third network captured traffic distribution device is the target destination of the data packet and the third network captured traffic distribution device is configured to determine whether the third network captured traffic distribution device is the target destination for the data packet, remove the VLAN tag from the data packet responsively to a determination that the third network captured traffic distribution device is the target destination for the data packet, and transmit the data packet, without the VLAN tag, to an external device.

15. The system of claim 13, wherein the stacked topology is arranged as at least one of a ring topology, a mesh topology, a star topology, a topology of single links, a topology of multiple links, a topology including one or more redundant links, and some combination thereof.

16. The system of claim 13, wherein the target destination is at least one of a monitoring device, a protocol analyzer, a flight recorder, an intrusion detection system, a media analyzer, a signaling analyzer, a web analyzer, a database analyzer, a voice signaling analyzer, an Internet protocol television (IPTV) analyzer, an application analyzer, a voice analyzer, and a forensic analyzer.

* * * * *